(12) United States Patent
Lee et al.

(10) Patent No.: US 12,003,471 B2
(45) Date of Patent: *Jun. 4, 2024

(54) TELEPORTING A NEW MEMBER TO A MESSAGING GROUP

(71) Applicant: Tellus App, Inc., Menlo Park, CA (US)

(72) Inventors: Rocky Lee, Hong Kong (CN); Tiancheng Zhu, Mountain View, CA (US); Blake McQuillan, San Francisco, CA (US)

(73) Assignee: Tellus App, Inc., Mountain View, CA (US)

( * ) Notice: Subject to any disclaimer, the term of this patent is extended or adjusted under 35 U.S.C. 154(b) by 76 days.

This patent is subject to a terminal disclaimer.

(21) Appl. No.: 17/807,114

(22) Filed: Jun. 15, 2022

(65) Prior Publication Data

US 2022/0311724 A1  Sep. 29, 2022

Related U.S. Application Data

(63) Continuation of application No. 16/288,058, filed on Feb. 27, 2019, now Pat. No. 11,374,890.

(51) Int. Cl.
*H04L 51/216* (2022.01)
*G06F 3/0486* (2013.01)
*H04L 12/18* (2006.01)
*H04L 51/04* (2022.01)

(52) U.S. Cl.
CPC .......... *H04L 51/216* (2022.05); *G06F 3/0486* (2013.01); *H04L 12/185* (2013.01); *H04L 51/04* (2013.01)

(58) Field of Classification Search
CPC ....... H04L 51/16; H04L 12/185; H04L 51/04; G06F 3/0486
See application file for complete search history.

(56) References Cited

U.S. PATENT DOCUMENTS

| | | | |
|---|---|---|---|
| 7,562,116 B2 | 7/2009 | Barsness et al. | |
| 8,095,598 B2 | 1/2012 | Follmeg et al. | |
| 2009/0113315 A1 | 4/2009 | Fisher et al. | |
| 2013/0185363 A1* | 7/2013 | DeLuca | H04L 51/04 709/206 |
| 2016/0241507 A1 | 8/2016 | Helbling et al. | |
| 2019/0327198 A1* | 10/2019 | Connor | H04L 51/216 |

* cited by examiner

*Primary Examiner* — Michael A Keller
(74) *Attorney, Agent, or Firm* — Ahmann Kloke LLP

(57) ABSTRACT

A method comprising: receiving two or more user identifiers and a request to establish a messaging group, each user identifier being associated with a different user device with a different instance of a messaging application on the respective different user device; establishing the messaging group to enable communication between the different user devices; receiving a plurality of messages; routing the plurality of messages to the respective different instances of the messaging application; receiving a request to add a new member to the messaging group, the request including identity information of the new member and insertion information, the messaging group being associated with a thread of message history; determining an insertion point in the thread of message history; adding the new member to the messaging group to enable the new member to communicate with other members of the messaging group and to see messages up to the insertion point.

20 Claims, 46 Drawing Sheets

|  |  |  |
|---|---|---|
| ●●●∞ 📶 | 9:41 AM | 100% 🔋 |
| Cancel | End Repeat | Done |

653 — Never ✓

After

On Date

|  |  |  |
|---|---|---|
| ●●●∞ 📶 | 9:41 AM | 100% 🔋 |
| Cancel | End Repeat | Done |

Never

654 — After ✓

[ 1 Time  › ]

On Date

|  |  |  |
|---|---|---|
| ●●●∞ 📶 | 9:41 AM | 100% 🔋 |
| Cancel | End Repeat | Done |

Never

After

655 — On Date ✓

| October | 29 | 2017 |
| November | 30 | 2018 |
| December | 31 | 2019 |
| January | 1 | 2020 |
| February | 2 |  |
| March | 3 |  |
| April | 4 |  |

TELEPORTING A NEW MEMBER TO A MESSAGING GROUP

CROSS-REFERENCE TO RELATED APPLICATIONS

This application is a continuation of U.S. patent application Ser. No. 16/288,058, filed on Feb. 27, 2019, entitled "TELEPORTING A NEW MEMBER TO A MESSAGING GROUP," which is incorporated herein by reference in its entirety.

FIELD OF THE INVENTION

The present invention(s) generally relates to the field of electronic messaging, and more particularly, to teleporting (e.g., adding) a new member to a messaging group (e.g. an existent conversation that already exists amongst more than one member) such that a limited number of historical messages associated with that messaging group is shared with the new member.

BACKGROUND OF THE INVENTION(S)

In recent years, messaging has become an increasingly popular mode of communication for mobile users. With messages, users can communicate in a real-time or near real-time manner, as well as in many types of environments (e.g., homes, offices, restaurants, and the like). Users can invite new members to an existent conversation and/or remove user(s) from an existent conversation; however, the conversation prior to the point where a new user has joined the conversation is either (i) completely hidden and not accessible to the new member, or (ii) is entirely exposed and accessible to the new member. In order to share a portion of the historical messages of a conversation with the new user to the conversation, an existent user on the conversation has to manually capture (e.g., copy) a record of the conversation of interest between users prior to the point of time when a new user joined the conversation.

SUMMARY

The following presents a simplified summary of the disclosure in order to provide a basic understanding of some embodiments described herein. This summary is not an extensive overview, and it is not intended to identify key or critical elements to delineate the scope thereof. Some concepts are presented in a simplified form as a prelude to the more detailed description that is presented later.

An example method comprises receiving two or more user identifiers and a request to establish a messaging group, each user identifier being associated with a different user device with a different instance of a messaging application on the respective different user device, establishing the messaging group to enable communication between the different user devices using the respective different instances of the messaging application, receiving a plurality of messages including at least one message from each of at least two of the two or more users, routing the plurality of messages to the respective different instances of the messaging application, receiving a request to add a new member to the messaging group, the request including identity information of the new member and insertion information, the messaging group being associated with a thread of message history, the message history including at least the plurality of messages organized by time, determining an insertion point in the thread of message history based at least in part on the insertion information, adding the new member to the messaging group to enable the new member to communicate with other members of the messaging group, and enabling the new member to see messages in the thread of message history up to the insertion point but not at any messages received or generated before a time of before the insertion point.

The request to add the new member may be generated based at least in part on a user selection pertaining to the identity information of the new member and the insertion information, the user being a member of the messaging group. The identity information of the new member may be selected from a contact list on the user device of the user prior to adding the new member. The identity information of the new member may be provided by the user in relation to the request to add the new member.

In some embodiments, the request to add the new member is automatically generated based at least in part on a pre-configured condition. The request to add the new member may be generated based at least in part on a user selection for a recommendation of the identity information of the new member and insertion information. Further, in some embodiments, the pre-configured condition is based at least in part on a recurring schedule.

An example system comprises processor and a memory coupled with the processor. The memory may be configured to provide the processor with instructions which when executed cause the processor to receive two or more user identifiers and a request to establish a messaging group, each user identifier being associated with a different user device with a different instance of a messaging application on the respective different user device, establish the messaging group to enable communication between the different user devices using the respective different instances of the messaging application, receive a plurality of messages including at least one message from each of at least two of the two or more users, route the plurality of messages to the respective different instances of the messaging application, receive a request to add a new member to the messaging group, the request including identity information of the new member and insertion information, the messaging group being associated with a thread of message history, the message history including at least the plurality of messages organized by time, determine an insertion point in the thread of message history based at least in part on the insertion information, and add the new member to the messaging group to enable the new member to communicate with other members of the messaging group and enable the new member to see messages in the thread of message history up to the insertion point but not at any messages received or generated before a time of before the insertion point.

An example computer program product is embodied in a non-transitory tangible computer readable storage medium. The non-transitory tangible computer readable storage medium may comprise executable instructions (e.g., computer instructions). The executable instructions may be executable by at least one processor to perform a method. The method may comprise receiving two or more user identifiers and a request to establish a messaging group, each user identifier being associated with a different user device with a different instance of a messaging application on the respective different user device, establishing the messaging group to enable communication between the different user devices using the respective different instances of the messaging application, receiving a plurality of messages including at least one message from each of at least two of the two or more users, routing the plurality of messages to the respective different instances of the messaging application, receiving a request to add a new member to the messaging group, the request including identity information of the new member and insertion information, the messaging group being associated with a thread of message history, the message history including at least the plurality of messages organized by time, determining an insertion point in the thread of message history based at least in part on the insertion information, adding the new member to the messaging group to enable the new member to communicate with other members of the messaging group, and enabling the new member to see messages in the thread of message history up to the insertion point but not at any messages received or generated before a time of before the insertion point.

Various embodiments are generally directed to methods, executed by a processor coupled to a memory, for receiving two or more user identifiers and a request to establish a messaging group, each user identifier being associated with a different user device with a different instance of a messaging application on the respective different user device; establishing the messaging group to enable communication between the different user devices using the respective different instances of the messaging application; receiving a plurality of messages including at least one message from each of at least two of the two or more users; routing the plurality of messages to the respective different instances of the messaging application; receiving a request to add a new member to the messaging group, the request including identity information of the new member and insertion information, the messaging group being associated with a thread of message history, the message history including at least the plurality of messages organized by time; determining an insertion point in the thread of message history based at least in part on the insertion information; adding the new member to the messaging group to enable the new member to communicate with other members of the messaging group; and enabling the new member to see messages in the thread of message history up to the insertion point but not at any messages received or generated before a time of before the insertion point.

In some embodiments, the request to add the new member is generated based at least in part on a user selection pertaining to the identity information of the new member and the insertion information, the user being a member of the messaging group. In some embodiments, the identity information of the new member is selected from a contact list on the user device of the user prior to teleporting. In some embodiments, the identity information of the new member is provided by the user in relation to the request to add the new member. In some embodiments, the request to add the new member is automatically generated based at least in part on a pre-configured condition. In some embodiments, the request to add the new member is generated based at least in part on a user selection for a recommendation of the identity information of the new member and insertion information. In some embodiments, the pre-configured condition is based at least in part on a recurring schedule.

Various embodiments are further generally directed to systems comprising a memory and a processor. The memory is configured to provide the processor with instructions which when executed cause the processor to: receive two or more user identifiers and a request to establish a messaging group, each user identifier being associated with a different user device with a different instance of a messaging application on the respective different user device; establish the messaging group to enable communication between the different user devices using the respective different instances of the messaging application; receive a plurality of messages including at least one message from each of at least two of the two or more users; route the plurality of messages to the respective different instances of the messaging application; receive a request to add a new member to the messaging group, the request including identity information of the new member and insertion information, the messaging group being associated with a thread of message history, the message history including at least the plurality of messages organized by time; determine an insertion point in the thread of message history based at least in part on the insertion information; add the new member to the messaging group to enable the new member to communicate with other members of the messaging group; and enable the new member to see messages in the thread of message history up to the insertion point but not at any messages received or generated before a time of before the insertion point.

Various embodiments are also generally directed to computer program products comprising instructions for receiving two or more user identifiers and a request to establish a messaging group, each user identifier being associated with a different user device with a different instance of a messaging application on the respective different user device; establishing the messaging group to enable communication between the different user devices using the respective different instances of the messaging application; receiving a plurality of messages including at least one message from each of at least two of the two or more users; routing the plurality of messages to the respective different instances of the messaging application; receiving a request to add a new member to the messaging group, the request including identity information of the new member and insertion information, the messaging group being associated with a thread of message history, the message history including at least the plurality of messages organized by time; determining an insertion point in the thread of message history based at least in part on the insertion information; adding the new member to the messaging group to enable the new member to communicate with other members of the messaging group; and enabling the new member to see messages in the thread of message history up to the insertion point but not at any messages received or generated before a time of before the insertion point.

Various embodiments are disclosed in the following detailed description and the accompanying drawings.

BRIEF DESCRIPTION OF THE DRAWINGS

Various embodiments are disclosed in the following detailed description and the accompanying drawings.

The drawings described here are intended to further the understanding of at least some embodiments, and form a part of the present application. The example embodiments in the present application and its description are intended to provide explanation, and do not constitute inappropriate limitation of the scope described herein. Among the drawings.

DETAILED DESCRIPTION

Figure 1:
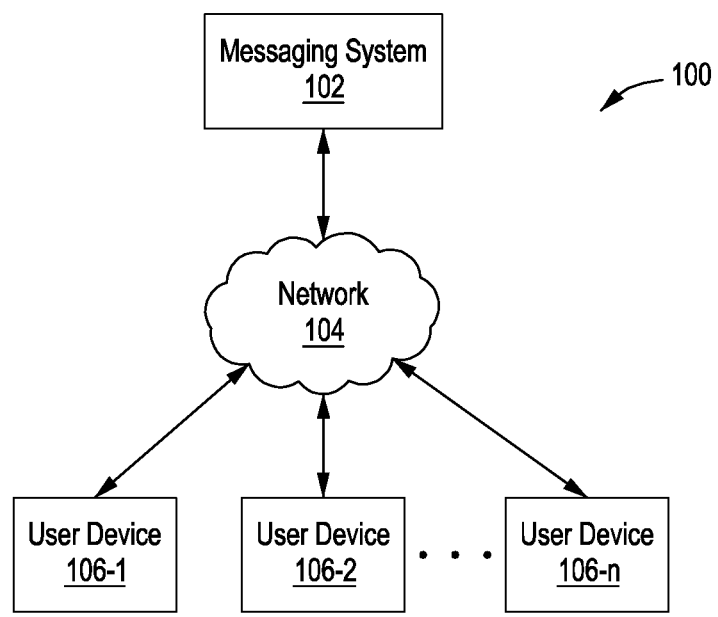
FIG. 1 is a schematic diagram of an example system for teleporting a new member to a messaging group, in accordance with one or more embodiments of the present disclosure.

Embodiments described herein may be implemented in numerous ways, including as a process, an apparatus, a system, a composition of matter, a computer program product embodied on a nontransitory computer readable storage medium, and/or a processor (e.g., a processor configured to execute instructions stored on and/or provided by a memory coupled to the processor). In this specification, these implementations, or any other form that embodiments described herein may take, may be referred to as techniques. In general, the order of the steps of disclosed processes may be altered within the scope of the embodiments described herein. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments is provided below along with accompanying figures that illustrate principles of the embodiments. The embodiments are described herein, but the description is not limited to any embodiment. The scope described herein is limited only by the claims and the embodiments encompasses numerous alternatives, modifications and equivalents. Numerous specific details are set forth in the following description in order to provide a thorough understanding. These details are provided for the purpose of example and embodiments may be practiced according to the claims without some or all of these specific details. For the purpose of clarity, technical material that is known in the technical fields related to some embodiments has not been described in detail so that those embodiments are not unnecessarily obscured.

In order to allow persons skilled in the art to better understand some embodiments describe herein, a technical solution is described clearly in light of the drawings contained in the embodiments. Obviously, the embodiments described are only a portion of all embodiments, and do not represent the entirety of all possible embodiments. Based on the embodiments contained in the present application, all other embodiments obtained from persons with ordinary technical skill in the art without the exertion of creative labor shall fall within the scope of protections of the present application.

It must be noted that the terms "first," "second," etc., in the description and claims, as well as in the drawings, are used to differentiate similar objects, and are not necessarily intended to describe a specific order or sequence. It should be understood that data used in this way are interchangeable in the appropriate situations, so that the embodiments described here can be implemented in sequences additional to those shown or described here. Moreover, the terms "comprises" and "has" and any variations thereof are intended to cover non-exclusive inclusion; for example, processes, methods, systems, products, and equipment that include a series of steps or units are not necessarily limited to the steps or units that are explicitly enumerated, but may comprise other steps or units that are not explicitly enumerated or are inherent to these processes, methods, systems, products or equipment.

Techniques for teleporting a new member to a messaging group is disclosed herein. As used herein, the term "message" refers to an electronic communication bearing conversation data thereon including, for example, text, images, video, audio, voice, emoji, or any combinations thereof. Some example messages include chat messages or any other messages suitable for any messaging applications.

As used herein, the term "messaging group" refers to any number of users who are parties to a conversation where the users engage in exchanging messages. Identity information associated with each of the users define the membership associated with the corresponding message group. In particular, the membership of a messaging group can include just two users, which is typically how the membership of a messaging group starts in the beginning. Of course, the membership associated with a messaging group can also include more than just two users, as multiple participants are added to the conversation. Further, the membership of a messaging group can be modified (e.g., including adding new user(s), removing existing user(s), modifying identity information associated with one or more of the users, or the like) upon a variety of events (e.g., a user sends an invitation to a new user to join the conversation, removes existent user(s) from the conversation, or the like).

As used herein, the term "thread of message history" or "thread of messages" refers to a plurality of messages exchanged in a conversation associated with a particular messaging group. In some cases, each of the messages of a thread of message history or thread of messages is contributed or communicated by a user included in the membership associated with a messaging group. As used herein, the term "message history" refers to the messages that have been previously exchanged between the users included in the membership associated with the messaging group, from a contemporaneous point of view.

As used herein, the term "timeline" refers to a temporal display of items (e.g., message history) according to a chronological order in a user interface. For example, a timeline associated with a thread of message history can be generated based on messages ordered according to the date and time information associated with each message included in the thread of message history. In another example, messages of a messaging group may be chronologically organized based on when the messages were received or input into the messaging system (e.g., along a timeline).

As used herein, the term "tag" or "tagging" refers to associating a particular user that might join a conversation in a relation with a messaging group, the user being described with a particular set of information relative to the messaging group. In one example, a "tag" may refer to a category associated with a user. For example, a user can be associated with information regarding the types of services the user is able to provide (e.g., plumber, painter, realtor, service provider, or the like) to the members of a messaging group. A user can be associated with one or more sets of information. For example, a user can be tagged with both types of services of a plumber and a painter.

As used herein, the term "ruleset" refers to a collection of one or more rules which define a variety of scenarios where messages communicated in a conversation associated with a messaging group set forth a plurality of corresponding actions with regard to teleportation of new member(s).

Despite the proliferation of messaging applications such as Facebook Messenger, Whatsapp®, Snapchat®, Slack®, WeChat®, KakaoTalk®, DingTalk®, Skype®, iMessage®, Line®, Telegram®, Discord®, Instagram®, Google Hangouts®, and many others, none of the messaging applications or related communication services allows a user to associate a new user to an existent conversation at a historical point of time along the timeline of the conversation.

FIG. 1 is a schematic diagram of an example system for teleporting a new member to a messaging group in accordance with an embodiment of the present disclosure. The term "teleporting" refers to the addition of the new member to an existing messaging group permitting the sharing of a custom selected subset of past messages (i.e., sharing less than all of the prior messages) of the existing messaging group to the new member when the new member is added.

System 100 includes a plurality of user devices 106-1, 106-2, . . . 106-n (collectively user devices 106) communicatively connected to a messaging system 102 via a network 104. By way of example, network 104 includes one or more networks such as a data network, a wireless network, a telephony network, or any combination thereof. It is further understood that the data network can be any local area network (LAN), metropolitan area network (MAN), wide area network (WAN), public data network (e.g., the Internet), and the like. The wireless network can be, for example, a cellular network employing various technologies such as general packet radio service (GPRS), global system for mobile communications (GSM), Enhanced Data GSM Environment (EDGE), Internet protocol multimedia subsystem (IMS), universal mobile telecommunications system (UMTS), or the like, as well as any other suitable wireless medium, e.g., worldwide interoperability for microwave access (WiMAX), code division multiple access (CDMA), wideband code division multiple access (WCDMA), wireless fidelity (Wi-Fi), wireless LAN (WLAN), Bluetooth®, and the like, or any combination thereof.

User devices 106 can be any type of digital device (e.g., a device with a processor and memory) such as a mobile terminal, fixed terminal, or portable terminal. For example, user devices 106 can include a mobile phone, a smart phone, a tablet, a desktop computer, a laptop computer, a Personal Digital Assistants (PDAs), a server, and the like. User devices 106 can execute messaging application(s) (not shown) which may be installed on any number of user devices 106.

Users of user devices 106 can interact with each other in system 100 via messaging system 102, sending and receiving messages back and forth to each other over a messaging channel between two or more users. In some embodiments, a messaging application is configured to provide a conversational interface where communications are exchanged by a messaging group (e.g., between two or more users of mobile devices 106) and presented as a thread of message history in a chronological order. By associating the communications of the messaging group with a chronological timeline, members of the messaging group (e.g., users of mobile devices 106) are enabled to conveniently browse the thread of the message history to search for a particular message from a particular user, determine a timeline point suitable for teleporting a new member to the messaging group, or the like. More detailed descriptions of the messaging application and the user interfaces thereof are described below with reference to FIGS. 2A-6I.

Figure 7A:
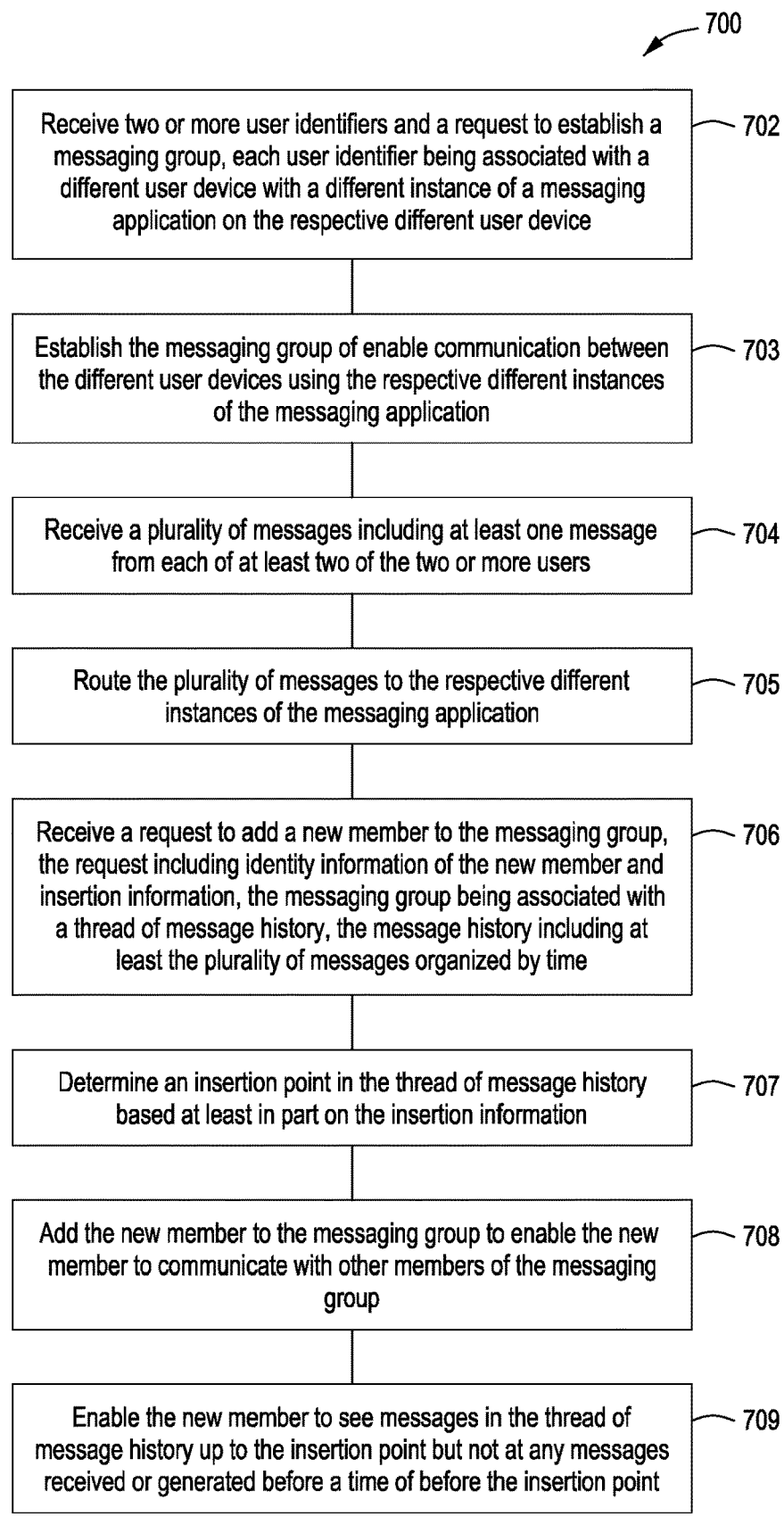
FIGS. 7A-7H are flow charts illustrating example processes for teleporting a new member to a messaging group, in accordance with one or more embodiments of the present disclosure.
Figure 7B:
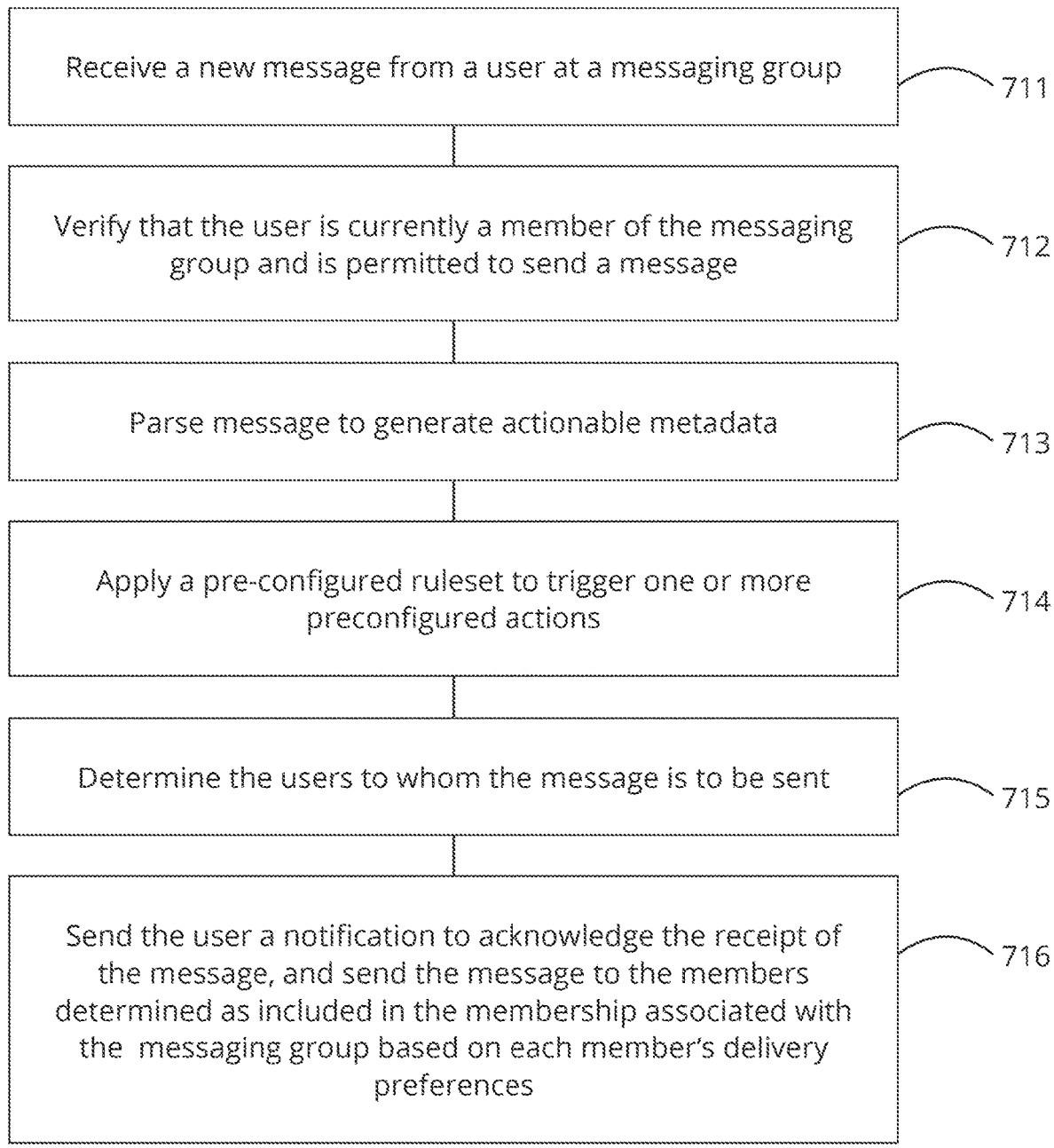

Messaging system 102 is a computing system configured to provide messaging services for users of user devices 106. A computing system may be any digital device. For example, messaging system 102 can manage, facilitate, and operate message communications between a plurality of users of user devices 106. In some embodiments, messaging between users of user devices 106 occur in the following manner, with reference to FIGS. 7A-8. A user first installs the messaging application on user devices 106. The user then connects to messaging system 102 using the messaging application, sign-up (e.g., register for an account) and log in (e.g., with a username and password). The messaging system may be configured to provide to the messaging application a list of user's contacts (e.g., address book) that can be displayed to the user in a contact list. The messaging system may also be configured to inform the user with regard to status of contacts (e.g., offline/online, not to disturb). The user may select a contact in the messaging application, type in a message, and transmit the message to the contact. After the messaging is completed, the user can close the messaging application and/or close the messaging conversation. The messages associated with the conversation can be stored. Upon concluding the messaging conversation, the messaging system may be configured to inform other users with regard to the updated user status (e.g., indicating to other users that the user has logged off).

Messaging system 102 may be implemented on one or more standalone data processing apparatus or a distributed network of computers. For example, messaging system 102 can be implemented at system 900 of FIG. 9. In some embodiments, messaging system 102 can employ a collection of virtual devices and/or services (e.g., third party cloud services) to provide the computing resources and/or infrastructure resources of messaging system 102.

In various embodiments, messaging system 102 may enable any number of users of the messaging application to invite each other to be members of a messaging group to send and receive messages. Messaging system 102 may enable an interface to display messages received by members of the messaging group. Members of the messaging group that are present for the conversation may, in some embodiments, scroll through past messages of the messaging group.

Figure 2A:
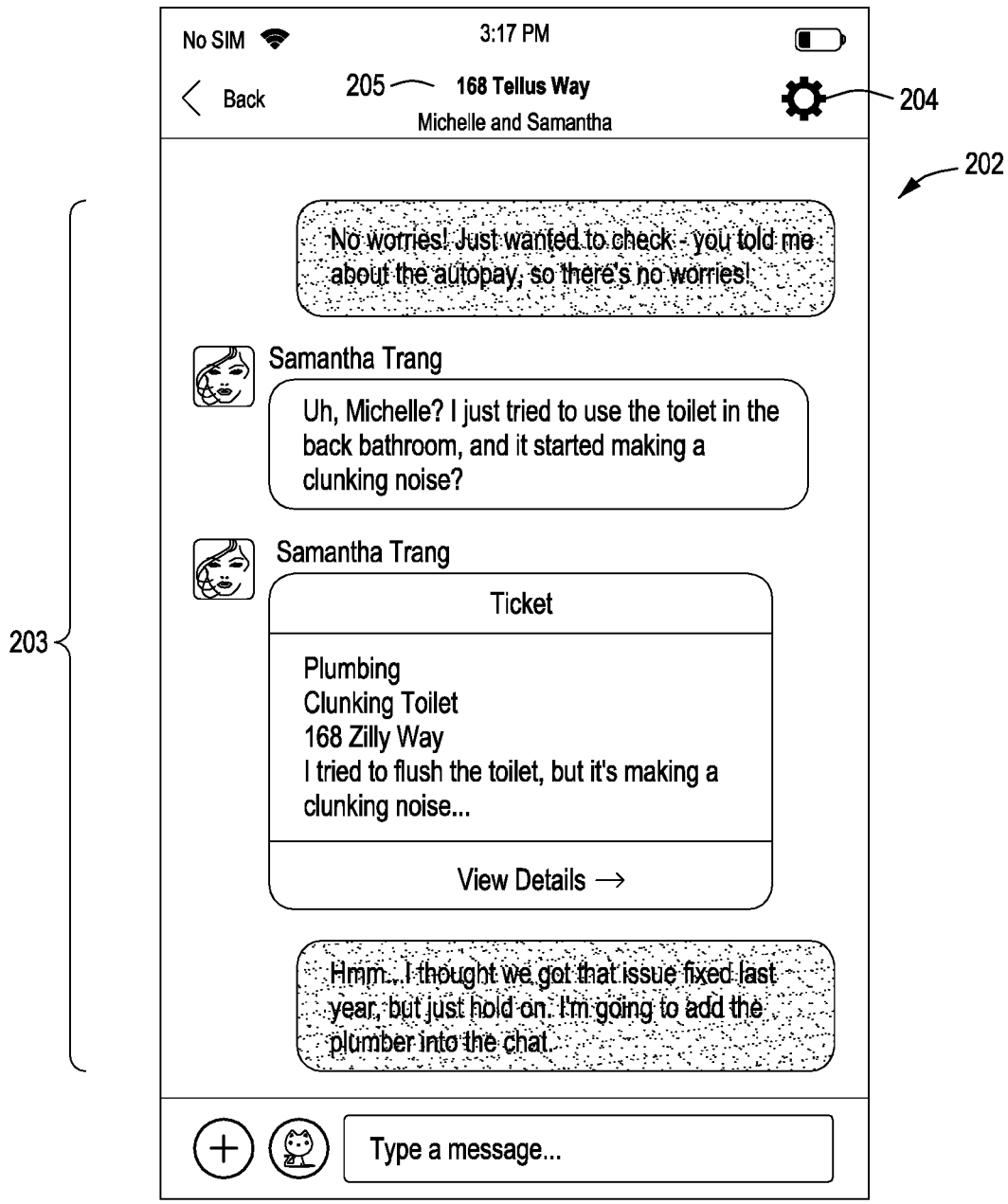
FIGS. 2A-2E are graphical representations of example user interfaces showing example interactions between a user and messaging system 102 of FIG. 1, in accordance with one or more embodiments of the present disclosure.

FIGS. 2A-2E illustrate graphical representations of example user interfaces showing example interactions between a user and messaging system 102 of FIG. 1 for teleporting a new member to a messaging group, in accordance with an embodiment of the present disclosure. The following illustrates FIGS. 2A-2E with simultaneous reference to FIGS. 7B-7C and FIG. 8. For example, as shown in FIG. 2A, GUI 202 is displayed at a first user's device (e.g., user Michelle of user devices 106 of FIG. 1). GUI 202 can be a GUI of a messaging application that, by interacting with messaging system 102, is configured to send and receive messages from one or more users (e.g., members of the messaging group). As shown herein, GUI 202 includes a thread of message history (e.g., a plurality of previous messages) 203 that were previously exchanged between the first user (Michelle) and a second user (Samantha) on a messaging channel bearing a label 205 as "168 Tellus Way" and "Michelle and Samantha" at the top of GUI 202. In this example, the first user Michelle and the second user Samantha form a messaging group and thereby becoming members to the membership associated therewith.

As shown herein, thread of message history 203 associated with the messaging group is presented in a conversational view following a chronological order. In particular, messages of thread of message history 203 are displayed in a chronological order from top to bottom where the oldest previous message is displayed at the top of GUI 202 and the most recent previous message is displayed at the bottom of GUI 202. It will be appreciated that messages may be displayed in chronological order, reverse chronological order, based on a search or filter criteria, and/or the like.

Further, messages from respective users in thread of message history 203 can be distinguished with a text background color in GUI 202. In particular, previous messages from the first user Michelle in a thread of message history 203 are presented with a background color of blue (shown as hatched line herein) in GUI 202, whereas previous messages from the second user Samantha are presented with no background color in GUI 202.

Figure 2B:
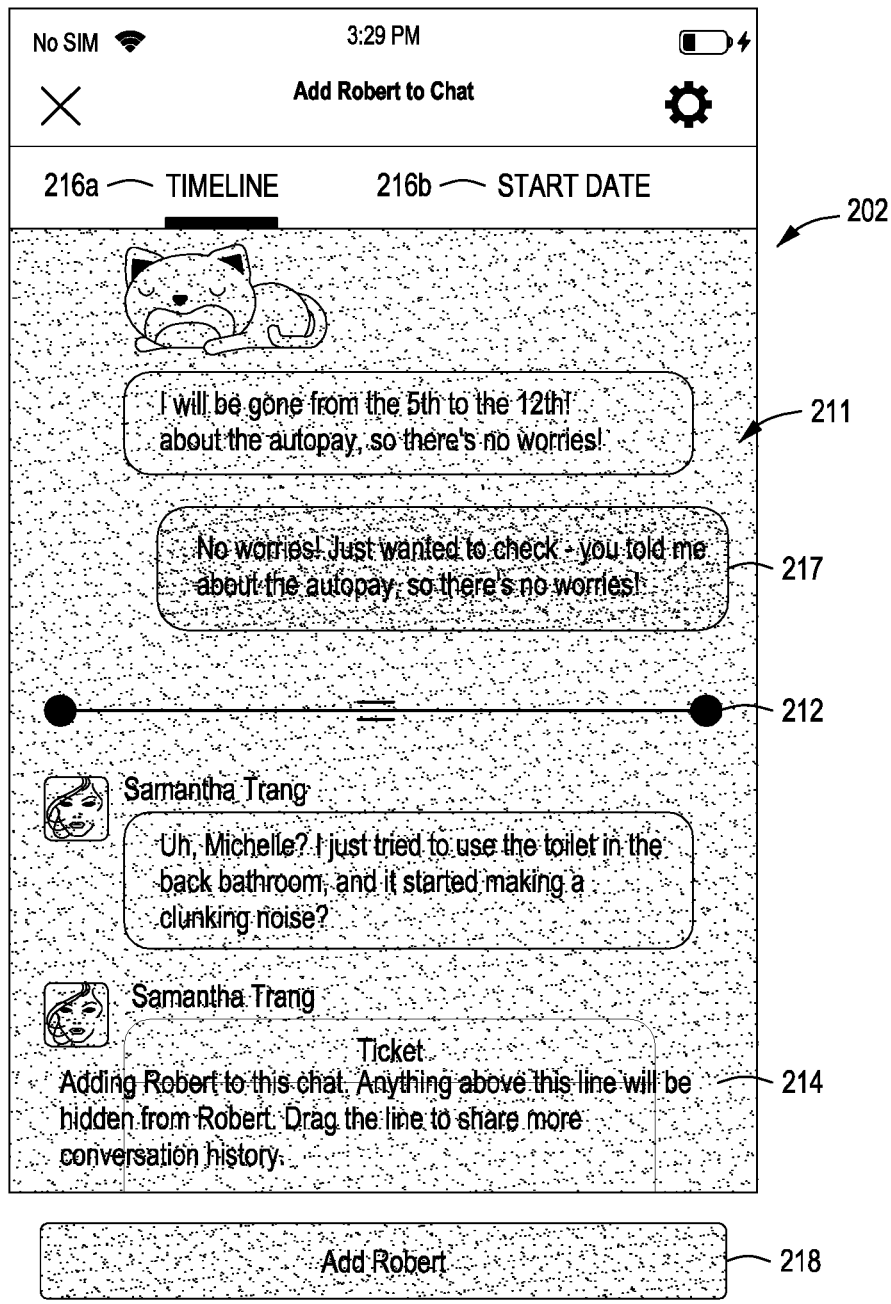

GUI 202 includes a gear 204 that the user can interact with to select a new member for teleporting to the existing messaging group. FIG. 2B illustrates GUI 202 after the first user Michelle has interacted with gear 204 and successfully selected a new user (e.g., a third user) Robert as the new member to be teleported to the messaging group. Details with regard to how a new user can be selected and/or identified via interacting with gear 204 are described below with reference to FIGS. 3A-3D and FIG. 3I.

In this illustrated example, a silhouette overlay 211 is superimposed on top of a portion of GUI 202 to allow the first user Michelle to enter into a mode of choosing an insertion point in the thread of message history. In this example, Michelle may select an insertion point associated with the teleportation of Robert into the messaging group. The insertion point may indicate a point in time of the timeline (e.g., during the conversation of the messaging group, the insertion point being chronologically after some messages between members of the messaging group and before other messages between members of the messaging group). When Robert is teleported into the messaging group, Robert is able to view past messages of the messaging group up to the insertion point but not before (e.g., Robert is able to view the past messages chronologically of the messaging group up to the point of the insertion point but not any messages between members of the messaging group that was received chronologically before the insertion point).

In this particular stage, the user is assisted with a timeline-based mechanism to select an insertion point for teleportation. As shown herein, a "TIMELINE" button 216 a is displayed with an underlying bar, indicating that the timeline mode is the currently active mode for new member teleportation. Alternatively, the user can click on a "START DATE" button 216 b to manually select a date and time as the insertion point for teleportation, the details of which are described below with reference to FIG. 3F.

As shown herein, silhouette overlay 211 includes a visual bar 212 and a reminder text area 214. Visual bar 212 can be dragged by the user along the timeline associated with the thread of message history of the current message group. Once dropped above a particular previous message of thread of message history 203, a corresponding point of time is determined at the timeline such that all the previous messages that have been communicated thereafter are to be shared with the new member. In other words, the new member is teleported at the historical point of time of the timeline identified by the position of visual bar 212. In this example, once dropped above a particular previous message 217 of thread of message history 203, the first user clicks on a "Add Robert" button 218 to teleport the new user Robert to the current messaging group.

Figure 7C:
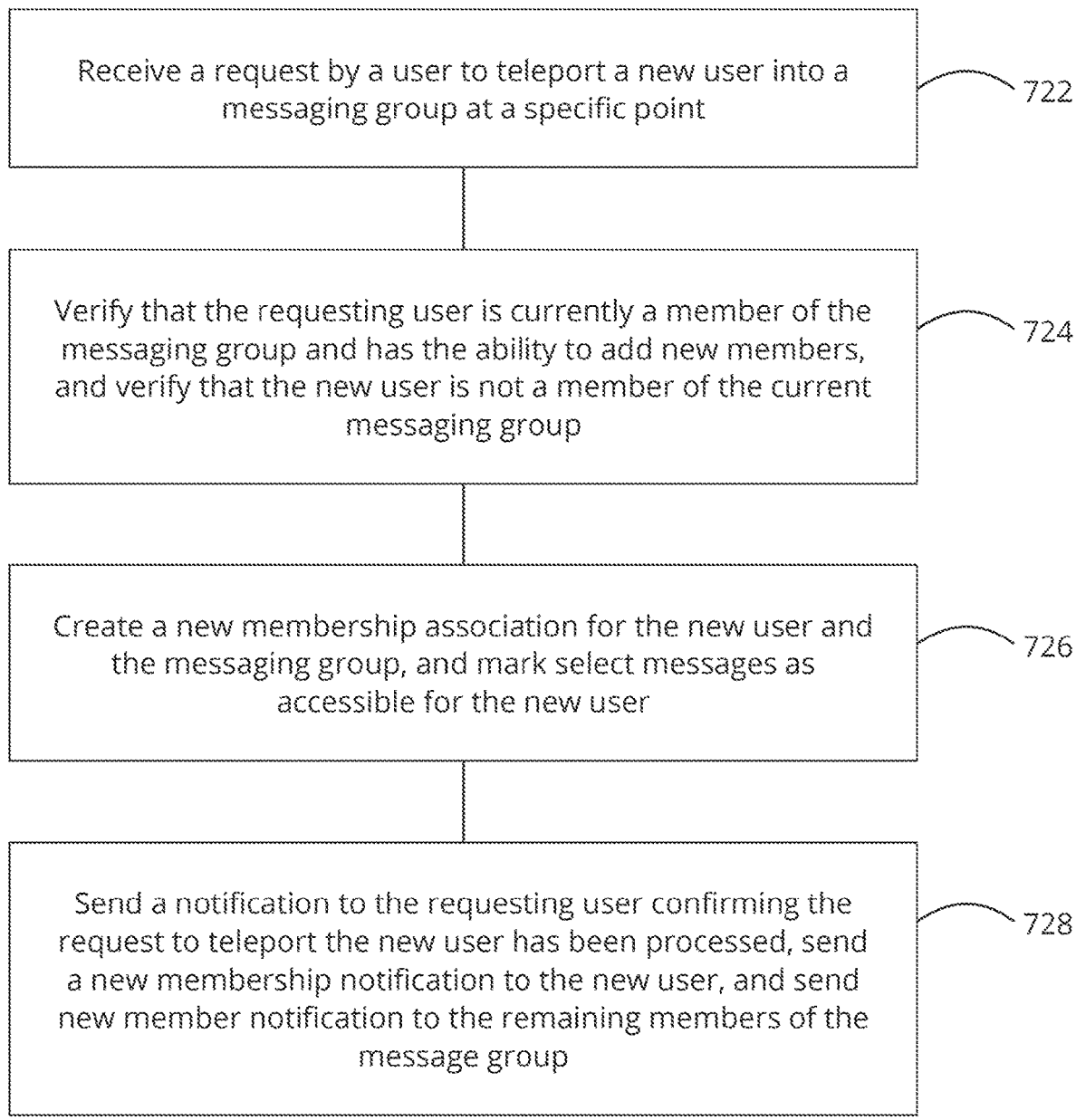
Figure 7D:
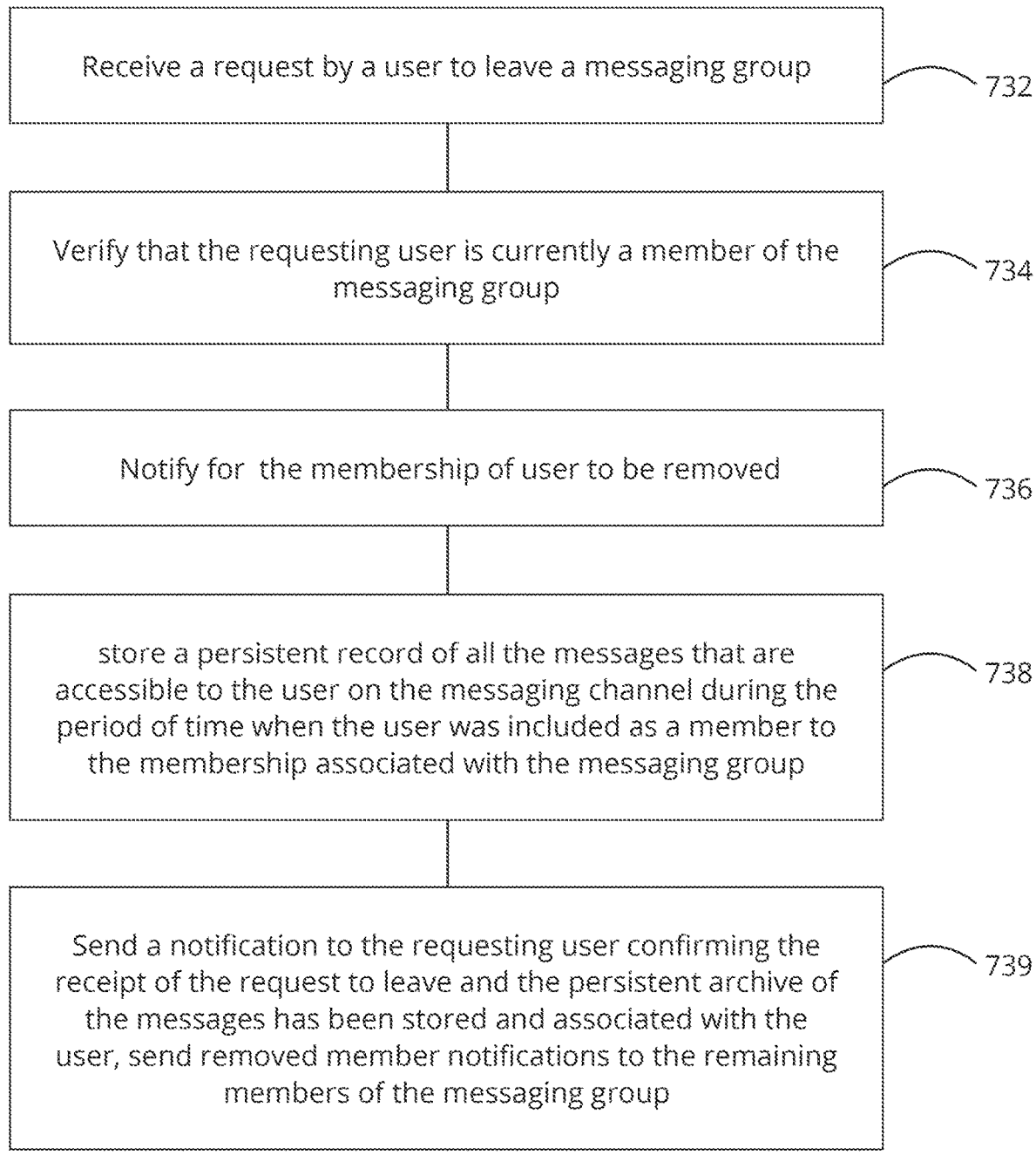
Figure 7E:
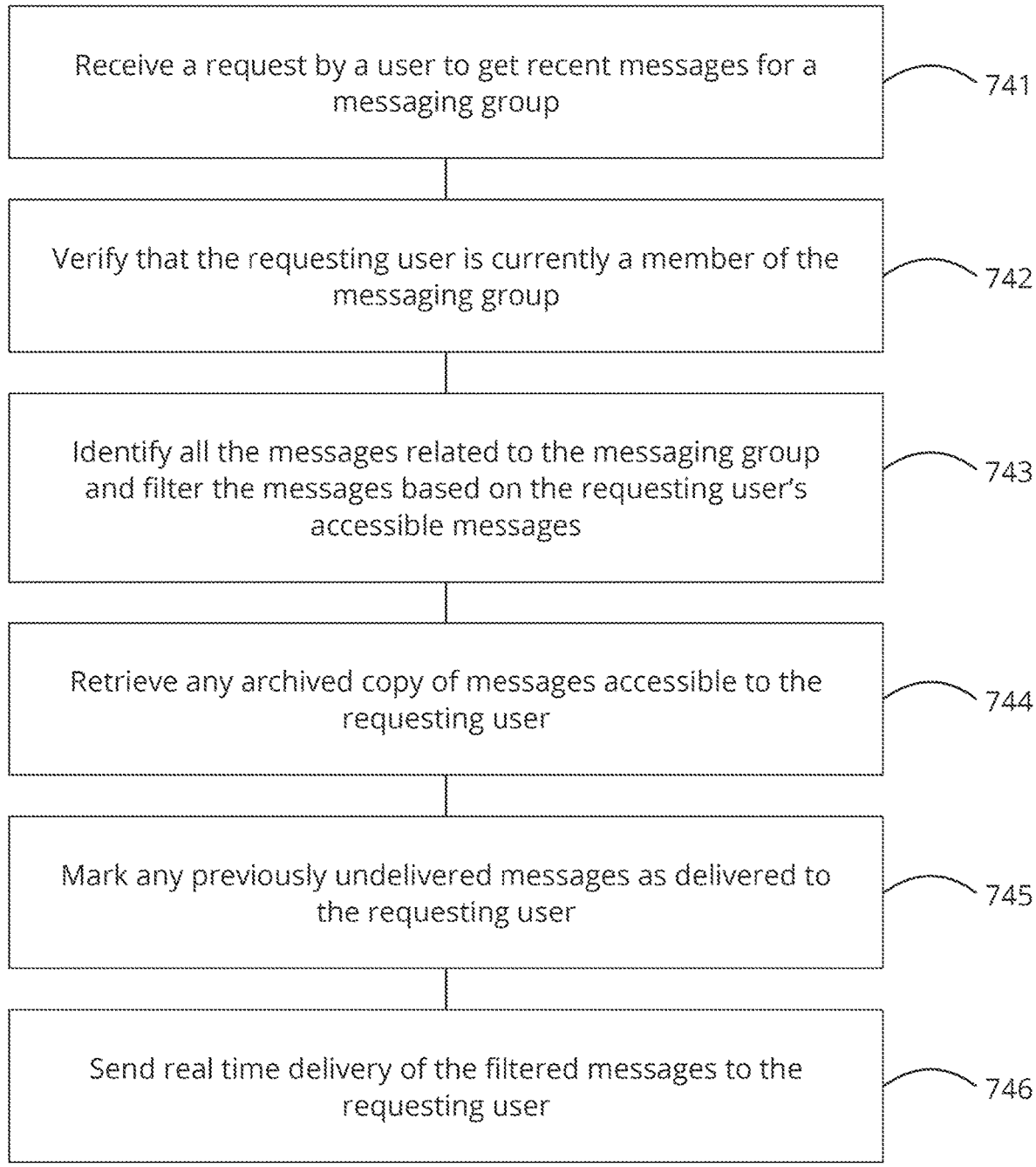

Now with reference to FIG. 7C, at 722, upon the user selection of "Add Robert" button, an API interface 806 of messaging system 800 is configured to receive a request to teleport a new member (e.g., Robert) to the messaging group. The request may identify the messaging group (e.g., using a messaging group identifier), the user (e.g., a user identifier) to be added, as well as insertion information as the historical point of time (e.g., a timestamp) corresponding to the position of visual bar 212 along the timeline.

At 724, membership manager 802 is configured to verify that Michelle is included in the membership associated with the messaging group, and Robert is not included in the membership associated with the messaging group. Membership verification may, in some embodiments, also check to ensure that Michelle has sufficient permissions to modify the memberships of the current message group. Next, at 726, teleporter 810 is configured to add Robert as a new member to the membership associated with the messaging group, as well as record which portion of the thread of message history of the messaging group is going to be accessible to the new member Robert. At 728, delivery module 807 is configured to send Michelle a notification to acknowledge the receipt and processing of the request to teleport Robert, and send a new membership notification to the new member Robert (e.g., send a notification to Robert according to his pre-configured delivery preference such as in real time manner or in an asynchronous manner). In some embodiments, additional new membership notifications are sent to other members of the current message group (e.g., send a notification to members in the current message group other than Michelle and Robert according to their individually pre-configured delivery preference such as in real time manner or in an asynchronous manner).

In some embodiments, the adding user (e.g., Michelle) of the messaging group may confirm that the user to be added (e.g., Robert) is active (e.g., has an active status) and may be added to an existing conversation of the messaging group. In various embodiments, the adding user of the messaging group may add an inactive user to the existing conversation of the messaging group. In one example, when Robert activates the messaging application, Robert may be able to immediately engage with the messaging group and/or see past messages up to the insertion point. In another example, if Robert activates the messaging application and the conversation of the messaging group is over, Robert may be able to see the past messages up to the insertion point.

It will be appreciated that a conversation of a messaging group may be ongoing over time. For example, members of the messaging group may begin receiving and sending messages intermittently or over time (e.g., days or even weeks after the last message was sent). Such messages may still be received by the messaging group. Alternately, the messaging group may be terminated (e.g., by an administrator or one or more members of the messaging group). Past messages of a terminated messaging group may or may not be available to past members of that messaging group.

Figure 2C:
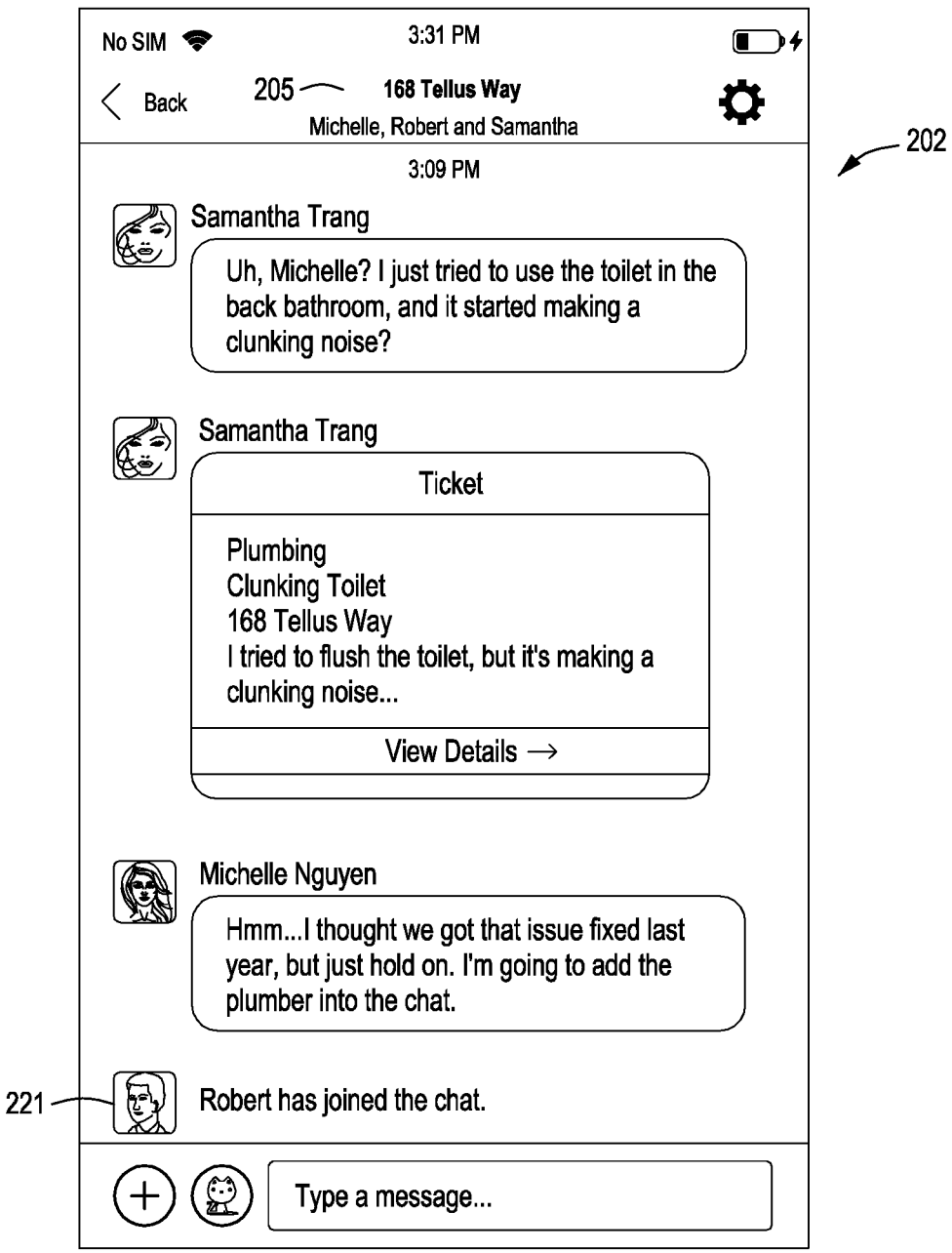

FIG. 2C illustrates GUI 202 after the first user Michelle has teleported Robert to the messaging group. As shown herein, label 205 has been updated to display "168 Tellus Way" and "Michelle, Robert and Samantha" at the top of GUI 202. Additionally, an indication 221 is also displayed to indicate that the third user (e.g., the new member Robert), has joined the messaging group. From this point on, the membership of the messaging group has changed from Michelle and Samantha to including Michelle, Robert, and Samantha.

Figure 2D:
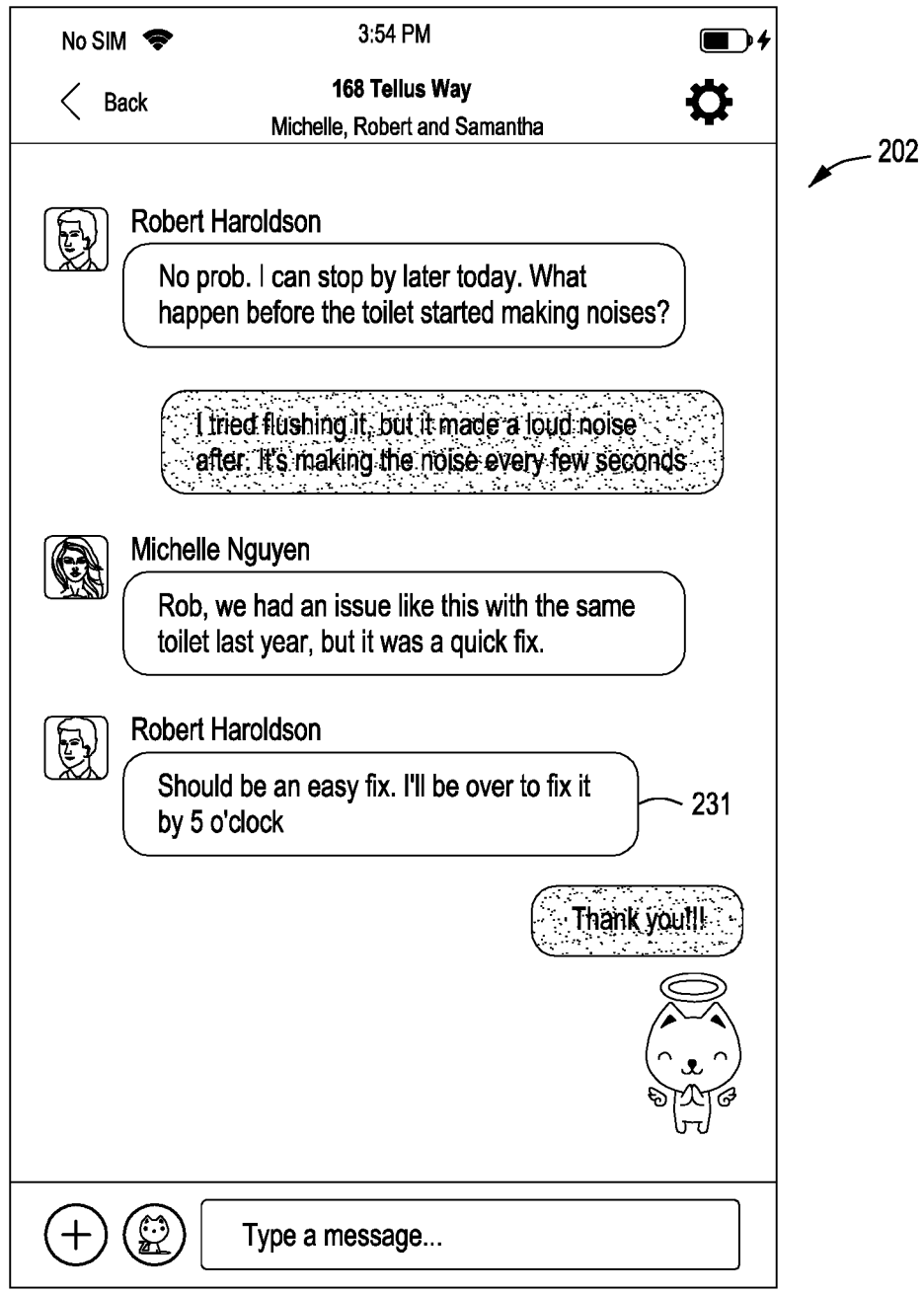

FIG. 2D illustrates GUI 202 at a temporal duration when the third user (e.g., new member Robert) becomes a member to the messaging group. As shown herein, as a new member of the messaging group, the third user Robert starts to send messages 231 to the messaging group, and the second user Samantha starts to exchange messages with Robert. With simultaneous reference to both FIGS. 7E and 8, at this point and illustrated at 741, API interface 806 is configured to receive a request from a user to retrieve messages related to the messaging group. At 742, membership manager 802 is configured to verify that the user is a member included in the membership associated with the messaging group. At 743, channel manager 804 is configured to identify all the messages related to the messaging group. For example, the messages can include the entire message history associated with the messaging group or a recent portion thereof. Channel manager 804 is further configured to filter the messages to determine the messages that are accessible to the user. For example, for user Robert, he only has access to the messages starting from the chronological point in time as marked by the insertion point. At 744, archiver 818 is configured to retrieve an archived copy of messages accessible to the user at the messaging group, if the determined messages at 743 are of a number less than what is requested. At 745, channel manager 804 is configured to mark that any previously undelivered messages are delivered to the user based on the receipt information associated with the messages. At 746, delivery module 807 is configured to send the messages to the user in a real time manner.

Figure 2E:
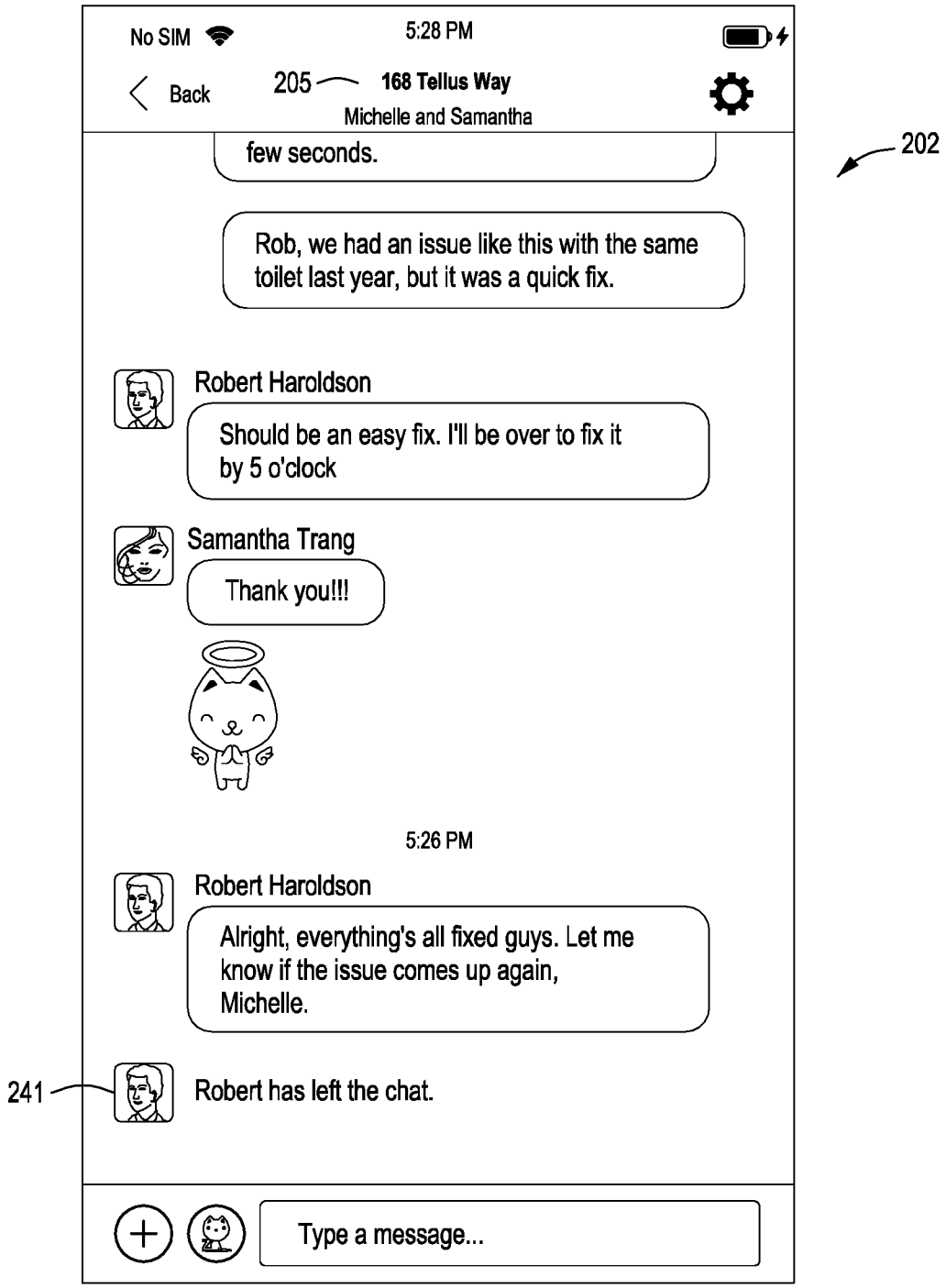

FIG. 2E illustrates GUI 202 after the third user (e.g., new member Robert) leaves the messaging group. In some embodiments, Robert can either leave the messaging group by removing himself therefrom, or other users (e.g., the first user Michelle) can remove Robert from the messaging group, more details of which are described below with reference to FIGS. 3D-3E. For example, with reference to FIG. 7D, at 732, upon the user (Robert) selecting to leave the messaging group, an API interface 806 of messaging system 800 is configured to receive a request to leave the messaging group. The request to leave the messaging group may identify the messaging group and the user (e.g., user identifier) to leave the messaging group. In this example, the request indicates that Robert is the user who intends to leave the messaging group. At 734, membership manager 802 is configured to verify that Robert is presently included in the membership associated with the messaging group. Next, at 736, message archiver 818 is configured to notify membership manager 802 and channel manager 804 so that Robert is to be removed from the membership associated with the messaging group. Further, at 738, message archiver 818 is optionally configured to store a persistent record of all the messages that are accessible to Robert on the messaging channel during the period of time when Robert was included as a member to the membership associated with the messaging group. At 739, delivery module 807 may optionally be configured to send Robert a notification to acknowledge the receipt and processing of the request to leave the messaging group, to indicate that a persistent archive of the pertinent message history has been stored and associated with his user account, and to send a notification to the other remaining members included in the membership associated with the messaging group (e.g., send a Robert leaving notification to Michelle and Samantha according to their respective pre-configured delivery preference such as in real time manner or in an asynchronous manner). At this point and as shown herein, when Robert has left the messaging group, an indication 241 may be displayed on GUI 202 to inform that Robert is no longer a member to the messaging group. Additionally, label 205 has been further modified to display "168 Tellus Way" and "Michelle and Samantha" at the top of GUI 202. As such, the membership associated with the current messaging group has changed from including Michelle, Robert and Samantha to including Michelle and Samantha.

Figure 7F:
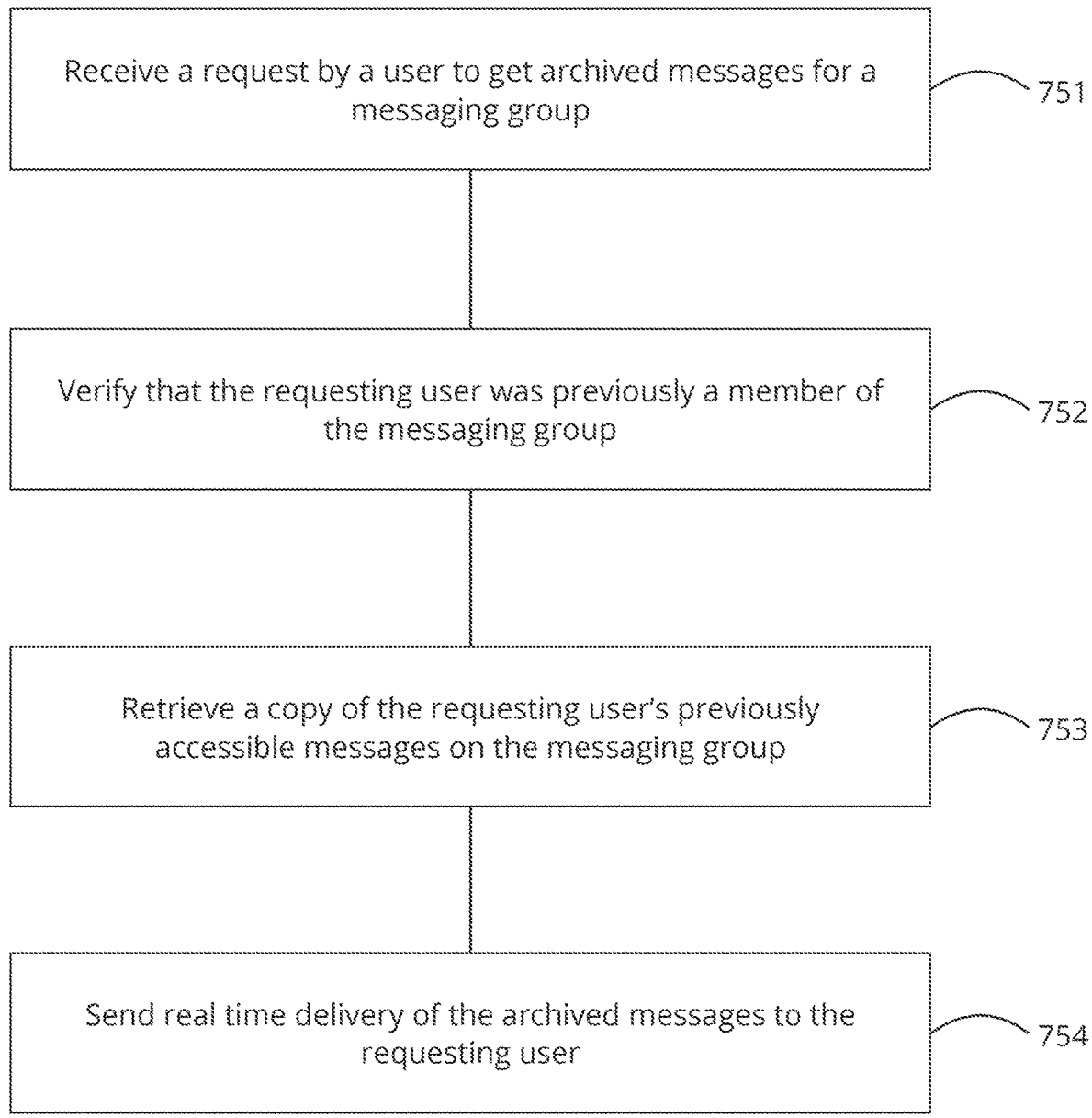

Subsequent to Robert leaving the messaging group as illustrated herein with reference to FIG. 2E, Robert can send a request to messaging system 102 to retrieve respective messages archived in association with his account with regard to the messaging group which he is no long a member to. With simultaneous reference to FIGS. 7F and 8, as illustrated in FIG. 7F, at 751, API interface 806 is configured to receive a request from user Robert to retrieve messages related to the messaging group. At 752, membership manager 802 is configured to verify that user Robert was a previous member to the messaging group. Next at 753, archiver 818 is optionally configured to archive a copy of all the messages that are accessible to user Robert at the messaging group. At this stage, as user Robert is no longer a member to the messaging group, there is no need to transmit any new message to Robert. At 754, delivery module 807 is optionally configured to send the archived messages to user Robert in a real time manner.

Figure 3A:
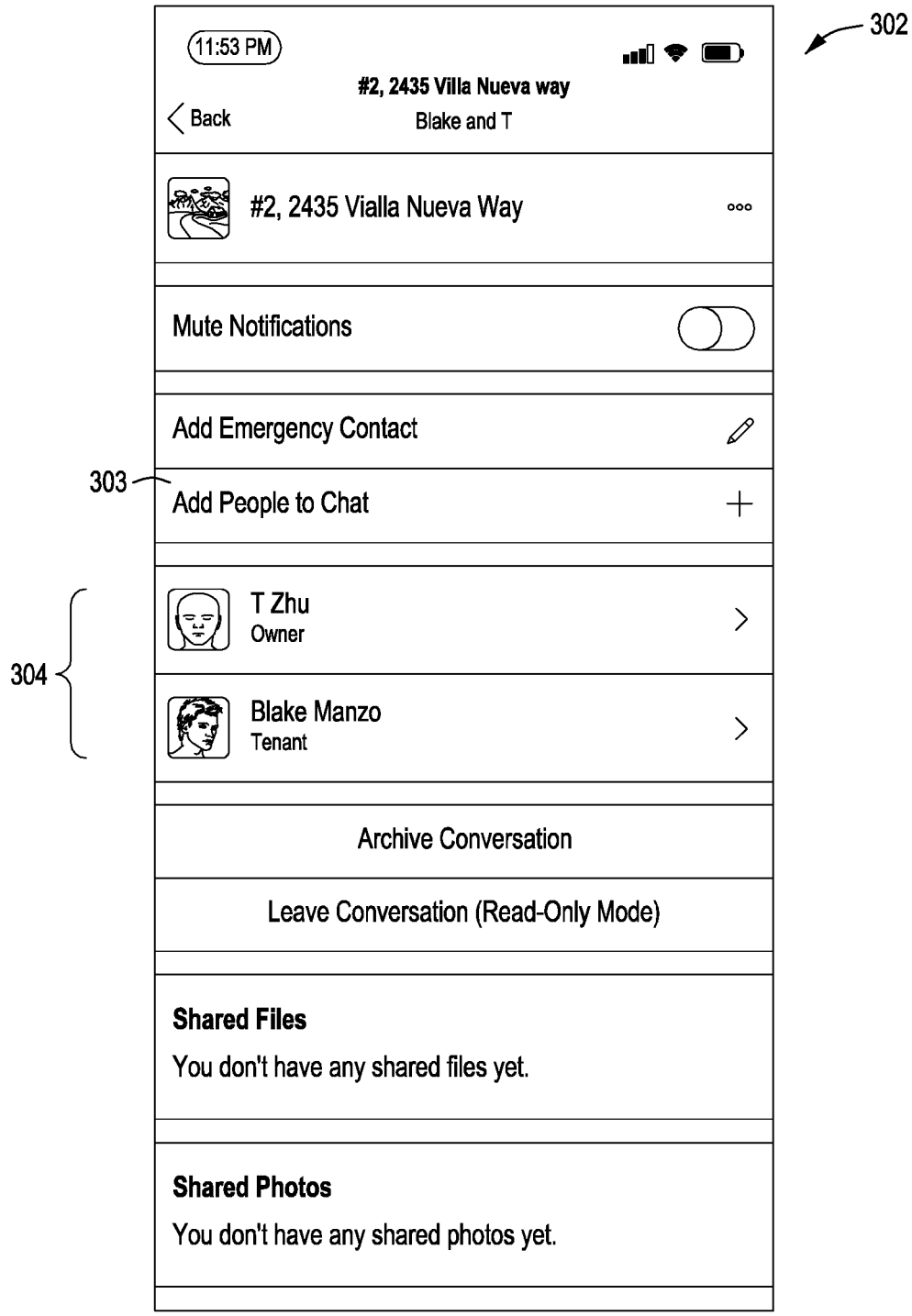
FIGS. 3A-3I are graphical representations of example user interfaces showing example interactions between a user and messaging system 102 of FIG. 1, in accordance with one or more embodiments of the present disclosure.

FIGS. 3A-3I illustrate graphical representations of other example user interfaces showing example interactions between a user and messaging system 102 of FIG. 1 for teleporting a new member to a messaging group, in accordance with an embodiment of the present disclosure. For example, as shown in FIG. 3A, upon a user clicking on gear 204 of GUI 202 in FIG. 2A, GUI 302 is displayed at a first user's device (e.g., user devices 106). As shown herein, GUI 302 includes the current members associated with the messaging group (e.g., a first user T Zhu and a second user Blake Manzo) in a list view 304. In some embodiments, GUI 302 further includes a link 303 to enable the user to add a new member to the messaging group. For example, either the first user or the second user can click on link 303 to add one or more new members to the messaging group.

In some embodiments, it will be appreciated that one or more members of the messaging group may have the option to add a new member to the messaging group. For example, the first member that originated the messaging group may, in some embodiments, have the authority to add additional members to the group while subsequent members added to the group may not have authority to add others (or authority maybe grated by the originating member).

Figure 3B:
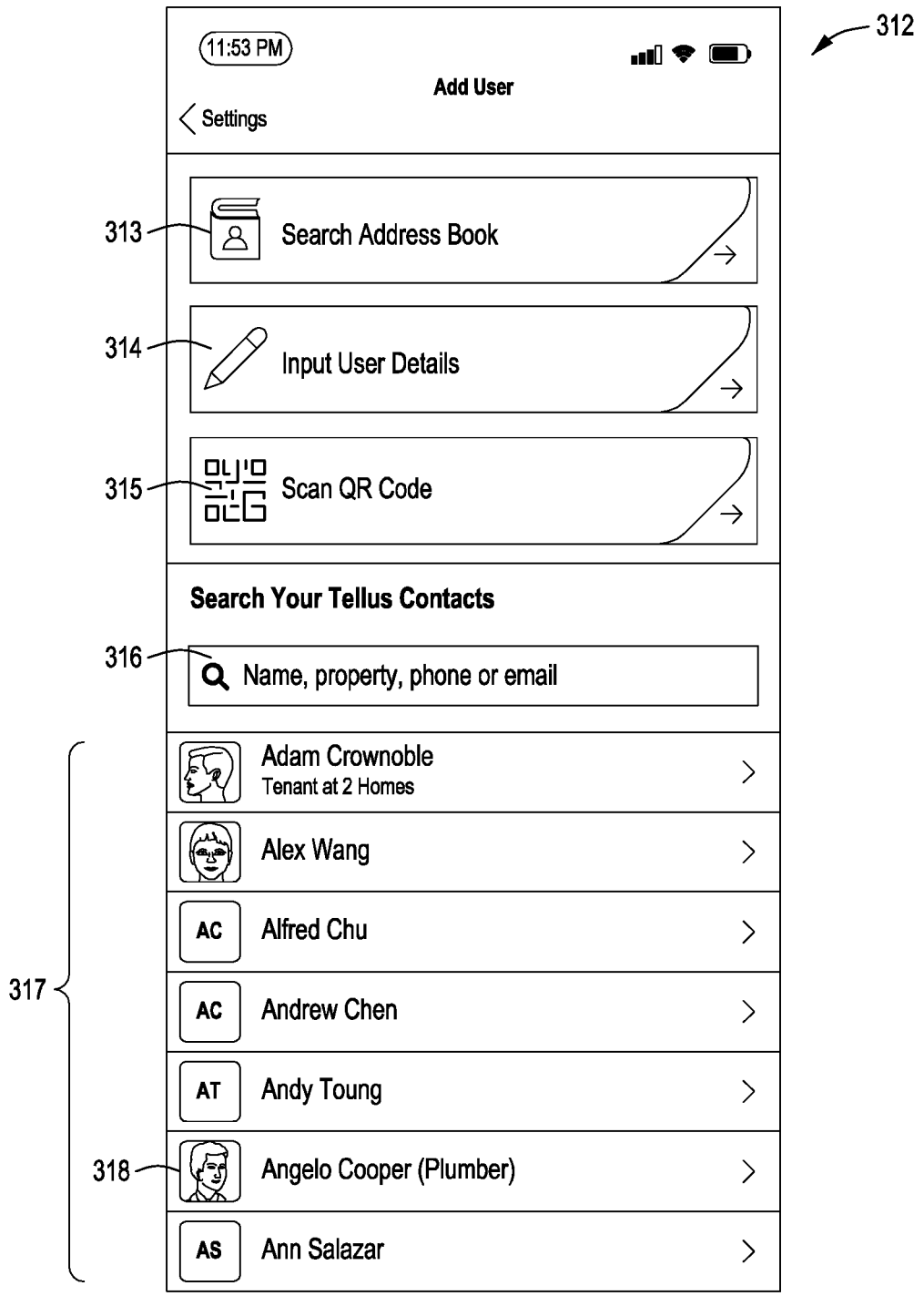

FIG. 3B illustrates a GUI 312 after the user clicks on link 303 of GUI 302 to add a new member to the messaging group. As shown herein, GUI 312 includes a "Search Address Book" link 313, a "Input User Details" link 314, and a "Scan QR Code" link 315, each of which enables the user to identify and select a new member for adding to the messaging group. Additionally, GUI 312 includes a search box 316 such that the user can input search queries pertaining to information such as a user's name, a property's name, address, a user's email address, a user's phone number, and so on, to search for the new user who is intended as the new member to the messaging group. Further, GUI 312 can also include a list of users 317, against which the afore-described search function is performed. In this example, the user selects user Angelo Cooper (the plumber) 318 from the list of users 317.

It will be appreciated that a new member of the messaging group may be added in any number of ways. In some embodiments, the adding user may have the option to input information to "find" a user identified on the messaging system. Although GUI 312 depicts multiple ways to add a member, it will be appreciated that one or more of the options may not be available.

Figure 3C:
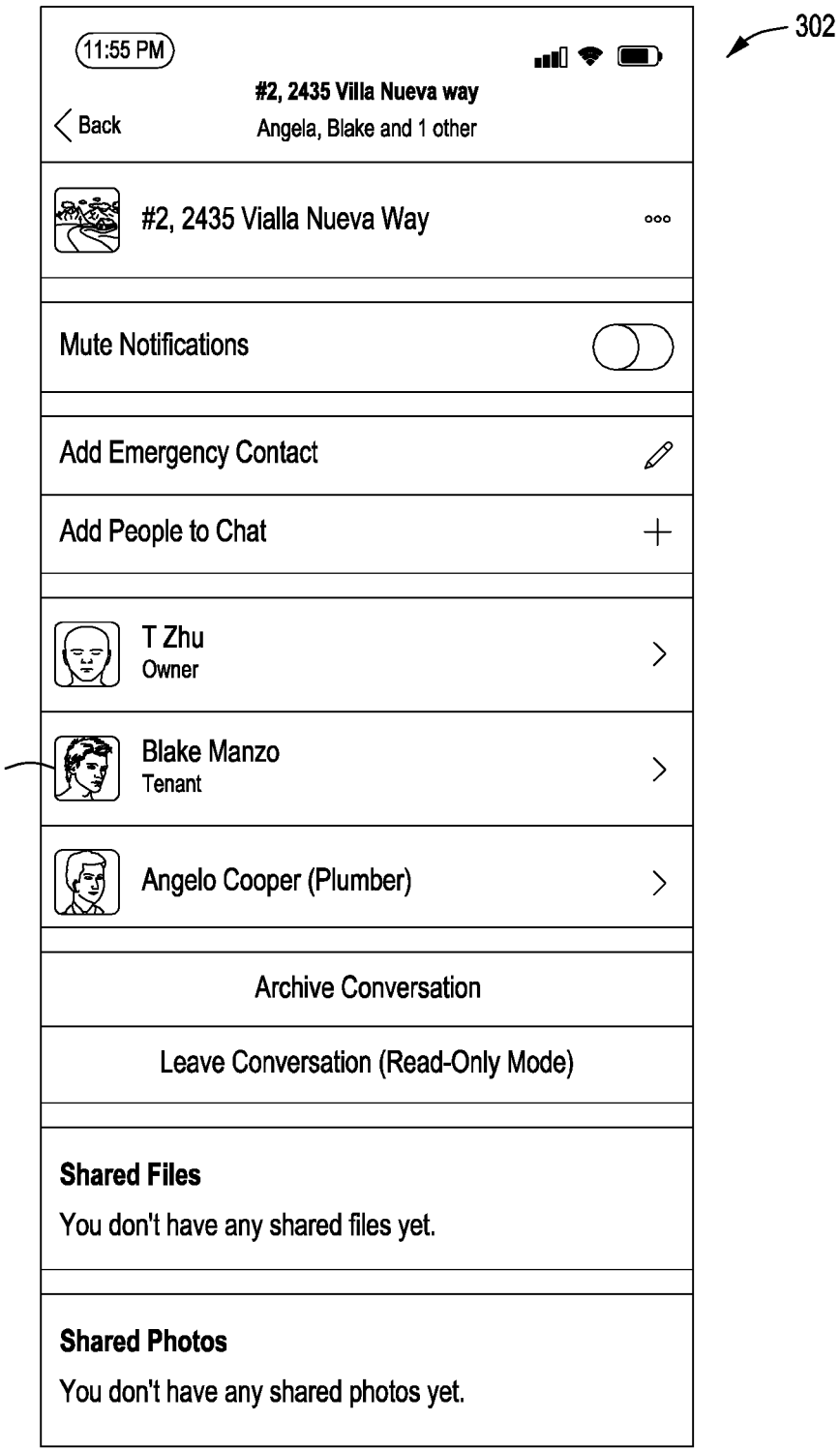

FIG. 3C illustrates GUI 302 after the user selects the new member (e.g., user Angelo Cooper (the plumber) 318) from GUI 312. As shown herein, list view 304 has been modified to display the new member Angelo Cooper (the plumber) in addition to the previous members including T Zhu and Blake Manzo.

Figure 3D:
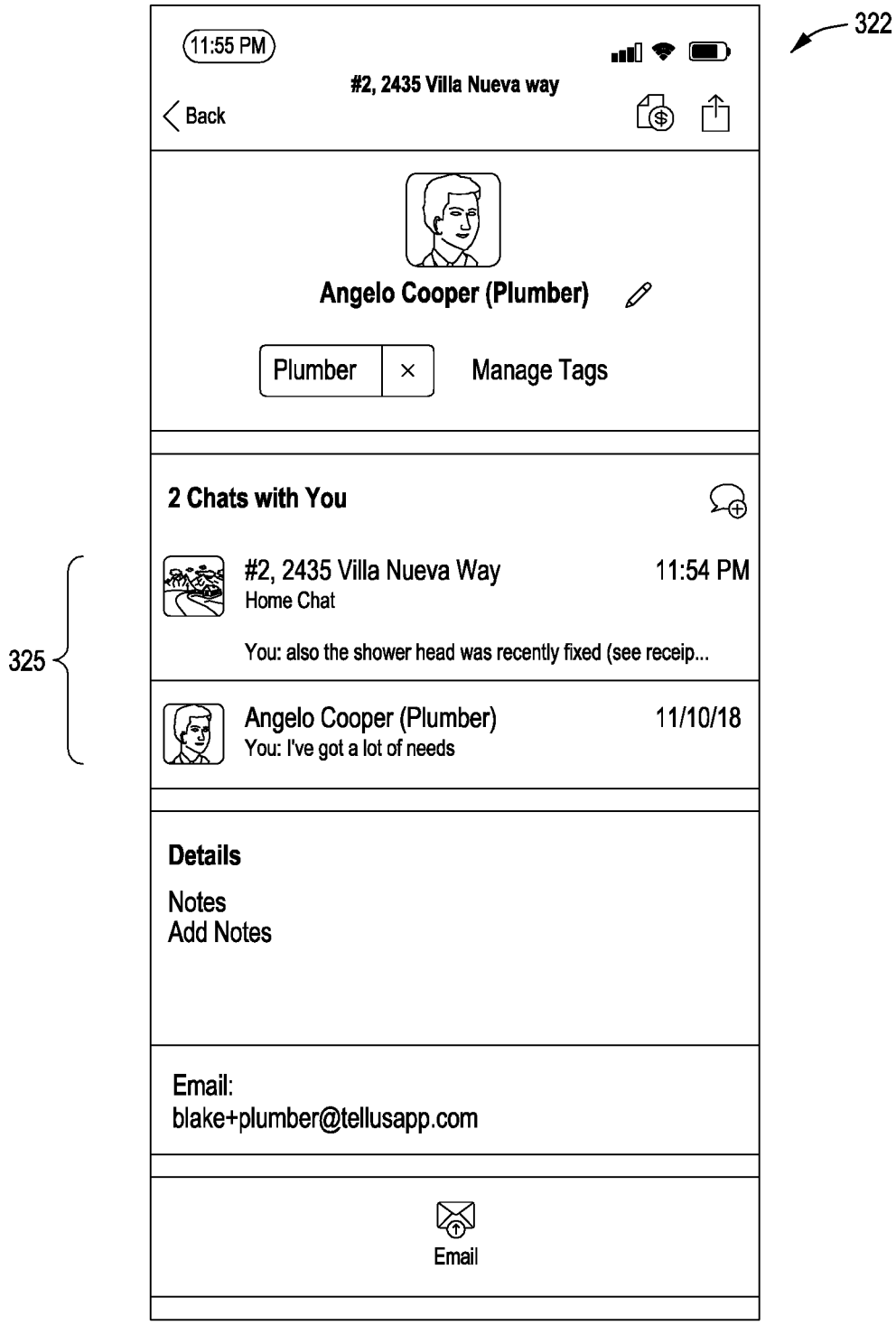

In some embodiments, list view 304 enables the user to click on individual member of the group membership to access further information with regard the respective members. FIG. 3D illustrates a GUI 322 after the user clicks on a current member of the messaging group (e.g., user Angelo Cooper (the plumber) 318) from GUI 312. As shown herein, GUI 322 includes a chat summary 325 displaying messaging groups that the user and Angelo Cooper (the plumber) has been members to. For example, as shown herein, user Angelo Cooper (the plumber) is currently in two messaging groups together with the user: one being the messaging group associated with GUI 302, and the other being the messaging group that is a one-on-one session with the user.

Figure 3E:
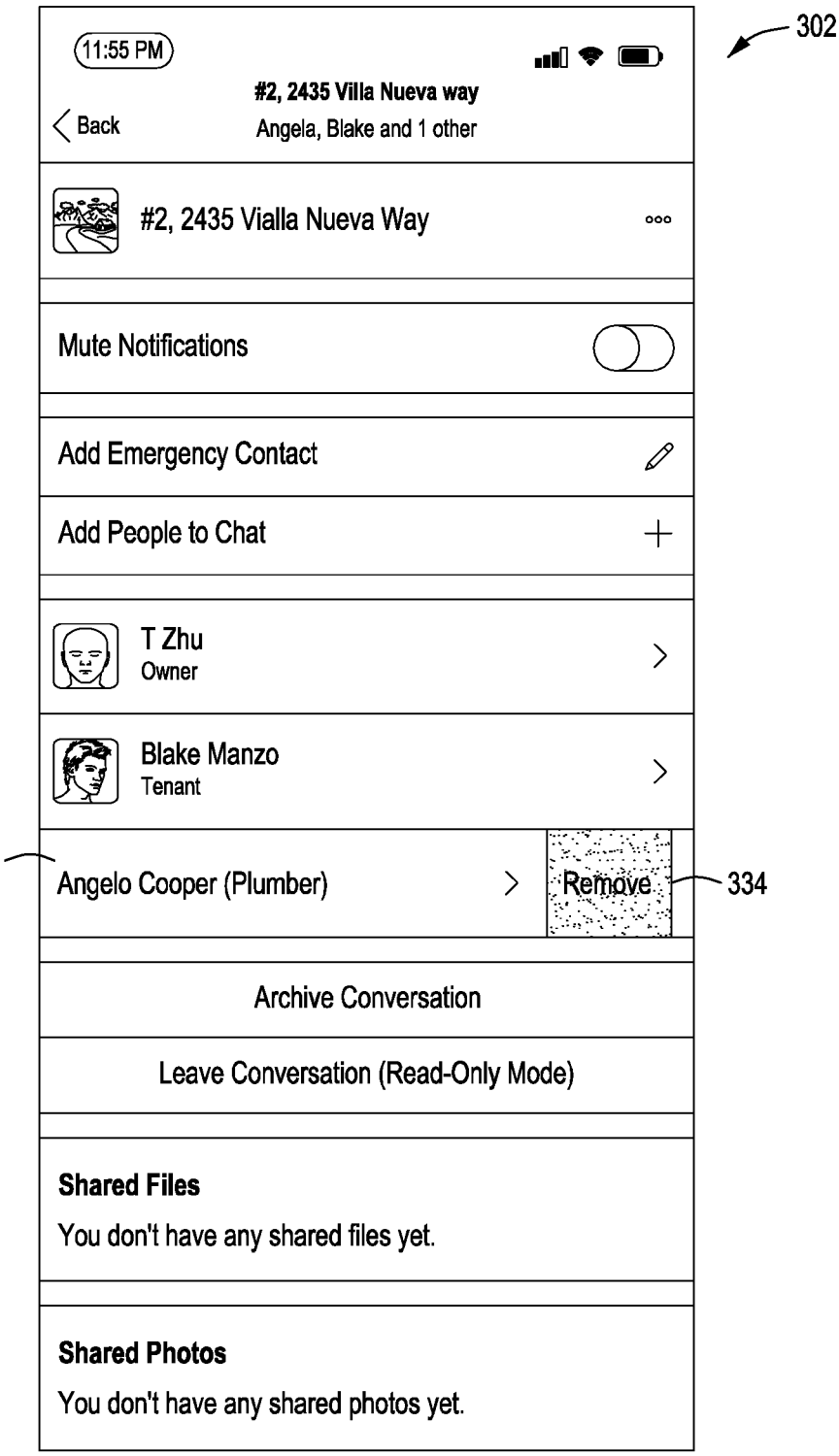
Figure 3F:
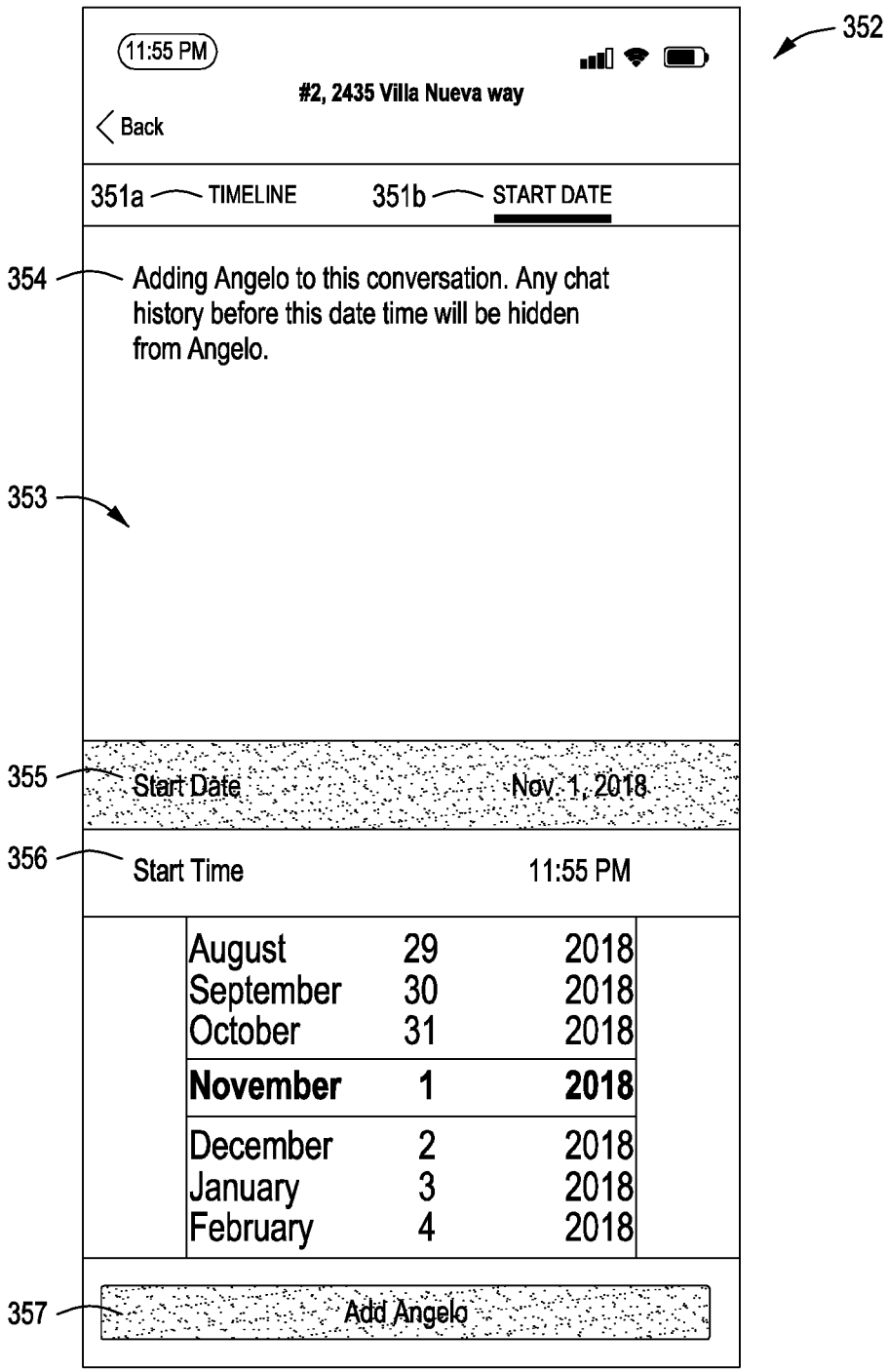

Upon view and/or verifying the detail information of user Angelo Cooper (the plumber) from GUI 322, the user can navigate back to GUI 302. FIG. 3E illustrates GUI 302 at the moment when the user selects to delete or remove the user Angelo Cooper (the plumber) from the current messaging group. As shown herein, selector 332 enables the user to slide leftwards to display a remove button 334. Upon the user clicking on (or otherwise engaging with the) remove button 334, GUI 302 reverts back to GUI 302 illustrated in FIG. 3A, displaying only two members of the current messaging group: T Zhu and Blake Manzo.

Figure 3G:
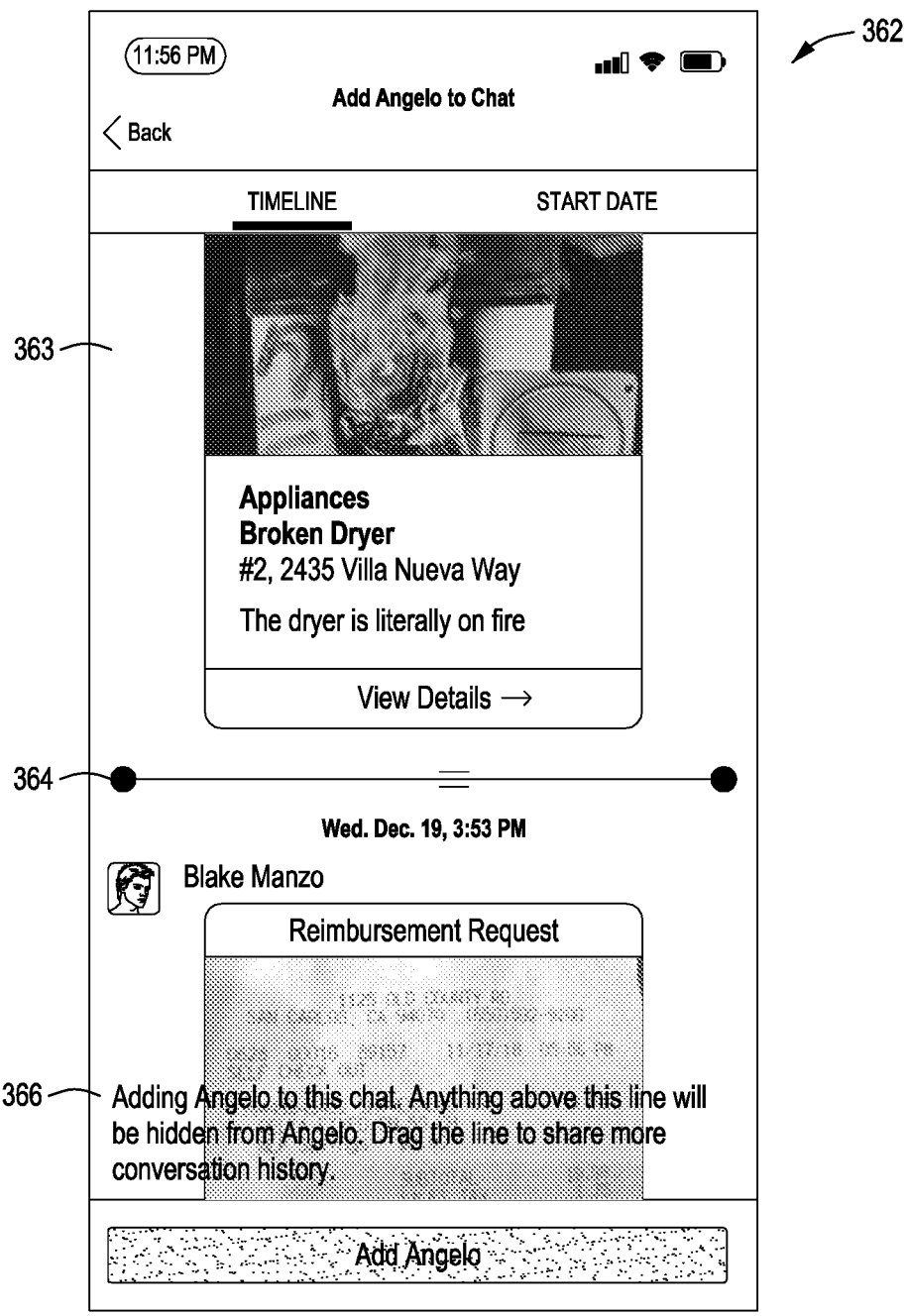
Figure 3H:
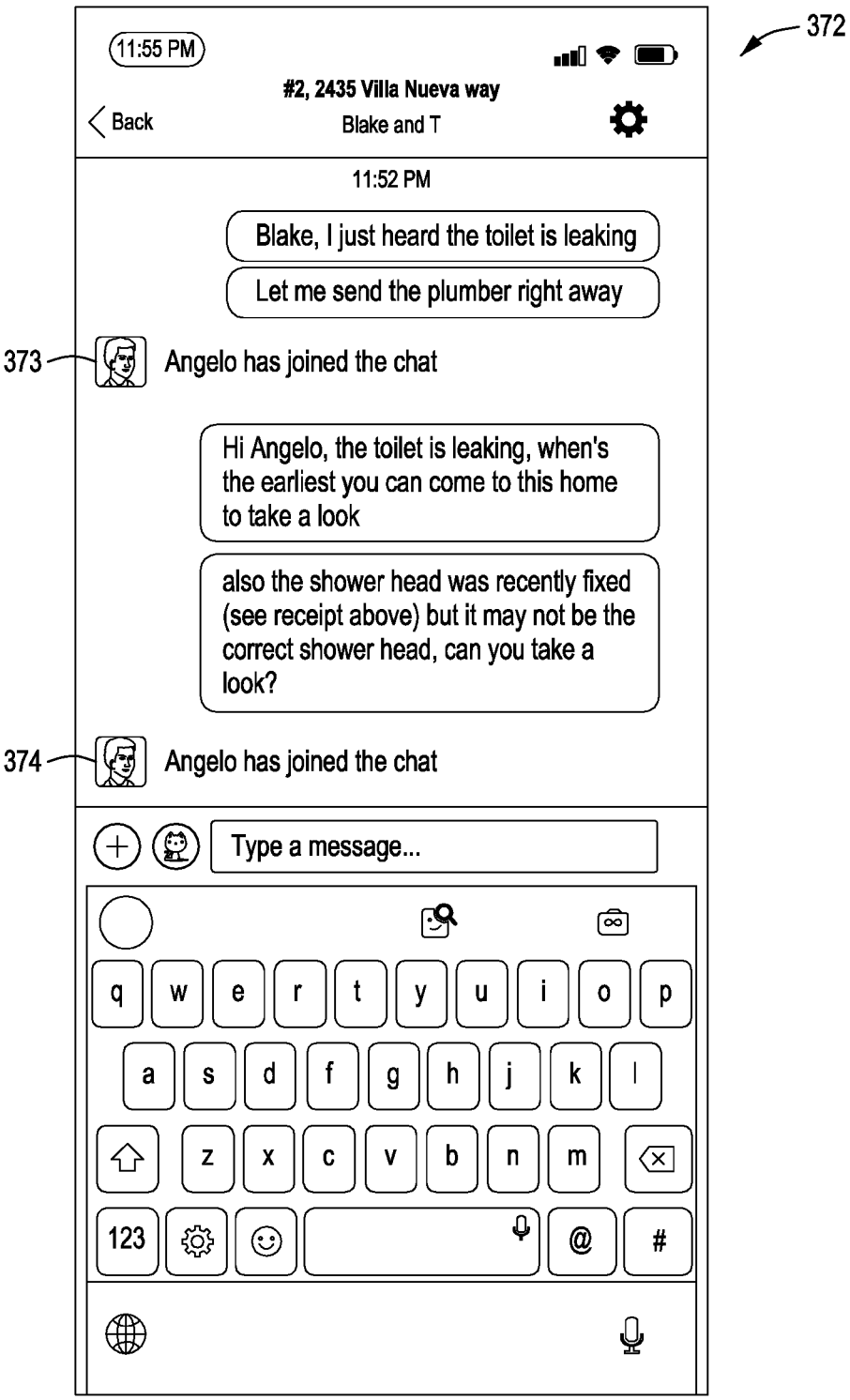
Figure 3I:
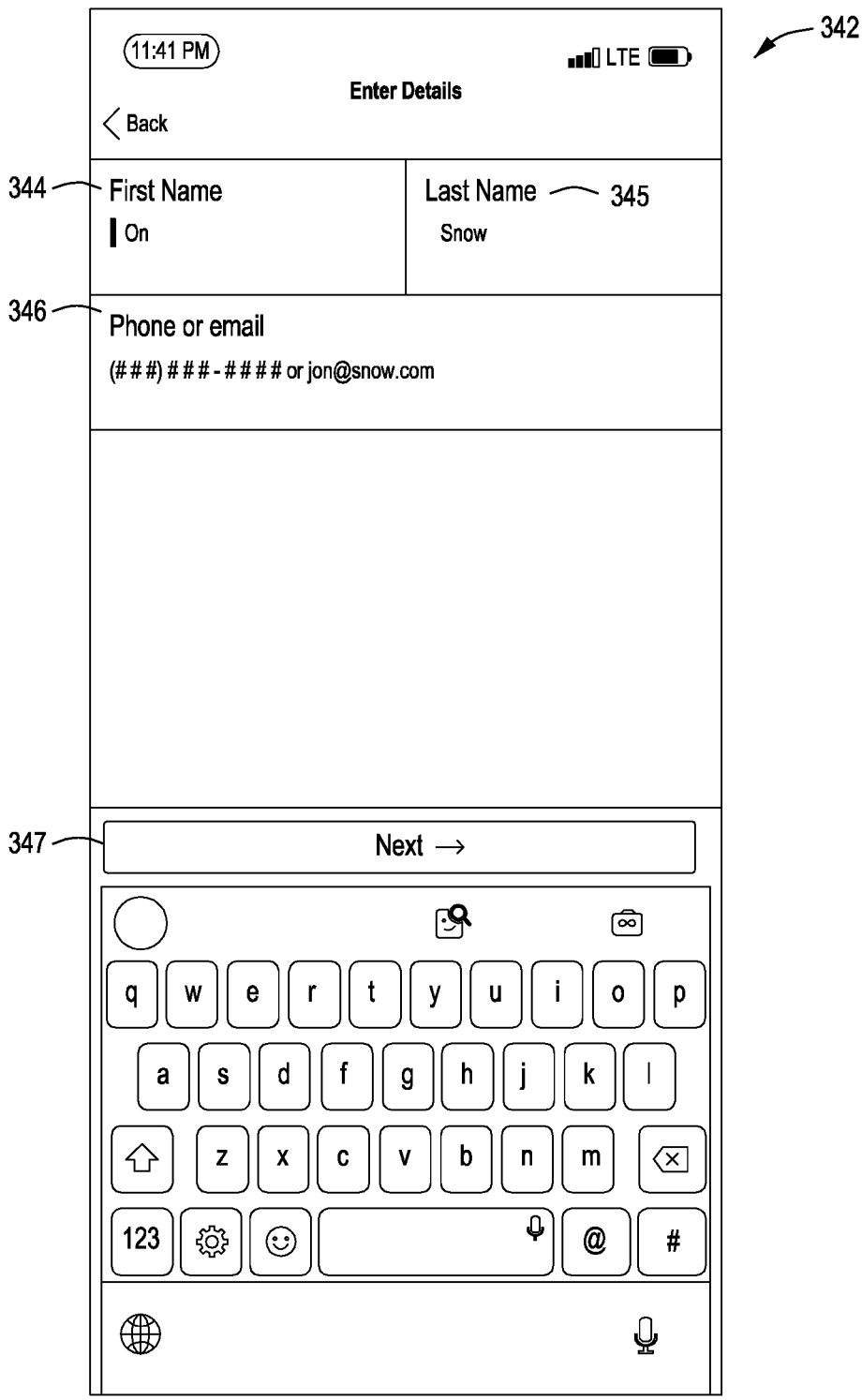

Now referring to FIG. 3I, which illustrates a GUI 342 after the user interacts with the "Input User Details" link 314 on GUI 312. As shown herein, the user is enabled to enter a new user or member's information by inputting a first name at input box 344, a last name at input box 345, and/or a phone number and/or email address of the new user at input box 346. Upon providing at least one of the pairs of the first name and the last name of the new user, and/or the phone number or email information of the new user, the "Next" button 347 is enabled for the user to click on to transit to another GUI (not shown), at which an invitation can be sent to the new user identified with the above-described user detail information to join the messaging group. In some embodiments, the invitation can include a link for the new user to download the same messaging application that is installed and executing on the user devices of the existing members of the messaging group. The invitation may be sent by the messaging system to a messaging application on the invited user's user device.

Now referring back to FIGS. 3F-3H, which illustrate a series of GUIs after the user has selected Angelo Cooper (the plumber) at GUI 302 of FIG. 3C as the new member to be teleported to the current messaging group. In this illustrated example, the user is presented with a GUI 352, which enables the user to manually select a date and/or time to as the insertion point for teleporting Angelo Cooper (the plumber). As shown herein, a "START DATE" button 351 b is displayed with an underlying bar, indicating that the manual mode is the currently active mode for new insertion point selection. Alternatively, the user can click on a "TIMELINE" button 351 a to use a timeline associated with the thread of message history to determine or view the insertion point for teleportation.

It will be appreciated that the insertion point may be placed at any point along the timeline and in any manner. In some embodiments, the insertion point may be responsive to a user's touch screen thereby enabling the user to slide the insertion point up and down a conversational timeline (e.g., the user being able to view the messages and choose a position within the messaging threat that enables the new user to see some but not other messages).

In this illustrated example, a silhouette overlay 353 is superimposed on top of a portion of GUI 352 to display a reminder text area 354. As shown herein, reminder text area 354 informs the user that the user is "adding Angelo to this conversation. Any chat history before this date and time will be hidden from Angelo." GUI 352 further includes a date selector 355 and a time selector 356. As shown herein, the user has interacted with a date and time picker to select "Nov. 1, 2018" as the start date and "11:55 PM" as the start time for teleporting Angelo into the current messaging group. GUI 352 also includes an "Add Angelo" button 357, the selection of which by the user triggers teleporting Angelo to the current messaging group at the selected insertion point in the thread of message history.

FIG. 3G illustrates a GUI 362 after the user clicks on "TIMELINE" button 351 a subsequent to manually selecting an insertion point defined as "Nov. 1, 2018, 11:55 PM" at GUI 352. In this illustrated example, a silhouette overlay 363 is superimposed on top of a portion of GUI 362 to display a reminder text area 366, as well as a visual bar 364. At this stage, the portion of GUI 362 is caused to display a corresponding portion of the thread of message history associated with the current messaging group such that visual bar 364 is aligned at a point corresponding to the selected date and time along the timeline of the thread of message history. In particular, visual bar 364 is displayed at the top of a previous message sent on Wed., December 19, 3:53 PM.

FIG. 3H illustrates a GUI 372 displaying a portion of the thread of message history between the time when Angelo has been teleported to the messaging group (e.g., indication 373) and when Angelo has left the messaging group (e.g., indication 374). In some embodiments, after Angelo has left the messaging group, Angelo may no longer have access or rights to view messages in the messaging group after Angelo leaves the messaging group. In various embodiments, after Angelo leaves the messaging group, Angelo may have access or be able to view messages for the duration of time when Angelo was a member of the messaging group (e.g., from the insertion point to the time that Angelo was no longer a member).

Figure 4A:
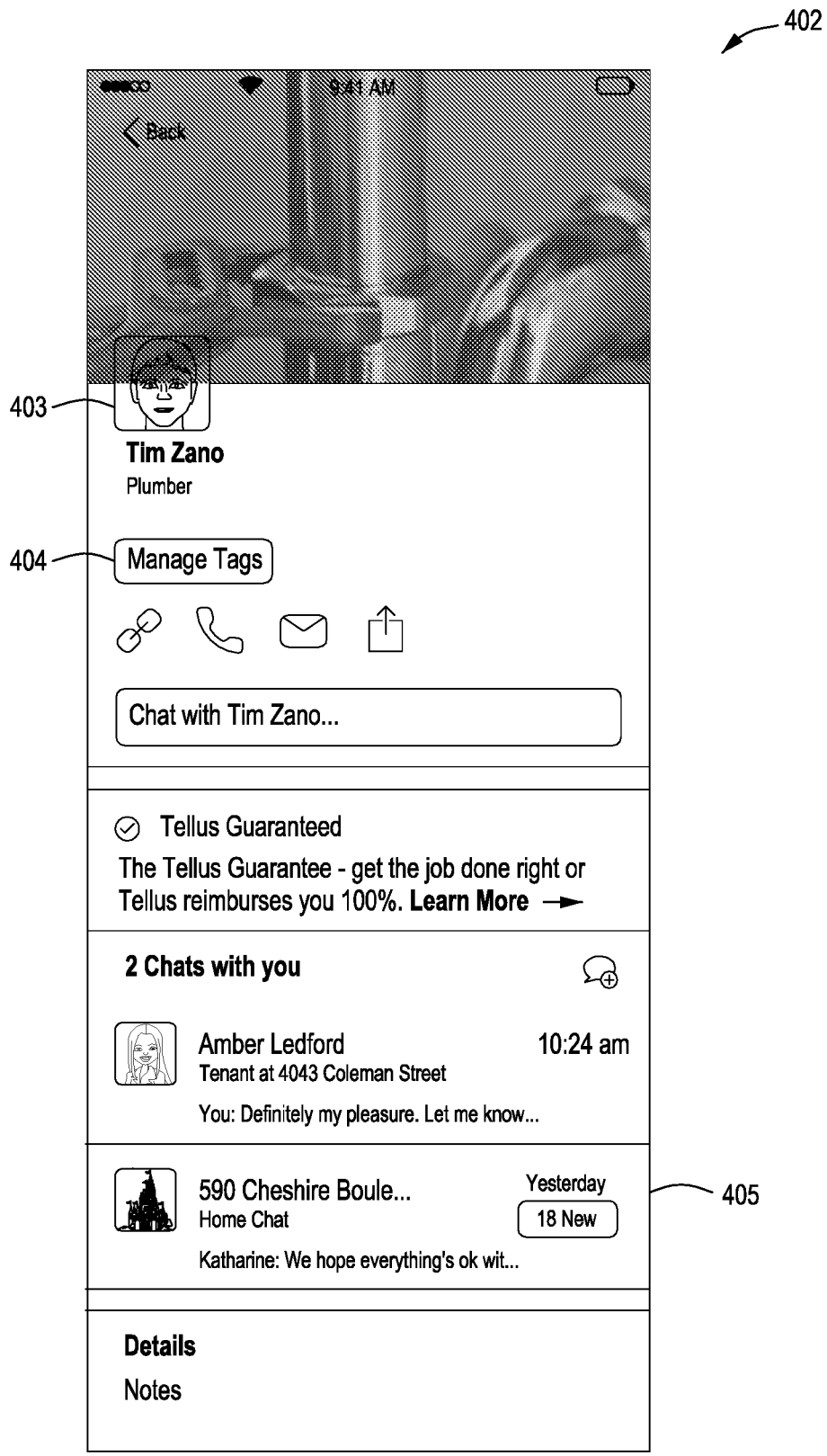
FIGS. 4A-4E are graphical representations of example user interfaces showing example interactions between a user and messaging system 102 of FIG. 1, in accordance with one or more embodiments of the present disclosure.

FIGS. 4A-4D illustrate graphical representations of example user interfaces showing example interactions between a user and messaging system 102 of FIG. 1 for teleporting a new member to a messaging group, in accordance with an embodiment of the present disclosure. In this example, as shown in FIG. 4A, a user of GUI 402 is enabled to interact therewith such that to configure particular user(s) as suggested new member(s) for teleporting into a messaging group. As illustrated herein, GUI 402 displays an icon 403 of the selected user Tim Zano, a "Manage Tag" button 404, as well as a summary of all the messaging groups that both the user and Tim Zano are members to.

Figure 4B:
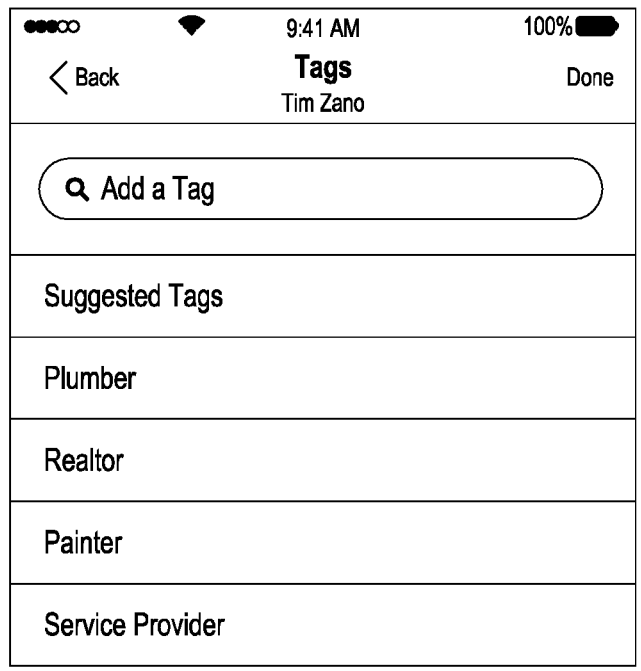
Figure 4C:
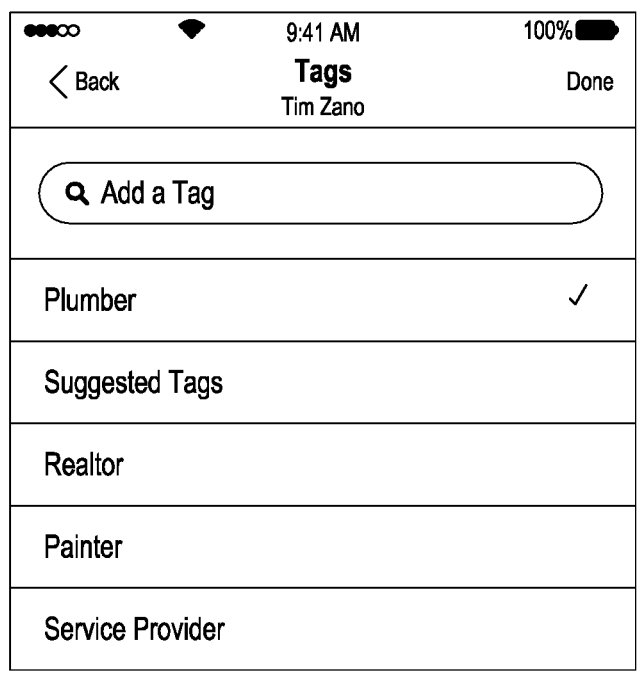
Figure 4D:
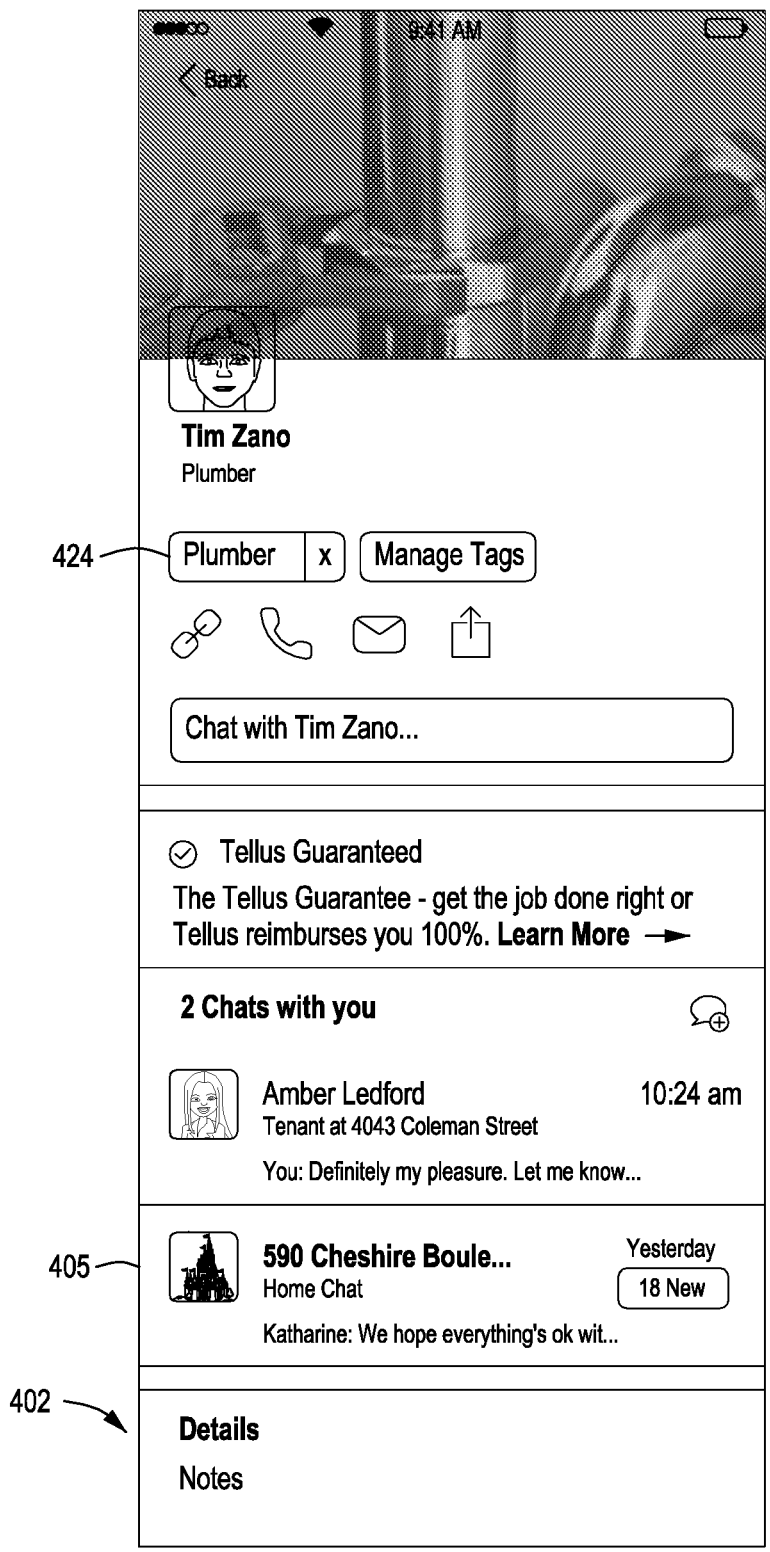

FIGS. 4B-4C illustrate a GUI 412 after the user clicks on "Manage Tag" button 404 at GUI 402. As shown herein, the user is presented with a variety of options with regard to how to tag Tim Zano. In this example, by clicking on the plumber category 414, the user designates Tim as a recognized "plumber" to the user, and this additional information may be optionally used to remind the user of Tim when a plumber's services are needed. It should be appreciated that any types of tags can be associated with any user identified at GUI 402. In some embodiments, tags may be visible in the GUI 412 (e.g., designating Tim as being associated with the tag "plumber").

It will be appreciated that a user's tags only represent one type of metadata association. In some embodiments, a contact may be associated with the introduction method that originally connected two users (e.g., if Tim was found, booked, and/or paid for by the user for plumbing-related maintenance), this "plumber" association may persist with Tim even without an explicit "plumber" tag set by the user. In other embodiments, other users (e.g., friends of the user or an extended community of users) may suggest metadata association for Tim and this additional information may persist with Tim even without an explicit "plumber" tag set by the user. In other embodiments, Tim may explicitly claim certain metadata association (e.g., Tim may optionally choose to advertise himself as a plumber) and this additional information may persist with Tim even without an explicit "plumber" tag set by the user.

Figure 4E:
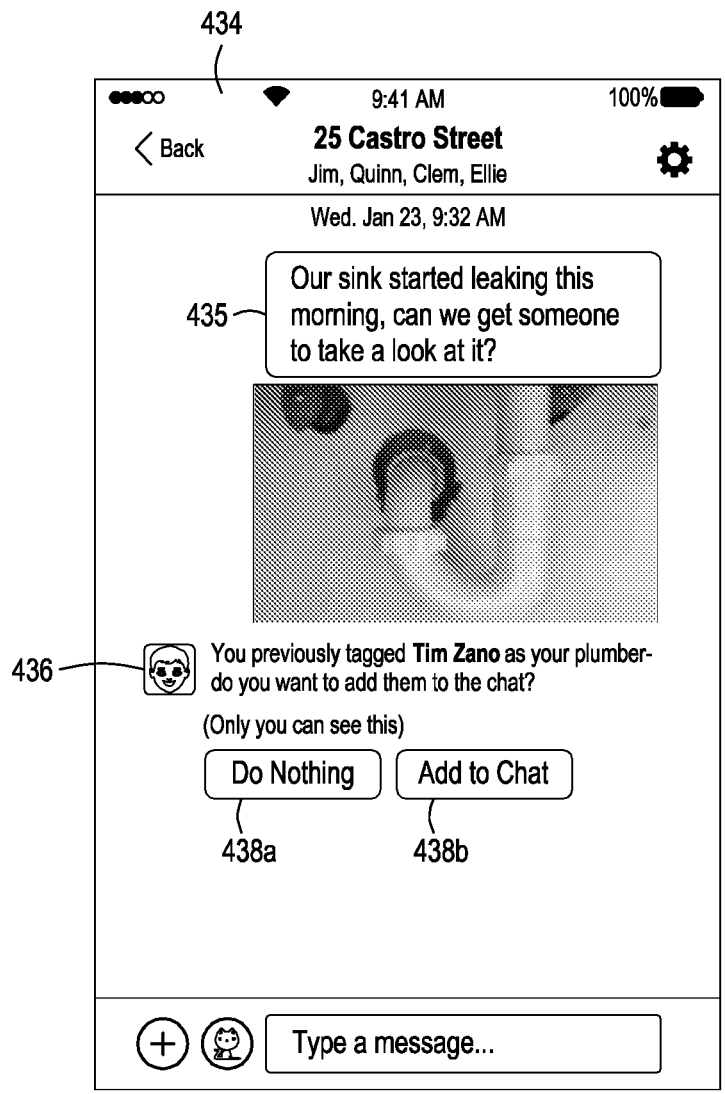

FIG. 4E illustrates a GUI 432 of a messaging application that, by interacting with messaging system 102, is configured to send and receive messages from one or more recipient group members. As shown herein, GUI 432 displays a thread of message history associated with current message group 405 of FIG. 4A. As illustrated in this example, GUI 432 includes a messaging group label 434 as "25 Castro Street" and "Jim, Quinn, Clem, Ellie" at the top of GUI 432. As made apparent herein, the membership associated with the messaging group includes members Jim, Quinn, Clem and Ellie, without including Tim as a group member. Then, one of the members associated with the messaging group sends a message 435 to the messaging group, stating that "Our sink started leaking this morning, can we get someone to take a look at it?" In this example, at this point of time, messaging system 102 may be configured to analyze message 435 to determine whether a plumber is to be teleported to the current messaging group. As a result, messaging system 102 sends an indication 436 to inform the user that a particular plumber Tim Zano has been tagged as a user with a known "plumber" association, and further suggests Tim to be added to the messaging group.

It will be appreciated that, in some embodiments, the messaging system may scan messages for text or related text that is associated with a predefined tag or other metadata association. In this example, the messaging system may identify the words "sink" and "leak" with the predefined tag "plumber" (e.g., using natural language processing and/or a semantic engine). If a match is found with sufficient confidence, the messaging system may identify potential users associated with the predefined tag or other metadata association, and offer one or more members of the messaging group the option to add the identified potential user. In some embodiments, the messaging system may suggest a particular user associated with the predefined tag or other metadata association if that particular user has communicated with one or more members of the messaging group in the past, or has communicated with others who have communicated with the one or more members of the messaging group in the past. In some embodiments, the messaging system may suggest a particular user associated with the predefined tag or other metadata association if that particular user satisfies one or more other rule, filter, criteria, or condition such as availability, responsiveness, location, recency of activity, third-party recommendation, reviews, and/or the like.

The user of GUI 432 may be further provided with a "Do Nothing" button 438 a and an "Add to Chat" button 438 b corresponding to the suggestion presented in indication 436. In some embodiments, "Do Nothing" button 438 a and "Add to Chat" button 438 b may be rendered only visible to the user of GUI 432. When the user clicks on "Do Nothing" button 438 a, Tim would not be teleported to the messaging group despite the previously configured tagging. When the user clicks on "Add to Chat" button 438 b, Tim is teleported to the messaging group without the user going through the process of selecting the new member and an insertion point, as illustrated with references to FIGS. 2A-3I. It will be appreciated that the "Do Nothing" button 438 a is optional.

Figure 7G:
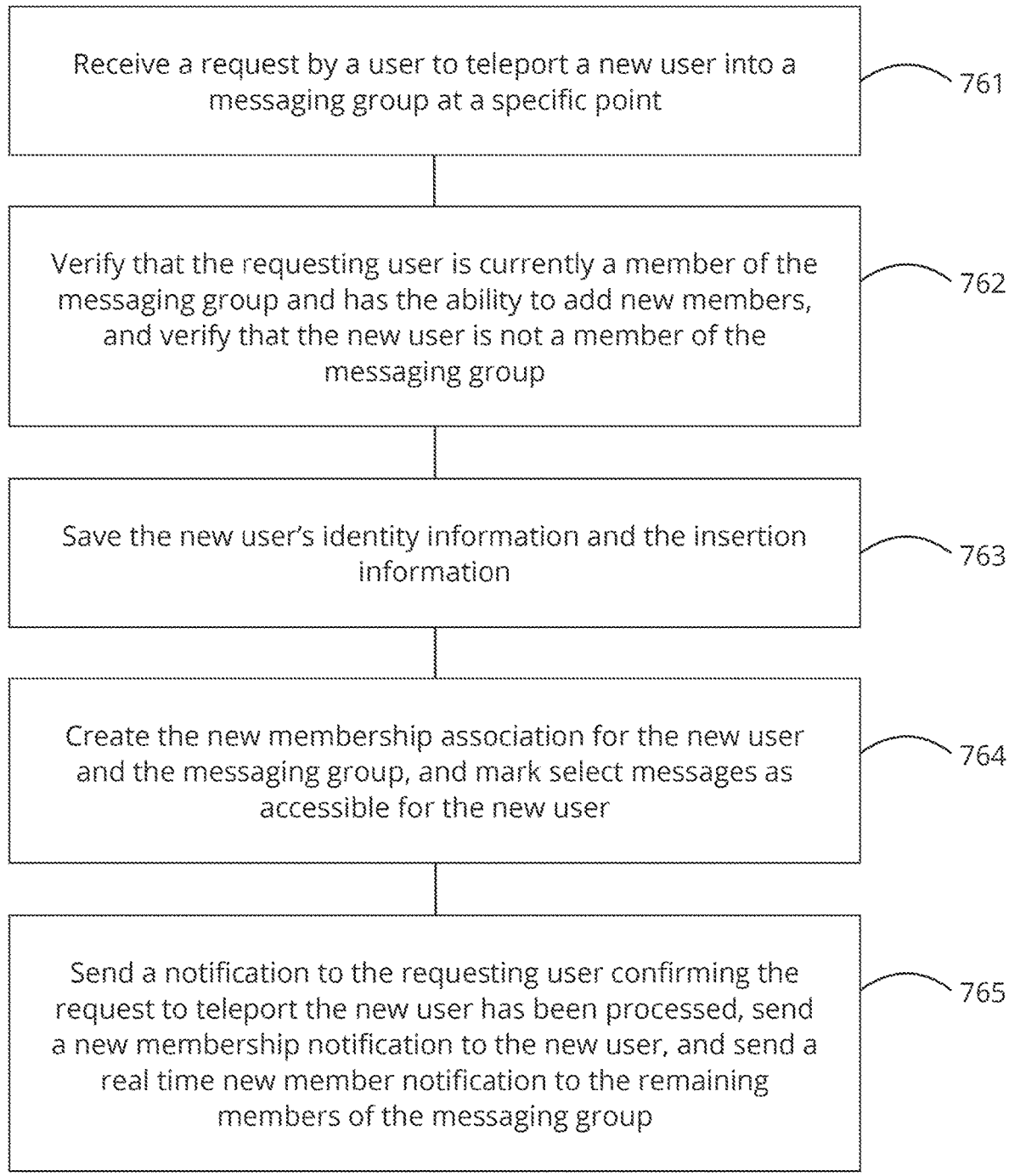
Figure 8:
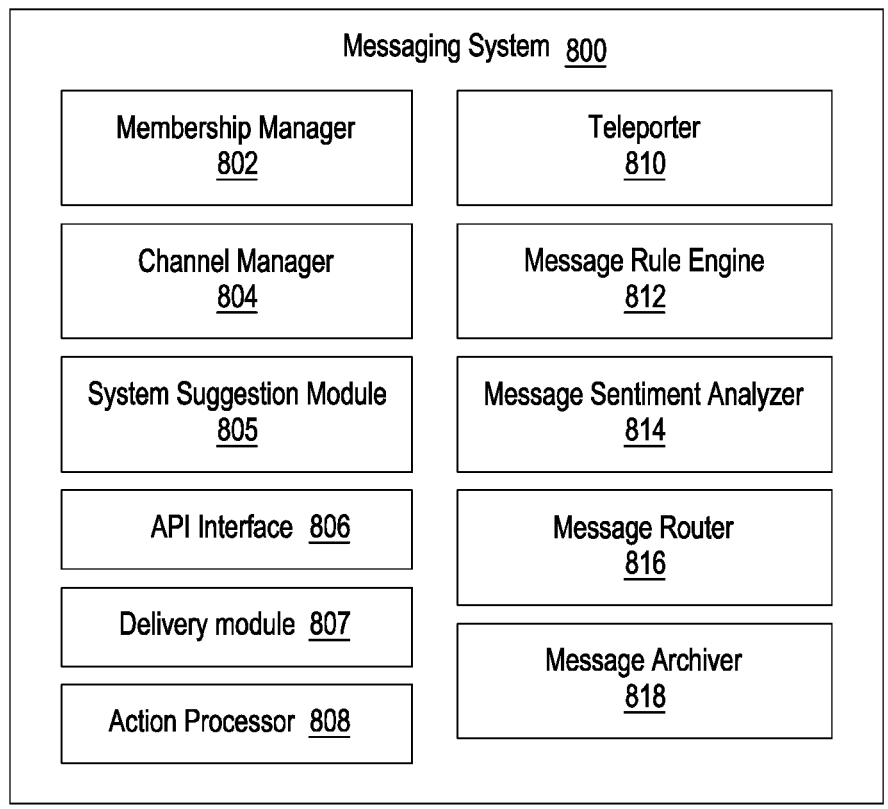
FIG. 8 is a block diagram of an example messaging system for teleporting a new member to a messaging group, in accordance with one or more embodiments of the present disclosure.

With simultaneous reference to FIGS. 7G and 8, upon the user interacting with the "Add to Chat" button 438 b, at 761, API interface 806 is configured to receive a request from the user to teleport user Tim to the messaging group. The request includes the user identity information of the new member to be teleported (e.g., Tim the plumber), as well as the insertion information with regard to at which point user Tim is to be teleported. For example, the insertion information can include a particular identifier associated with a previous message included in the thread of message history, a timestamp, or the like. For another example, the request can include an insertion object instantiated with all the information pertaining to the user identity information, the messaging group information, and the insertion information.

At 762, membership manager 802 may be configured to verify that the user is a current member to the messaging group and is authorized to teleport new member(s) to the messaging group, in addition to that user Tim is not a current member to the messaging group. At 763, system suggestion module 805 is configured to save a record of the new member identity information and the insertion information. At 764, teleporter 810 is configured to add user Tim to the membership associated with the messaging group, and mark the messages accessible to user Tim based on the insertion information. At 765, delivery module 807 is configured to send a notification to the user to acknowledge the receipt and processing of the teleportation request, send a new membership notification to user Tim (e.g., in a real time manner or an asynchronous manner), and send a real time notification to the other members of the messaging group that user Tim has been added to the messaging group.

Figure 5A:
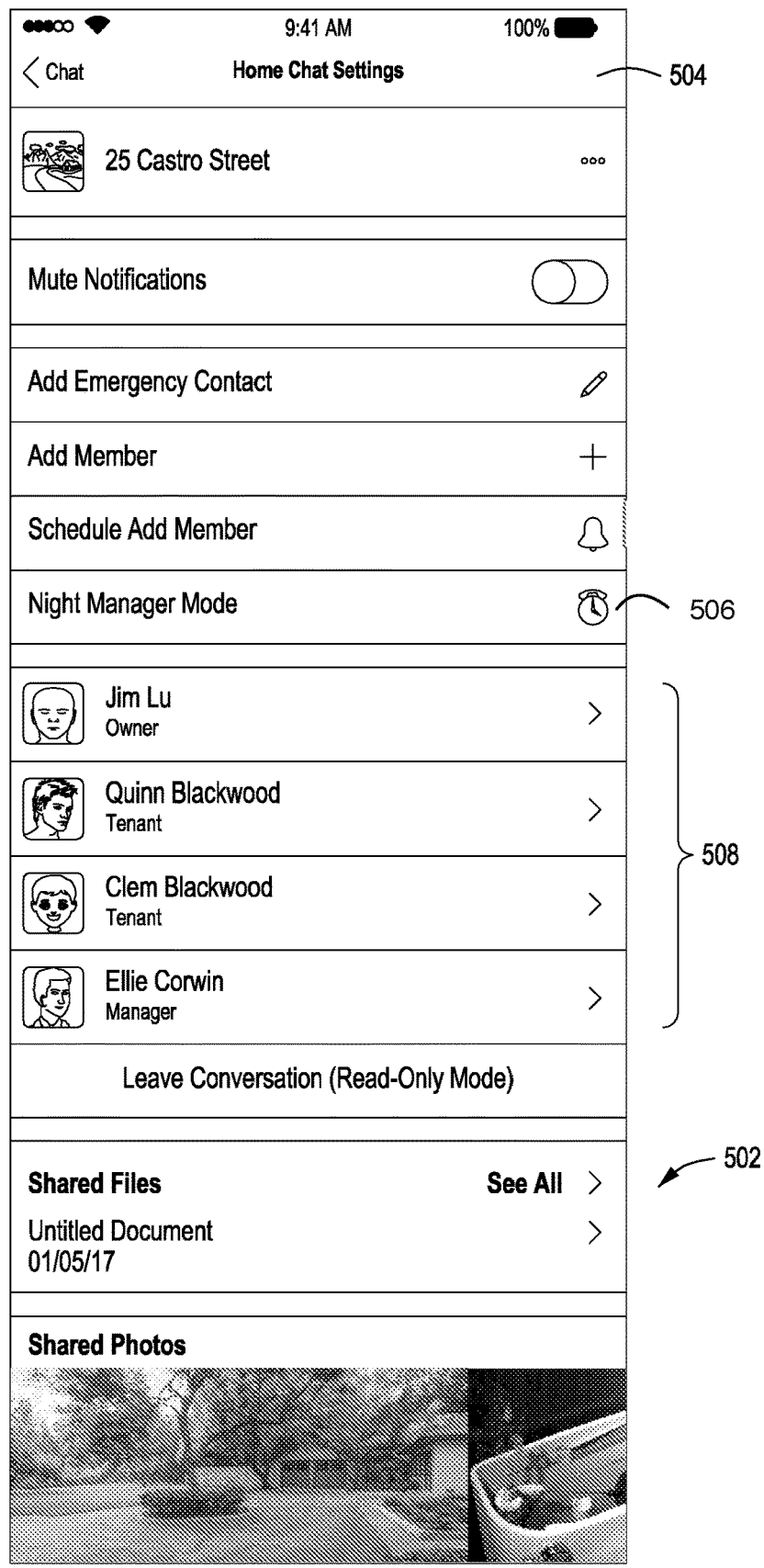
FIGS. 5A-5D are graphical representations of example user interfaces showing example interactions between a user and messaging system 102 of FIG. 1, in accordance with one or more embodiments of the present disclosure.

FIGS. 5A-5D illustrate graphical representations of yet other example user interfaces showing example interactions between a user and messaging system 102 of FIG. 1 for teleporting a new member to a messaging group, in accordance with an embodiment of the present disclosure. In this example, as shown in FIG. 5A, a user of GUI 502 is enabled to interact therewith such that to automatically teleport particular user(s) as new member(s) into a messaging group. As illustrated herein, GUI 502 displays a label 504 bearing the text "Home Chat Settings," a "Night Manger Mode" link 506, as well a list view 508 of existing members associated with the current messaging group. For example, for this particular messaging group, the membership includes Jim Lu, Quinn Blackwood (Tenant), Clem Blackwood (e.g., Tenant), and Ellie Corwin (Manager).

Figure 5B:
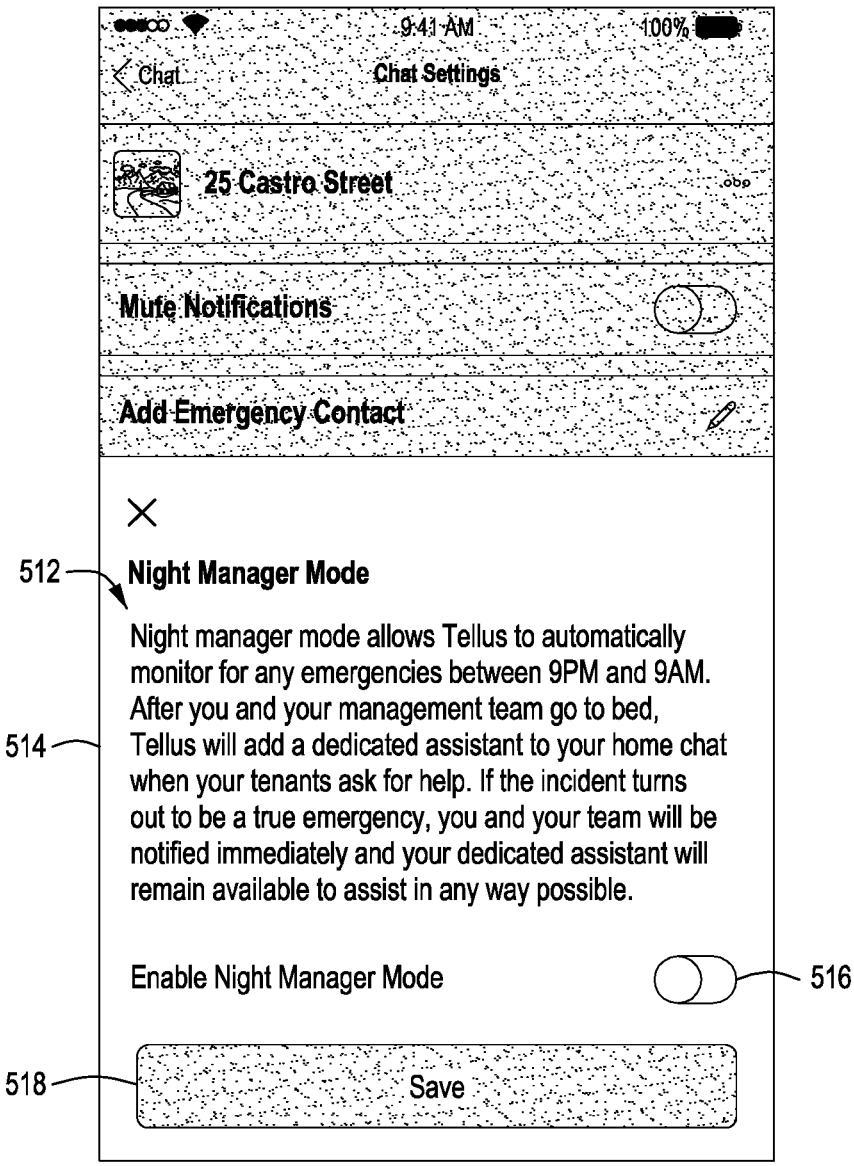
Figure 5C:
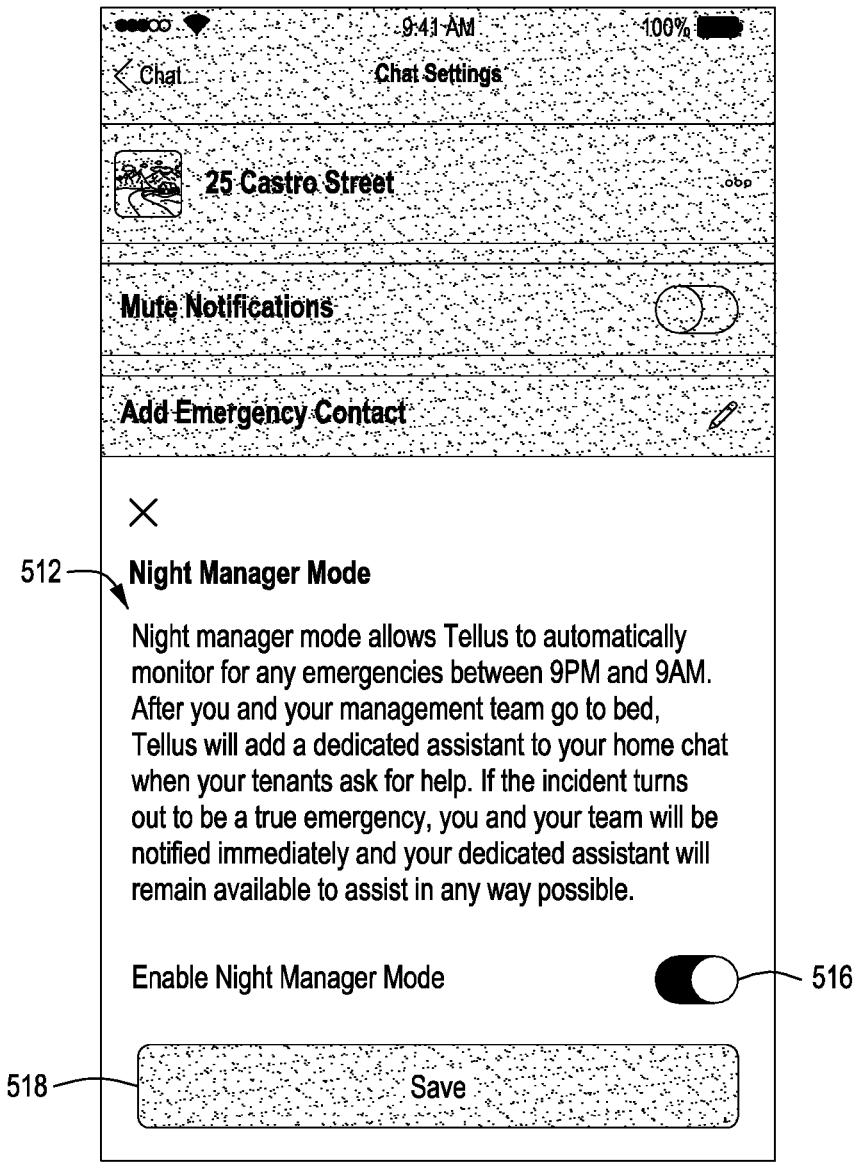

FIGS. 5B-5C illustrate GUI 502 after the user clicks on "Night Manger Mode" link 506 of FIG. 5A. As illustrated in this example, an overlay 512 is superimposed on top of a portion of GUI 502. Overlay 512 includes a text area 514, a toggle button 516, and a "Save" button 518. As shown herein, text area 514 displays the note explaining the functions provided by messaging system 102 when entering into a night manager mode. For example, upon monitoring the messages associated with the messaging group between 9 PM and 9 AM, messaging system 102 enables a designated new member to be automatically teleported to the messaging group when an incurrence of emergency condition is detected. As shown in FIG. 5C, the user of GUI 502 clicks on toggle button 516 to enter the messaging group into a night manager mode, and clicks on "Save" button 518 to store this particular setting with regard to the messaging group.

Figure 5D:
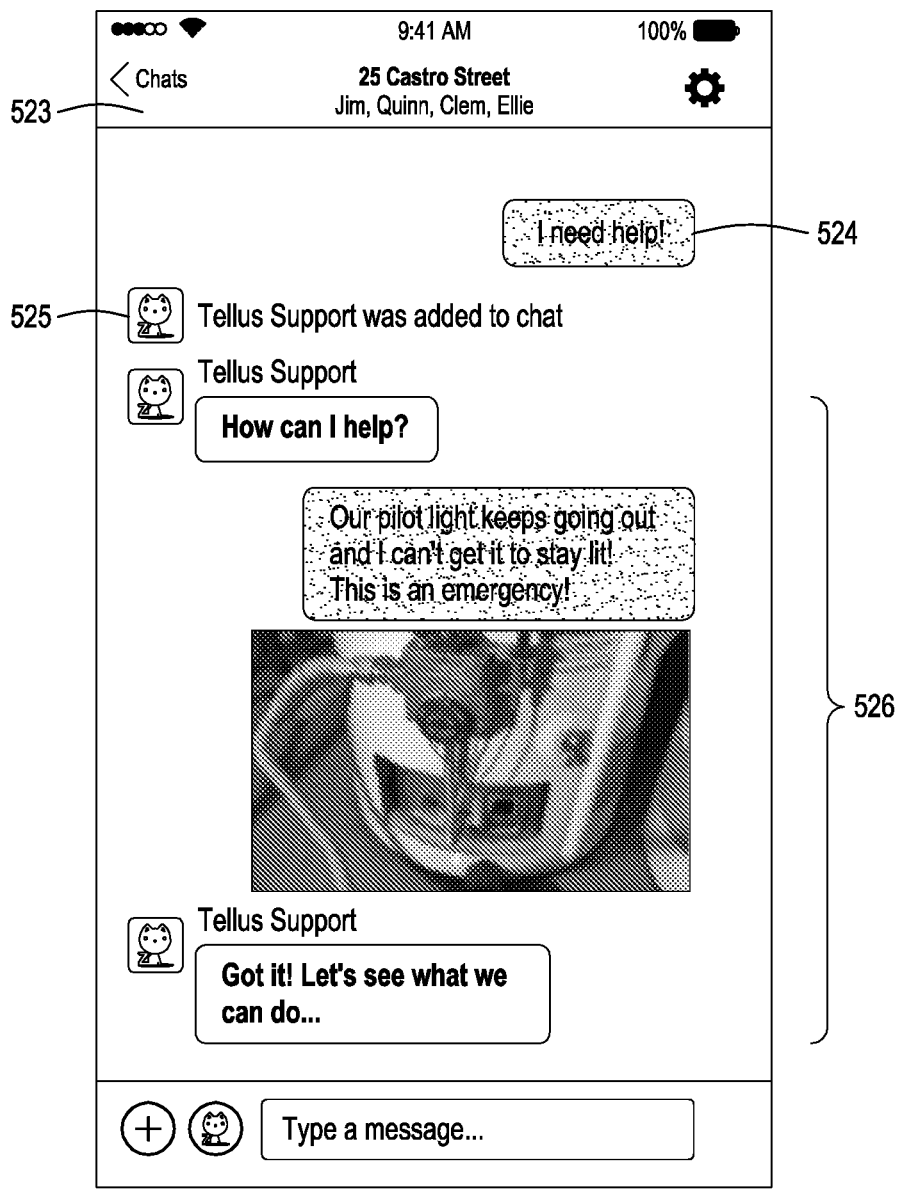

FIG. 5D illustrates GUI 522 of a messaging application that, by interacting with messaging system 102, is configured to send and receive messages from one or more recipient group members. The following illustrates FIG. 5D with simultaneous reference to FIGS. 7B-7C and FIG. 8. As shown herein, GUI 522 displays a thread of message history associated with the current message group whose setting has been configured at GUI 502 of FIG. 5A. As illustrated in this example, GUI 522 includes a messaging group label 523 as "25 Castro Street" and "Jim, Quinn, Clem, Ellie" at the top of GUI 522. As made apparent herein, the membership associated with the messaging group includes members Jim, Quinn, Clem and Ellie; without including anyone else as a group member. Then, one of the members associated with the messaging group sends a message 524 to the messaging group, stating that "I need help!" Next, at 711, messaging system 800 receives the message at an API interface 806, which is configured to receive one or more messaging incoming from user(s) at a messaging group. At 712, membership manager 802 is configured to verify the membership associated with the user to determine that the user is included in the membership associated with the messaging group and to optionally determine that the user has the permission to send a message to the current messaging group. At 713, message sentiment analyzer 814 may optionally be configured to parse the message through natural language processing, named entity recognition, sentiment analysis, topic segmentation, or the like forms of information analysis and extraction, such that potentially actionable metadata may be collected regarding to the massage. In some embodiments, metadata can optionally include information generated or collected simultaneously with the message, such as location, timestamp, authentication information of sending account, sending digital device identifying information, Internet protocol address of sending digital device, and the like. For example, metadata can include a binary status indicating whether an emergency situation has risen based on detecting one or more words matching with pre-configured keywords, key phrases, or any key expressions in the message. For example, as illustrated in FIG. 5D, based on the keyword "help" communicated at the messaging group, message sentiment analyzer 814 may optionally be configured to determine that there is an emergency situation. Next, at 714, rule engine 812 is optionally configured to apply a pre-configured ruleset to the binary status of an emergency condition to trigger one or more pre-configured actions corresponding to the status. In this example, an action of teleporting Tellus support staff as a new member to the messaging group right away; and the action is queued to action processor 808, which is configured to execute the actions that are triggered upon various conditions. In this example, in conjunction with membership manager 802 and channel manager 804, the Tellus support staff is added to the membership associated the messaging group. At 715, message router 816 is configured to determine the users to whom the message is to be sent based on the updated membership. At 716, delivery module 807 is configured to send the user a notification to acknowledge the receipt of the message, and send the message to the members determined as included in the membership associated with the messaging group. In some embodiments, delivery module 807 is configured to send the message to each of the determined recipient users based on their respective delivery preference (e.g., deliver in real time manner, in asynchronous manner, or the like). As illustrated in FIG. 5D, an indication 525 is sent to the messaging group to inform the user that Tellus Support is added to the messaging group, after which the automatically teleported new member (e.g., Tellus Support) starts to send and/or receive messages 526 at the current messaging group. As shown herein, a new member to the messaging group configured with an active night manager mode can be teleported therein without an existent member user going through the process of selecting the new member and an insertion point, as illustrated with references to FIGS. 2A-3I.

Figure 7H:
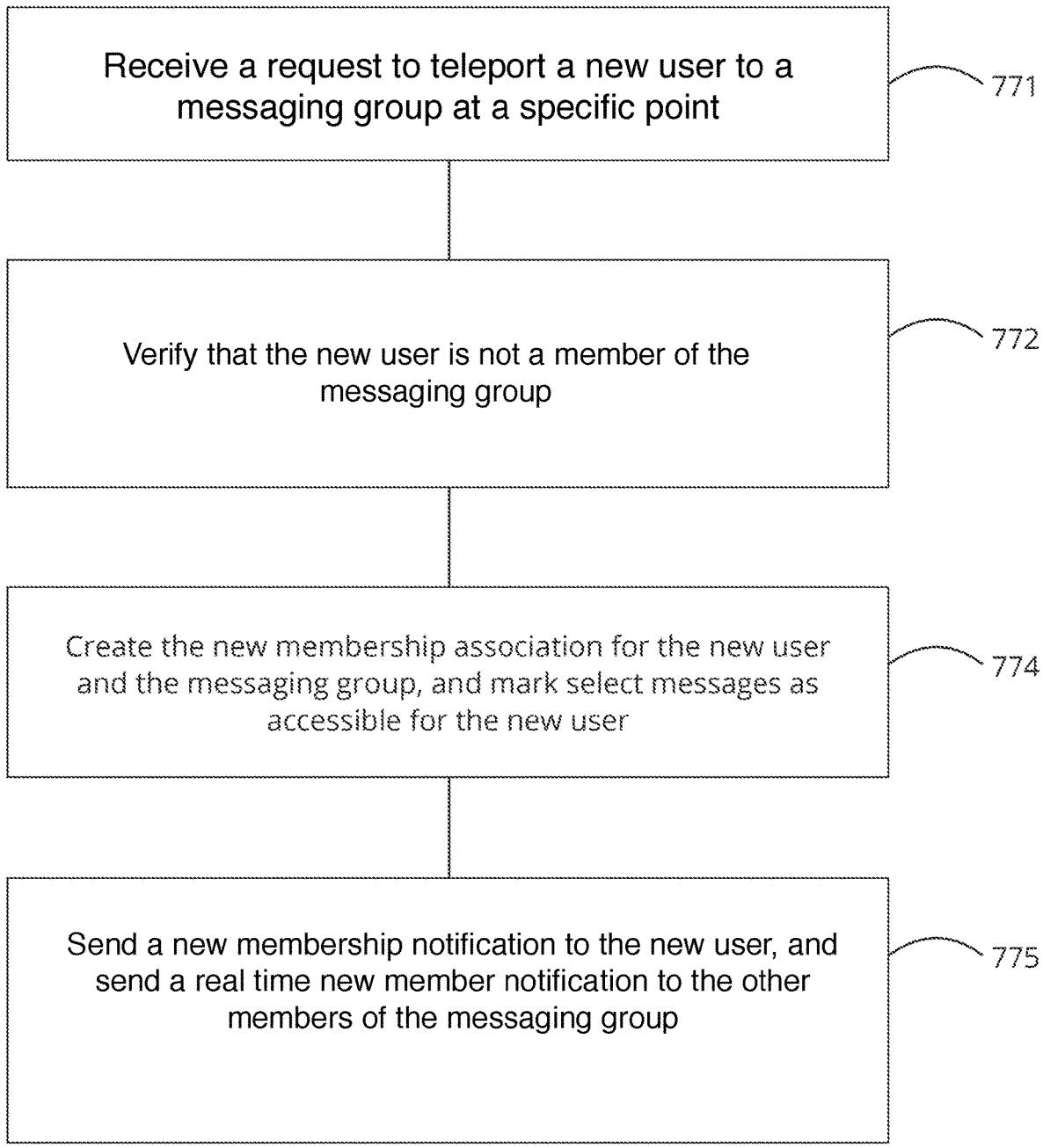

In some embodiments, when the word "help" automatically triggers a teleportation of a new member to the messaging group, with simultaneous reference to FIGS. 7H and 8, at 771, action processor 808 is configured to receive an instruction to insert a user at an insertion point. At 772, membership manager 802 is configured to verify that the new member is not included in the membership associated with the messaging group. At 774, teleporter 810 is configured to create a new membership for the new member to be included with the membership associated with the messaging group. Teleporter 810 is also configured to mark the messages that are accessible to the new member. At 775, delivery module 807 is optionally configured to send a new membership notification to the new member (e.g., in a real time manner or an asynchronous manner), a real time notification to the other members of the messaging group to notify that the new member has been added to the messaging group.

Figure 6A:
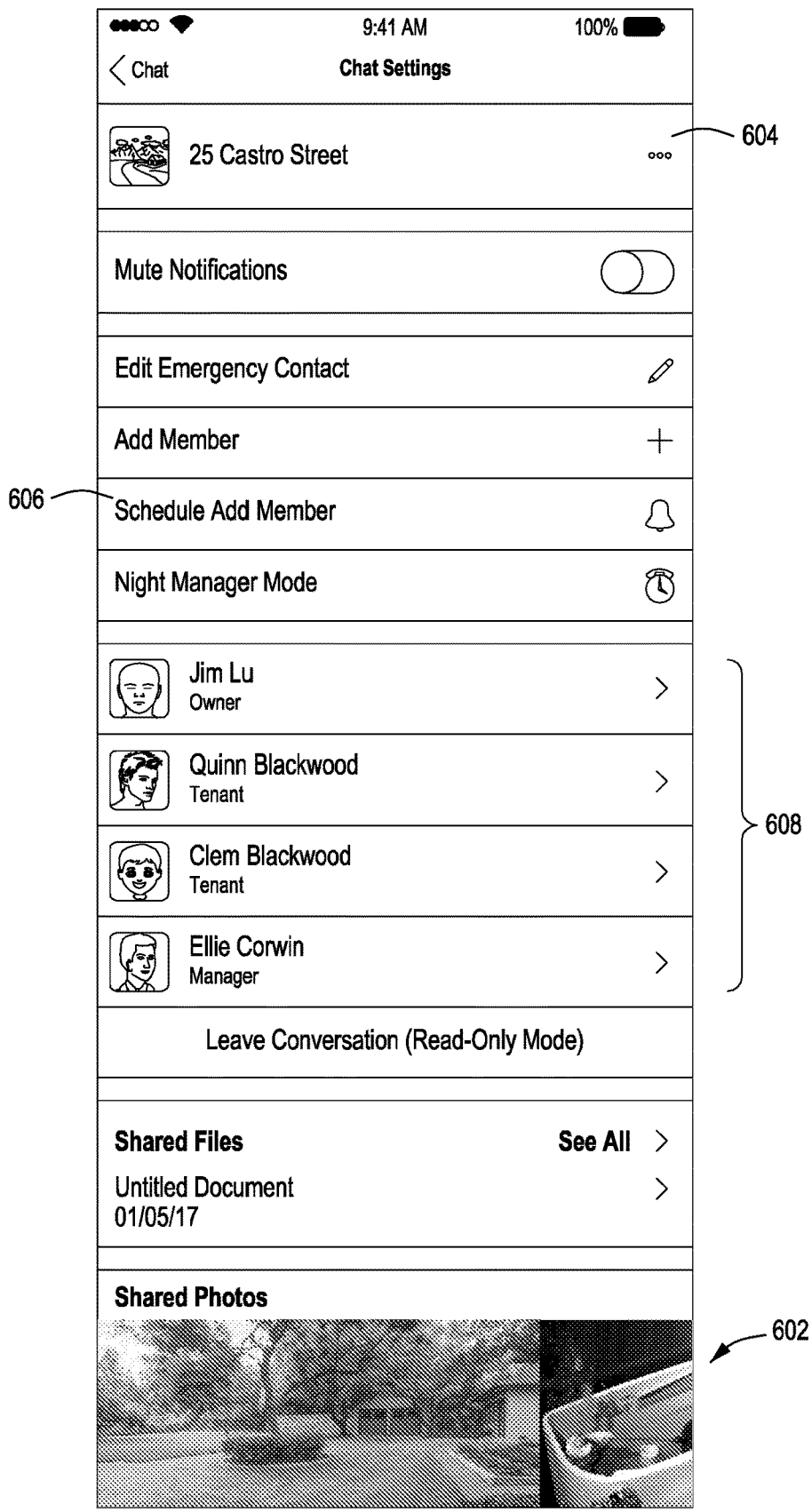
FIGS. 6A-6O are graphical representations of example user interfaces showing example interactions between a user and messaging system 102 of FIG. 1, in accordance with one or more embodiments of the present disclosure.
Figure 6B:
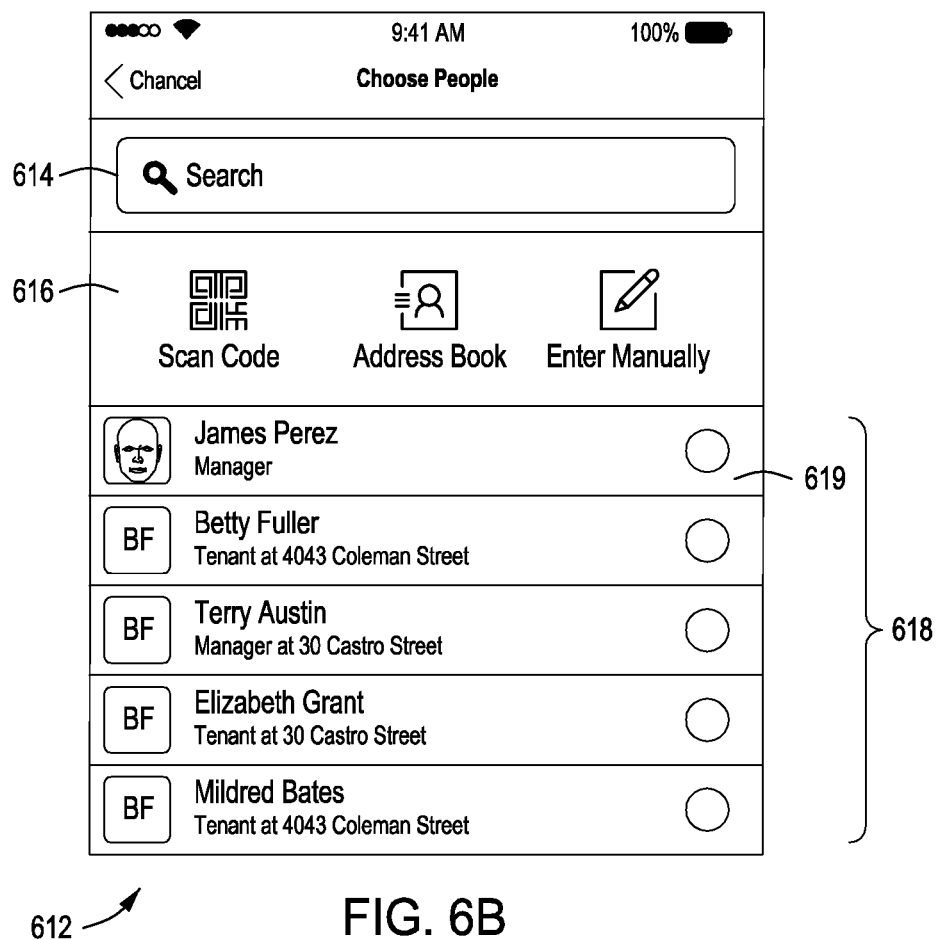
Figure 6C:
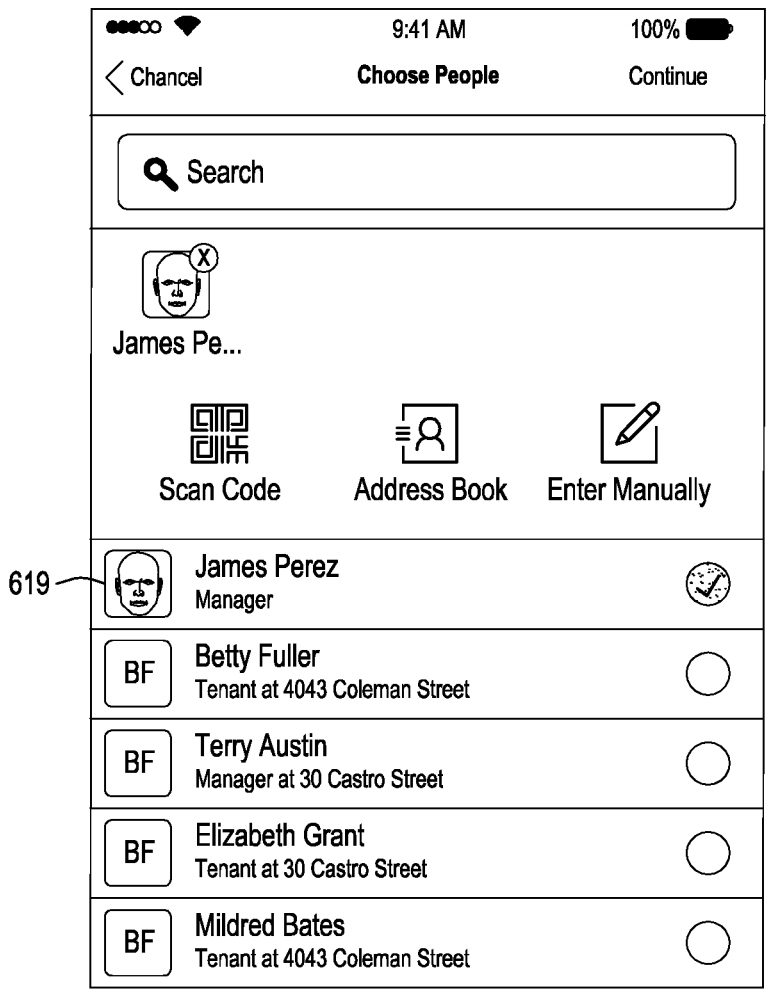
Figure 6D:
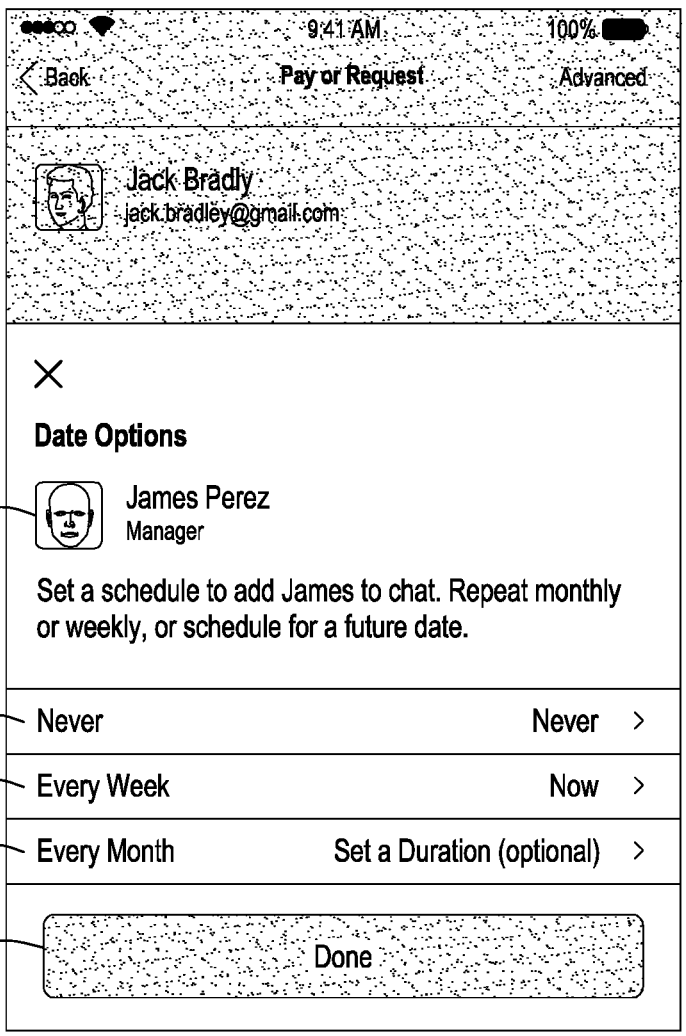
Figure 6E:
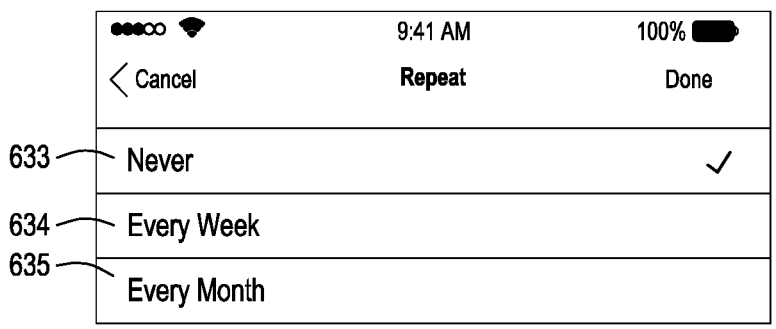
Figure 6F:
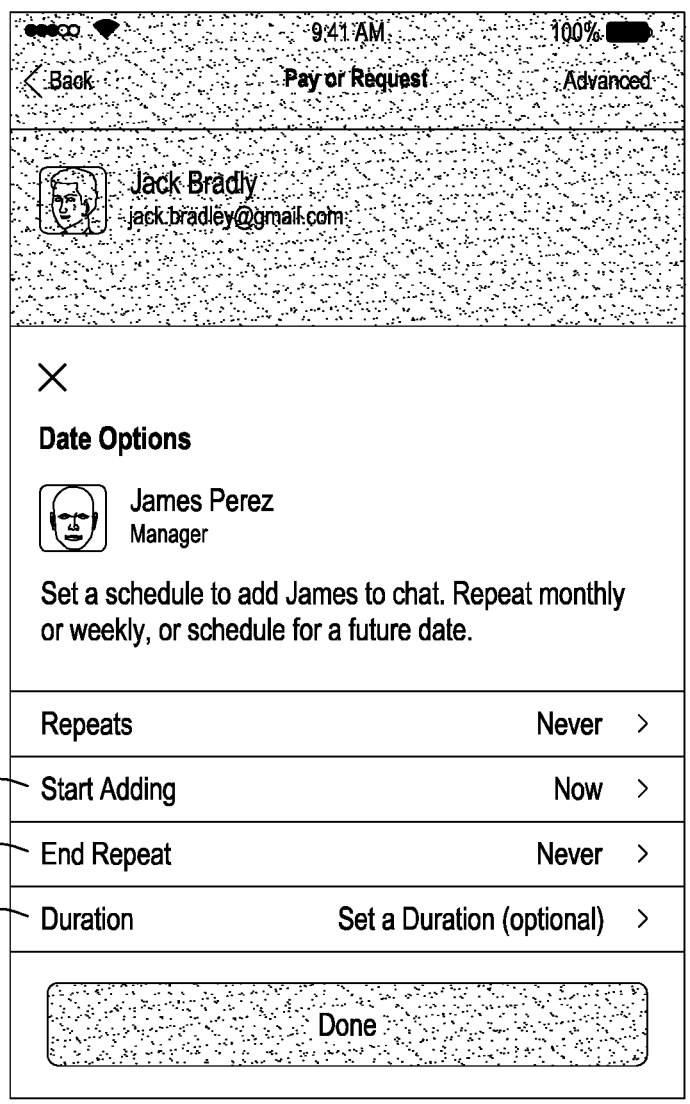
Figure 6H:
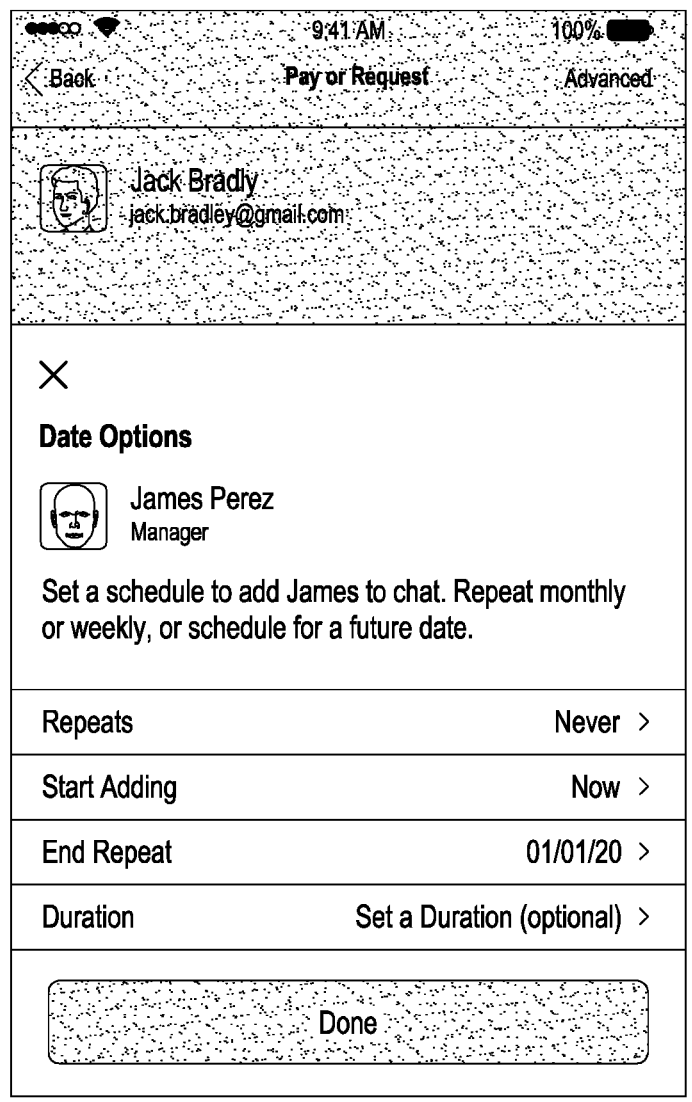
Figure 6I:
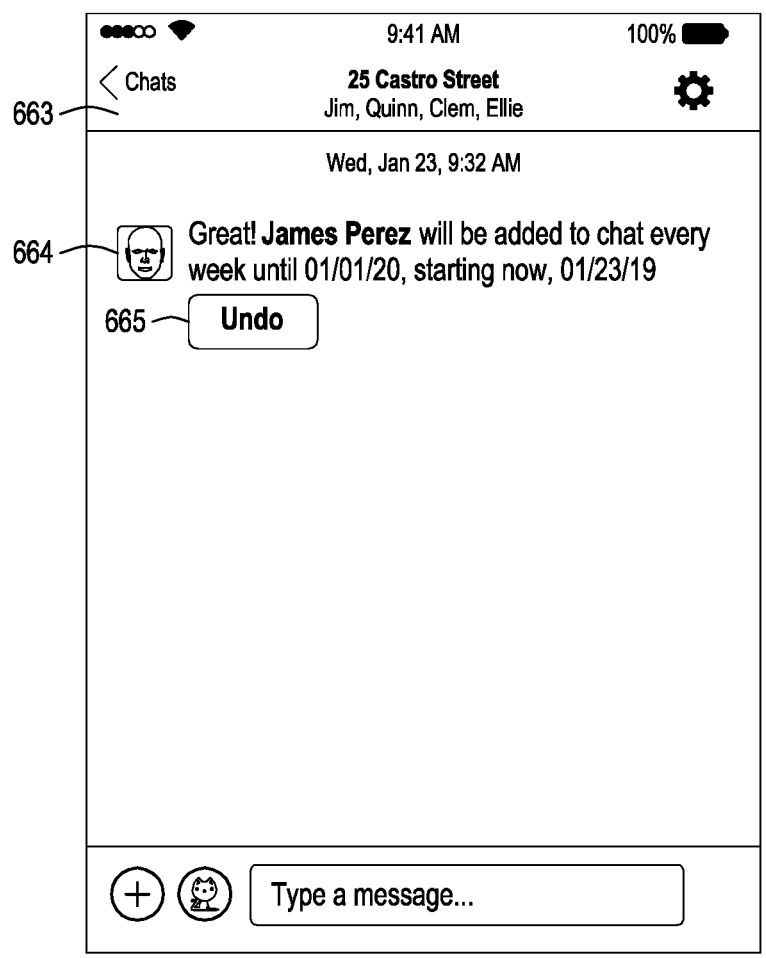
Figure 6J:
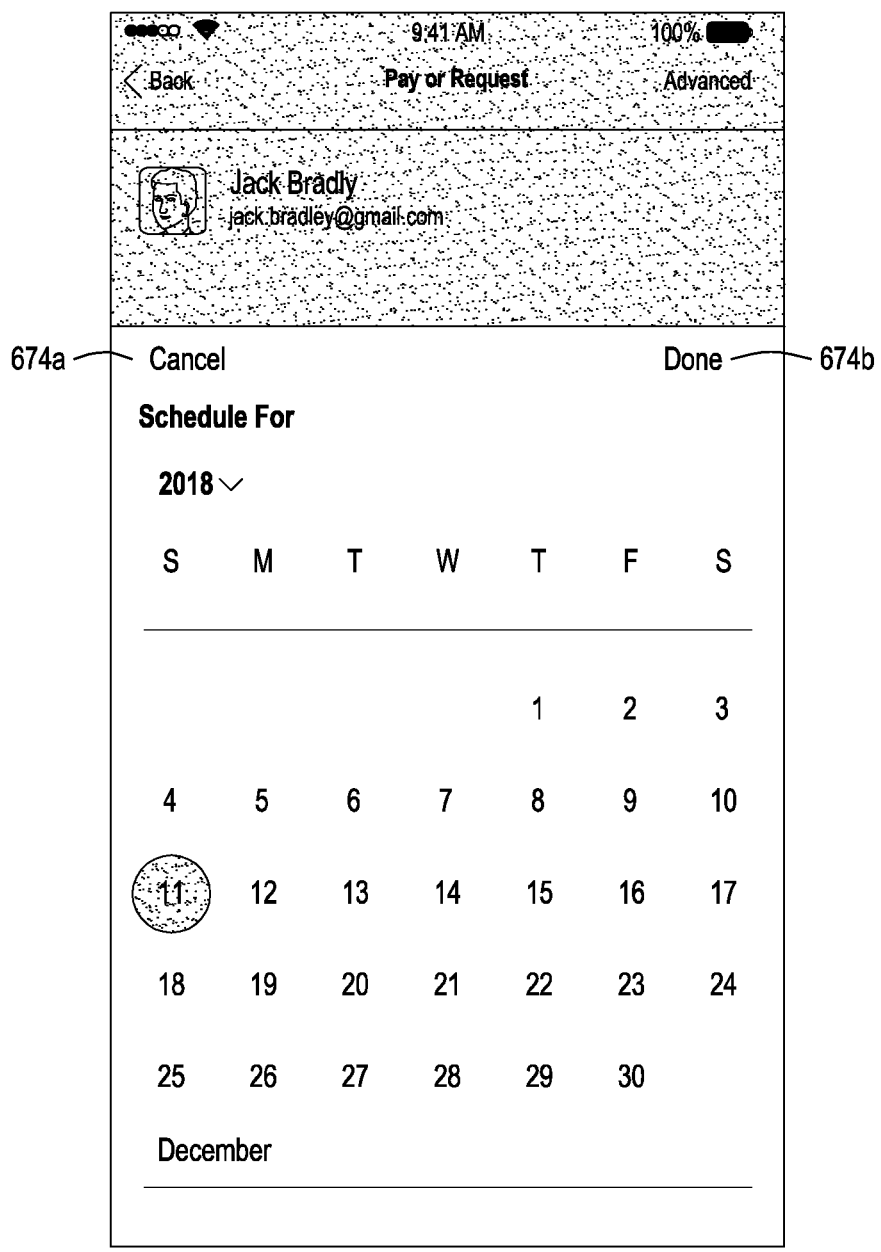
Figure 6K:
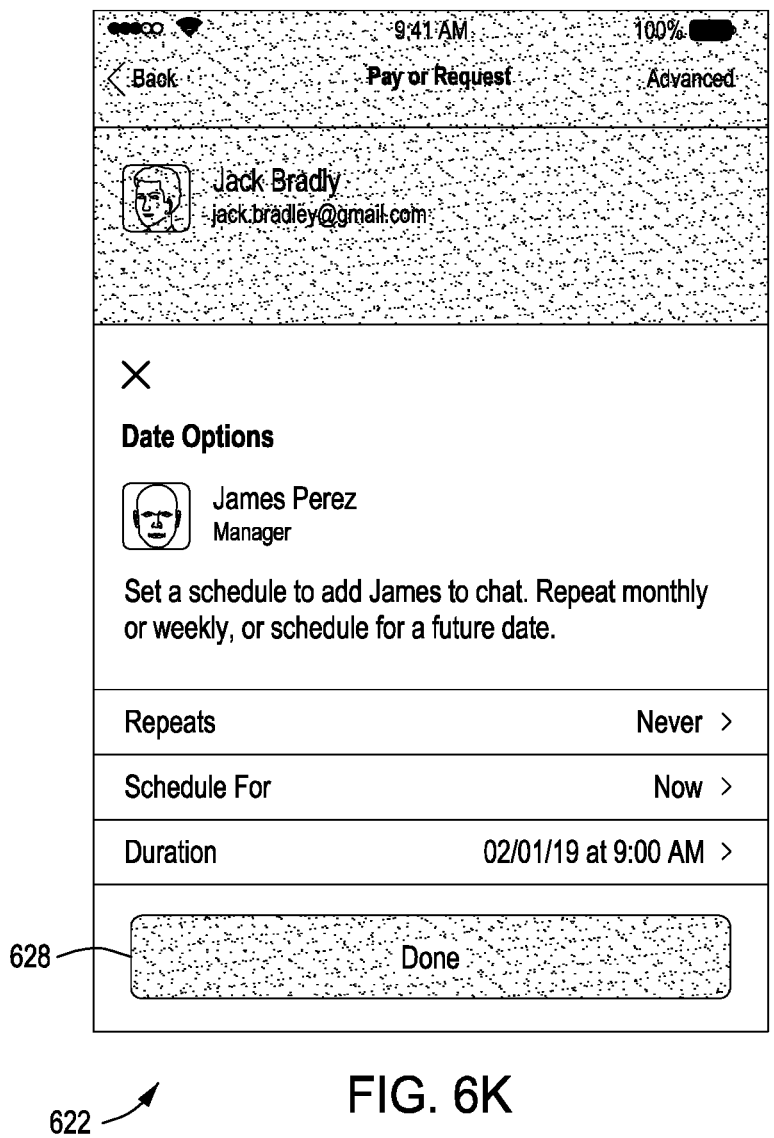
Figure 6L:
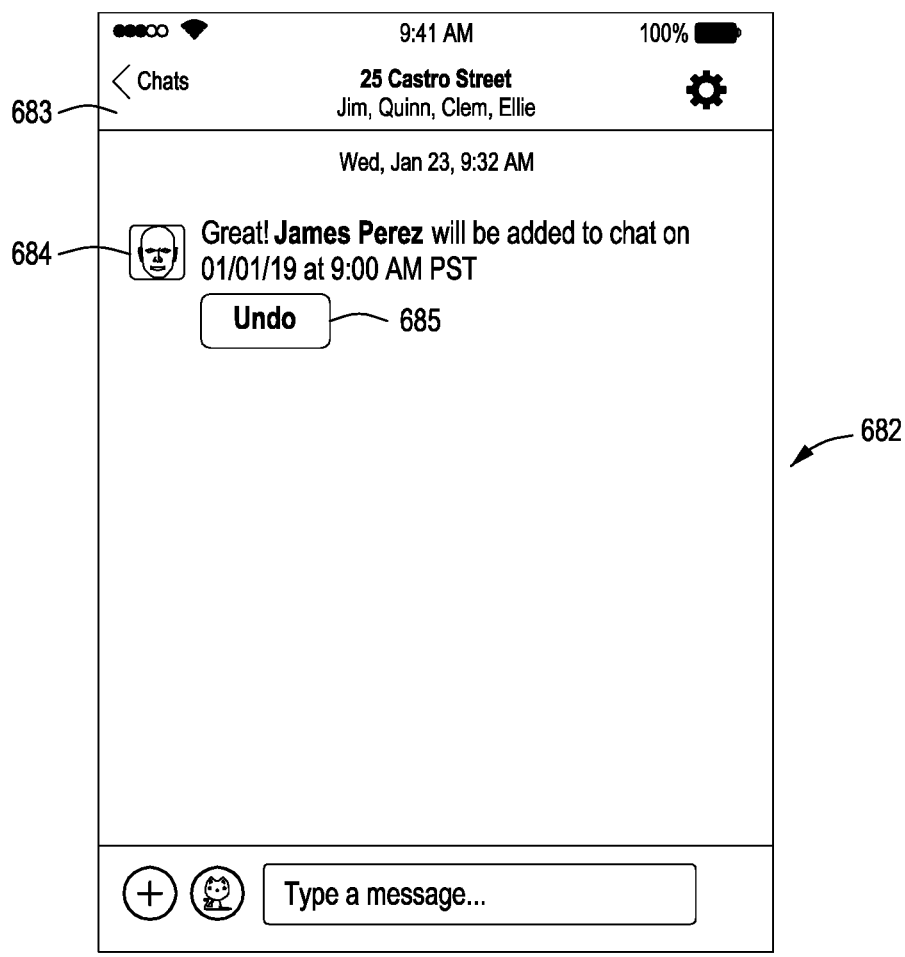
Figure 6M:
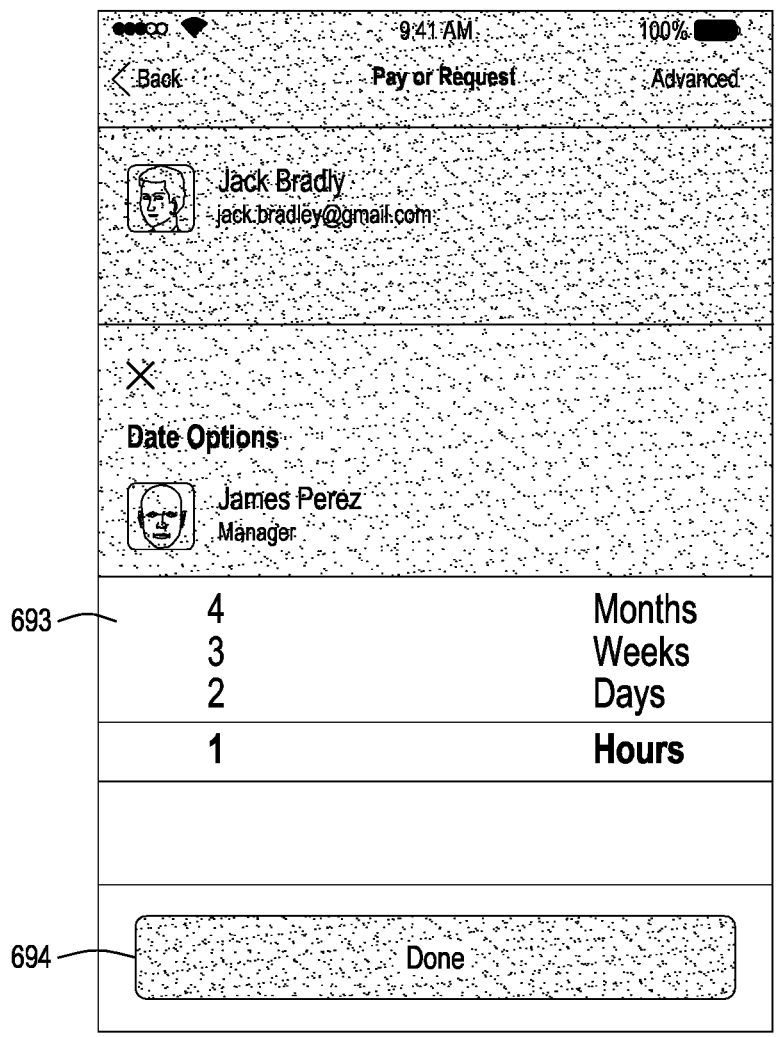
Figure 6N:
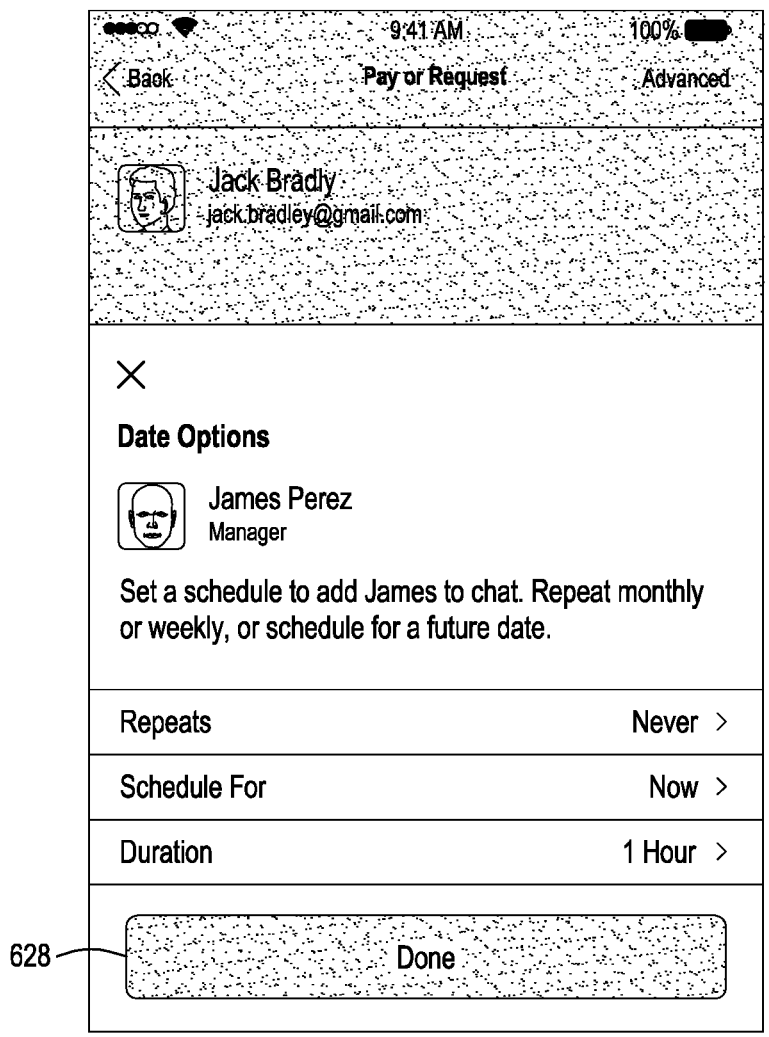
Figure 6O:
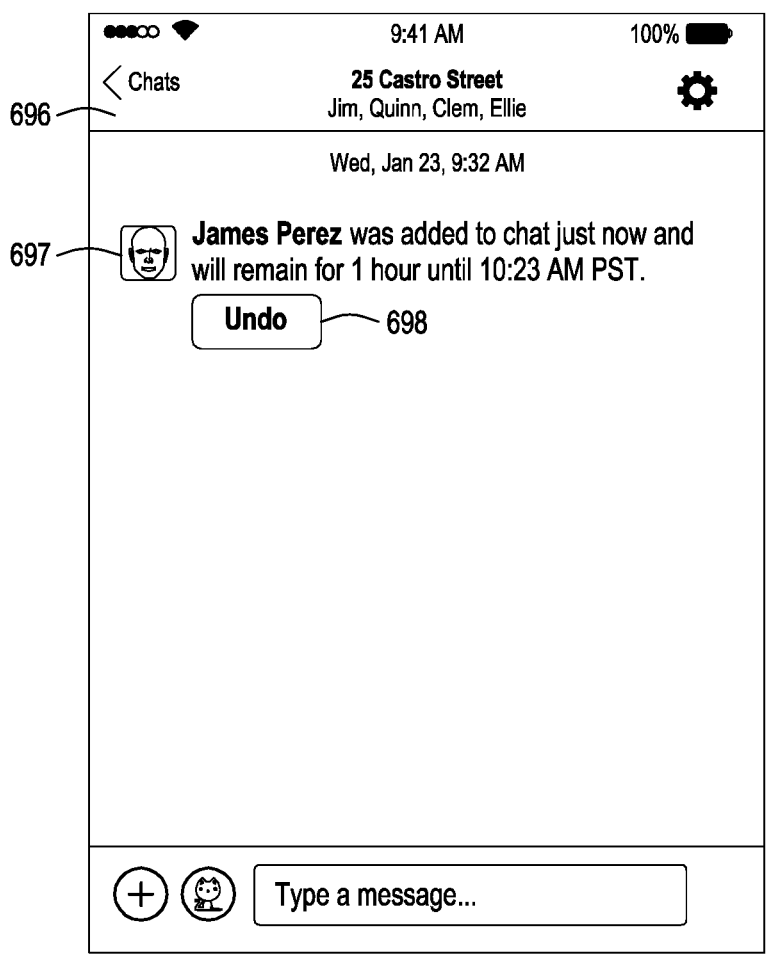

FIGS. 6A-6O illustrate graphical representations of still yet other example user interfaces showing example interactions between a user and messaging system 102 of FIG. 1 for teleporting a new member to a messaging group, in accordance with an embodiment of the present disclosure. In this example, as shown in FIG. 6A, a user of GUI 602 is enabled to interact therewith such that to schedule particular user(s) as new member(s) for being teleported into a messaging group. As illustrated herein, GUI 602 displays a label 604 bearing the text "Home Chat Settings," a "Schedule Add Member" link 606, as well a list view 608 showing existing members associated with the current messaging group. For example, for this particular messaging group, the membership includes Jim Lu, Quinn Blackwood (Tenant), Clem Blackwood (e.g., Tenant), and Ellie Corwin (Manager).

FIGS. 6B-6C illustrate a GUI 612 after the user clicks on "Schedule Add Member" link 606 of FIG. 6A. As illustrated in this example, GUI 612 is displayed in place of GUI 602 so that the user of GUI 602 is enabled to configure a schedule-based teleportation of new member(s) into the current messaging group. GUI 612 includes a search box 614, and a panel of input options 616 including, for example, mechanisms such as inputting by clicking on "Scan Code" to scan a QR code associated with a user, by clicking on "Address Book" to select a user from the address book, or by clicking on "Enter Manually" to manually provide user identity information. GUI 612 further includes a list view 618 of users who have been previously associated with the messaging group using GUI 602, or users who are recommended by messaging system 102 as candidate users for scheduling a teleportation. As shown herein, list view 6128 displays the list of users including James Perez, Betty Fuller, Terry Austin, Elizabeth Grant, and Mildred Bates. In this example, the user of GUI 612 clicks on list item 619 associated with user James Perez to identify James as the new member to be teleported to the messaging group based on a schedule to be configured subsequently (e.g., the schedule indicating a time when the new member is added and/or teleported to the messaging group).

FIG. 6D illustrates a GUI 622 after the user clicks on list item 619 at GUI 612 to select James as the new member for teleporting. GUI 622 includes a label 624 to indicate that this interface is for configuration date and time information with regard to teleport James Perez to the messaging group. GUI 622 also includes three links for inputting schedule options: option to repeat link 625, option to schedule a start time link 626, and option to set a time duration link 627. Details of those inputting the schedule options are described below with references to FIGS. 6E-6I, FIGS. 6J-6L, and FIGS. 6M-6O, respectively. Once the user is done interacting with these options, the user clicks on a "Done" button 628 to save the configured scheduling of teleporting the new member (e.g., James Perez) to the current messaging group.

FIGS. 6E-6I illustrate an example series of GUIs after the user clicks on option to repeat link 625 at GUI 622. An option to repeat the scheduled teleportation can be configured to occur in any suitable frequency. In this example, the user is enabled to interact with GUI 632 of FIG. 6E to toggle between choices including "Never" choice 633, "Every Week" choice 634, and "Every Month" choice 635. FIG. 6F illustrates a GUI 642 after the user clicks on "Every Week" choice 634 of GUI 632. GUI 642 displays a "Repeats" choice as "Never," and includes a "Start Adding" link 643, an "End Repeat" link 644, and a "Duration" link 645. In some embodiments, it is optional for the user to enter the duration information regarding a never repeated schedule for teleportation. As illustrated herein, the user has selected a starting time as "Now" at "Start Adding" link 643.

FIG. 6G illustrates a GUI 652 after the user clicks on "End Repeat" link 644 at GUI 642. As illustrated herein, the user is enabled to interact with GUI 652 to select between choices including a "Never" choice 653, an "After" choice 654, and an "On Date" choice 655. Each of those choices is exclusive from each other. As shown herein, the user can select "After" choice 654 to further configure that the scheduled teleportation is not going to repeat after being scheduled for one time. Also, as shown herein, the user can select "On Date" choice 655 to associate a date (e.g., choosing from a date picker) with the scheduled teleportation so that it is not going to repeat starting on the selected date (e.g., Jan. 1, 2020). It will be appreciated that the messaging system may receive the schedules, including when to add a member, how often, repeated additions, repeated removals, and/or any other scheduling information for adding and/or removing a member from a membership group.

FIG. 6H illustrates GUI 642 after the user is done interacting with GUI 652 and navigates back to GUI 642 with more information populated thereat. As shown herein, the user has now configured a never repeating schedule to teleport James Perez to the messaging group starting now, the never repeating setting expiring on Jan. 1, 2020.

FIG. 6I illustrates a GUI 662 of a messaging application that, by interacting with messaging system 102, is configured to send and receive messages from one or more recipient group members. As shown herein, GUI 662 displays a thread of message history associated with current message group whose setting has been configured at GUI 602 of FIG. 6A. As illustrated in this example, GUI 662 includes a messaging group label 663 as "25 Castro Street" and "Jim, Quinn, Clem, Ellie" at the top of GUI 662. As made apparent herein, the membership associated with the messaging group includes members Jim, Quinn, Clem and Ellie; without including James Perez as a group member. At this point, messaging system 102 sends an indication 664 to inform that "James Perez will be added to chat every week until Jan. 20, 2020, starting now Jan. 23, 2019." GUI 662 also includes an "Undo" button 665 to allow the scheduled teleportation to be canceled at a choice of the member(s) of the messaging group. As shown herein, a new member (e.g., James) to the messaging group configured with an active schedule to add members can be teleported therein without an existent member user going through the process of selecting the new member and an insertion point, as illustrated with references to FIGS. 2A-3I.

FIGS. 6J-6I illustrate an example series of GUIs after the user clicks on option to schedule a start time link 626 at GUI 622. FIG. 6J illustrates a GUI 672 that enables the user to interact therewith in order to select a date with regard to scheduling teleporting the new member to the messaging group. As shown herein, GUI 672 includes a cancel button 674 a and done button 674 b. GUI 672 also includes a date picker for the user to traverse back and forth using a calendar, upon which the user can click on to enter a selection of a particular date.

FIG. 6K illustrates GUI 622 after the user is done selecting the present time (not shown, but for example, Jan. 1, 2019) as a date using the date picker, and subsequently clicks on "Done" button 674 b at GUI 672 to navigate back GUI 622 with more information populated thereat. As shown herein, the user has now configured a scheduled teleportation of James Perez to the current messaging group starting at now (Jan. 1, 2019) and with a duration specified through Feb. 1, 2019 at 9:00 AM.

FIG. 6L illustrates GUI 682 of a messaging application that, by interacting with messaging system 102, is configured to send and receive messages from one or more recipient group members. GUI 682 is displayed after the user is done interacting with GUI 622 and clicks on "Done" button 628. As shown herein, GUI 682 includes a thread of message history associated with the current message group whose setting has been configured at GUI 602 of FIG. 6A. As illustrated in this example, GUI 682 includes a messaging group label 683 as "25 Castro Street" and "Jim, Quinn, Clem, Ellie" at the top of GUI 682. As made apparent herein, the membership associated with the messaging group includes members Jim, Quinn, Clem and Ellie; without including James Perez as a group member. At this point, messaging system 102 sends an indication 684 to inform that "James Perez will be added to chat on 01/01/2019, 9:00 AM." GUI 682 also includes a "Undo" button 685 to allow the scheduled teleportation to be canceled at a choice of the member(s) of the messaging group. As shown herein, a new member (e.g., James) to the messaging group configured with an active schedule to add members can be teleported therein without an existent member user going through the process of selecting the new member and an insertion point, as illustrated with references to FIGS. 2A-3I.

FIGS. 6M-6O illustrate an example series of GUIs after the user clicks on option to set a time duration link 627 at GUI 622. FIG. 6M illustrates a GUI 692 that enables the user to interact therewith in order to select a duration of time with regard to scheduled teleporting the new member to the messaging group. As shown herein, GUI 692 includes a time duration selector 693, and a "Done" button 694. In this example, the user has inputted one hour as the duration of time at GUI 692.

FIG. 6N illustrates GUI 622 after the user is done selecting a time duration at GUI 692, and subsequently clicks on "Done" button 694 at GUI 692 to navigate back GUI 622 with more information populated thereat. As shown herein, the user has now configured a non-repeating schedule of teleportation of James Perez to the current messaging group starting at now and with a duration specified as one hour.

FIG. 6O illustrates a GUI 695 of a messaging application that, by interacting with messaging system 102, is configured to send and receive messages from one or more recipient group members. GUI 695 is displayed after the user has completed interacting with GUI 622 and clicks on "Done" button 628. As shown herein, GUI 695 includes a thread of message history associated with the current message group whose setting is configured at GUI 602 of FIG. 6A. As illustrated in this example, GUI 695 includes a messaging group label 696 as "25 Castro Street" and "Jim, Quinn, Clem, Ellie" at the top of GUI 695. As made apparent herein, the membership associated with the messaging group includes members Jim, Quinn, Clem and Ellie; without including James Perez as a group member. At this point, messaging system 102 sends an indication 697 to inform that "James Perez was added to chat just now and remain for an hour until 10:20 AM PCT." GUI 695 also includes an "Undo" button 698 to allow the scheduled teleportation to be canceled at a choice of the member(s) of the messaging group. As shown herein, a new member (e.g., James) to the messaging group configured with an active schedule to add members can be teleported therein without an existent member user going through the process of selecting the new member and an insertion point, as illustrated with references to FIGS. 2A-FIG. 3I.

FIGS. 7A-7H are flow charts of example processes for teleporting a new member to a messaging group in accordance with an embodiment of the present disclosure. Process 700 can be executed at messaging system 102 of FIG. 1, messaging system 800 of FIG. 8, or computing system 900 of FIG. 9.

Process 700 starts at 702, where two or more user identifiers and a request to establish a messaging group are received, each user identifier being associated with a different user device with a different instance of a messaging application on the respective different user device. At 703, the messaging group is established to enable communication between the different user devices using the respective different instances of the messaging application. At 704, a plurality of messages including at least one message from each of at least two of the two or more users is received. At 705, the plurality of messages is routed to the respective different instances of the messaging application. At 706, a request to add a new member to the messaging group is received, the request including identity information of the new member and insertion information, the messaging group being associated with a thread of message history, the message history including at least the plurality of messages organized by time.

In some embodiments, the identity information pertaining to the new member to be teleported and/or the insertion information is provided by a user of a mobile device (e.g., user devices 106). For example, the user can select for the new member from a data collection such as a contact list, an address book, or the like on the mobile device. For another example, when the intended new member is not included in a data collection, the user can nevertheless provide pertinent information that can be used to identify and/or search for the new member. For example, the user can input a first and last name for the intended user member, a phone number or an email address for the intended new member, a QR code associated with the intended new member, or so forth. In some embodiments, the user can also conduct a search for the intended new member by providing limited information, based on which messaging system 102 or other applications can return one or more search results for user selections. The user can identify the insertion information intended for the selected new member in a variety of ways. For example, the user can interact with a visual bar (e.g., visual bar 212) to decide at which point along the timeline associated with the thread of message history the new member is to be teleported. For another example, the user can interact with a date and time picker to determine a date and time, and the new member will be teleported to the point corresponding to the determined date and time along the timeline. For yet another example, the user can specify the insertion information in relation to a recurring schedule. For instance, based on a housekeeper's visiting schedule, the user can specify the insertion information as one hour before and one hour after a visit. For another example, the user can search for a particular message or browse the thread of message history to identify (e.g., highlight) a particular message to configure the insertion point as the point before or after that particular message.

In some embodiments, the identity information pertaining to the new member to be teleported and/or the insertion information is provided by messaging system 102. For example, messaging system 102 may be configured with a rule engine which applies one or more sets of rules to determine the identity information for the new member to be teleported and/or at which insertion point the new member is to be teleported. In some embodiments, the one or more sets of rules include pre-configured conditions. There may be different sets of rules associated with different z.

Pre-configured conditions can include a schedule, an event, a date/time, any contextual information, or any combination thereof. For example, once a night manager mode is enabled, support personnel will be the designated new member to be teleported to the messaging group when an emergent situation is detected from the messages. For another example, when a tenant incurs a rent past due status, a property manager and/or a financial advisor will be the designated new member to be teleported to the messaging group to which the tenant is a member. For yet another example, when a tenant schedules a move-out date, a property manager will be the designated new member to be teleported to the messaging group to which the tenant is a member, starting from one day before the move-out date and deleted from the messaging group one day after the move-out date. For another example, when a user of the messaging group has suggested for someone to be added to the conversation, or mentions someone using indications such as the "@" sign, that suggested user or the mentioned user is provided as the new member to be teleported. For another example, when a service ticket (e.g., maintenance ticket) that generally requires attention of one or more people who are not a member to a messaging group has been submitted at the messaging group, that one or more people are provided as new member(s) to be teleported to the messaging group.

In some embodiments, the identity information pertaining to the new member to be teleported and/or the insertion information is recommended by messaging system 102 for user selections. The user has the options to both confirm and reject the new member identity information and/or the insertion information. For example, in the scenario where a plumber is optionally configured (e.g., tagged in FIGS. 4A-4D) for a particular messaging group, an existent member of the messaging group is presented with options to add the designated plumber to the messaging group or choose not to do so. In particular, a request to teleport the new member based on the recommendation is not generated unless the user consents to the recommendation.

At 707, an insertion point is determined by the messaging system based at least in part on the insertion information included in the request to teleport the new member to the messaging group.

In some embodiments, the insertion information included in the request is converted to a point of time along the timeline associated with the messaging group. For example, the insertion point can be configured as the point of time corresponding to the point along the timeline where the user has dropped a visual bar on the thread of message history. For another example, the insertion point can be configured as the date and time information the user selects upon requesting for a new member to be teleported. For yet another example, the insertion point can be configured as a function of a condition, e.g., starting at one hour before a condition, and/or ending at one hour after a condition.

At 708, the new member is added to the messaging group to enable the new member to communicate with other members of the messaging group. Process 700 concludes at 709, where the new member is enabled to see messages in the thread of message history up to the insertion point but not at any messages received or generated before a time of before the insertion point. In some embodiments, the newly teleported user may optionally be configured with an option to store a portion of the thread of message history starting from the insertion point along the timeline of the messaging group and ending at the point of time the new user leaves the messaging group.

FIG. 8 is a block diagram of an example messaging system for teleporting a new member to a messaging group, in accordance with an embodiment of the present disclosure. Messaging system 800 includes a membership manager 802, a channel manager 804, a teleporter 810, a message rule engine 812, a message sentiment analyzer 814, a message router 816, and a message archiver 818. In some embodiments, messaging system 800 can be implemented at computing system 900 of FIG. 9, using frameworks such as Ruby on Rails, PostgreSQL, Elasticsearch, Redis, or any combination thereof.

In this example, membership manager 802 is configured to manage a plurality of memberships associated with one or more corresponding messaging channels, including: adding user(s) to the group membership associated with a channel, deleting (e.g., removing) user(s) from the group membership associated with a channel, associating timestamp(s) or other information with the adding and/or deleting of user(s) from the group membership, and so forth.

Channel manager 804 is configured to manage one or more threads of communications that are represented in the form of messaging channels. For example, channel manager 804 can add new channel(s) in response to a user of user devices 106 sending a message to another user of user devices 106; deleting existent channel(s) in response to a user's selection for deleting a messaging group. A thread of message history is associated with each of the channels managed by channel manager 804, each thread including a plurality of messages exchanged during the conversation between the membership users associated with the messaging channel. In some embodiments, messages are configured to include receipt information to record data related to the message delivery status respectively for each user associated with the membership of the messaging channel. For example, such receipt information can indicate that a particular message in the thread of message history has been successfully received by a user associated with the membership of the messaging channel; it can also indicate that a particular message has failed to be delivered to a particular user of the membership. In some embodiments, channel manager 804 is further configured to archive all the messages associated with a messaging channel.

Teleporter 810 is configured to insert a new user at an insertion point on the timeline associated with the thread of message history on a messaging channel. An insertion point can be any point on the timeline of the conversation so that upon a successful teleportation, the new user is able to access the portion of the thread of the message history starting from the insertion point. In conjunction with membership manager 802 and channel manager 804, teleporter 810 is configured to modify the membership associated with the messaging channel in which the new user has been teleported so that the new user is included in the membership, and the portion of the thread of message history visible to the new user is accordingly recorded with channel manager 804.

Message sentiment analyzer 814 is configured to analyze messages from message manager 804 to determine a sentiment, intent, purpose, topic, nature, entities, or the like conveyed by the messages communicated at a messaging channel. In some embodiments, Message sentiment analyzer 814 is optionally configured to employ natural language processing (NLP) to perform the sentiment analysis on the messages. NLP is a technique that facilitates exchange of information between humans and data processing systems. For example, NLP engines can be used to accept input content such as textual content, human speech, and produce structured data (e.g., an outline of the input content, most significant and least significant parts, a subject, a reference, and the like, from the given content).

Shallow parsing is a term used to describe lexical parsing of a given content using NLP. For example, given a sentence, an NLP engine determining what the sentence semantically means (context) according to the grammar of the language of the sentence is the process of lexical parsing, to wit, shallow parsing. In contrast, deep parsing is a process of recognizing the relationships, predicates, or dependencies, and thereby extracting new, hidden, indirect, or detailed structural information from distant content portions in a given document or some corpora.

A sentiment of a given content can be determined using NLP. For example, by performing NLP on the content of messages, it can be determined whether the content expresses a positive or negative or neutral sentiment about a subject (e.g., an organization, brand, event, product, service, aspect). For example, a tenant's message, "This new plumber is great," can be parsed using NLP to determine that the message has a positive sentiment towards the new maintenance staff, whereas "The sink still doesn't work properly" message can be parsed using NLP to determine that the message has a negative sentiment towards the maintenance work performed. In some embodiments, messages communicated on a messaging channel and thereby managed by channel manager 804 are continuously processed by message sentiment analyzer 814 to determine whether a message from a user is intended to trigger of a teleportation of a new member to the messaging group associated with the messaging channel.

Message rule engine 812 is configured to load message rules and apply them to inputs received thereat. Such inputs can be the messages themselves, the sentiment retrieved from the messages, a pre-configured condition such as a date/time, event, or the like. Message rules are configured to define a plurality of keywords, phrases, sentiments, times, events, and the like, upon the triggering of which a corresponding action will be taken. For example, a rule can be that upon detecting "sink", and/or "leaking," a plumber will be automatically or suggested to the user for teleportation into the conversation.

Message router 816 is configured to route messages to respective recipient user(s) associated with the membership of the messaging channel. In some embodiments, message router 816 is further configured to route messages to respective recipient users according to respective communication mode (e.g., message delivering mechanism).

Message archiver 818 is configured to store a portion of the thread of message history accessible to a user of the membership so that the portion of the thread of message history continues to be accessible to the user after the user is no longer a member to the messaging group.

It should be appreciated that system 800 is only one example of a messaging system for teleporting a new member to a messaging group, and that system 800 optionally has more or fewer components than shown, optionally combines two or more components, or optionally has a different configuration or arrangement of the components. The various components and/or modules shown in FIG. 8 are implemented in hardware, software, or a combination of both hardware and software, including one or more signal processing and/or application-specific integrated circuits.

Figure 9:
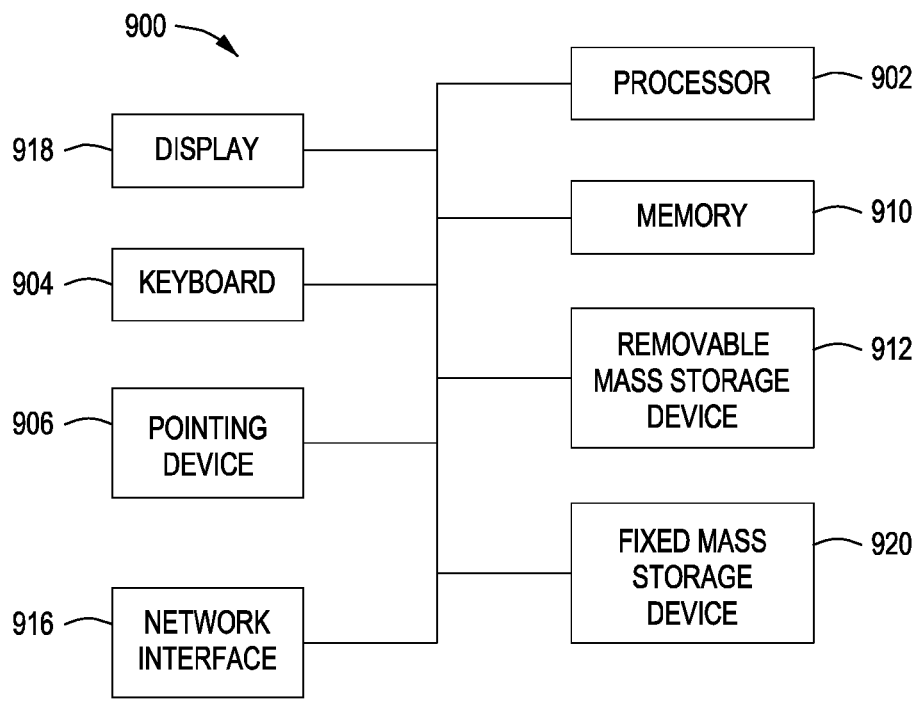
FIG. 9 is a functional diagram illustrating an embodiment of a programmed computer system for teleporting a new member to a messaging group, in accordance with one or more embodiments of the present disclosure.

FIG. 9 is a functional diagram illustrating an embodiment of a programmed computer system for teleporting a new member to a messaging group. As will be apparent, other computer system architectures and configurations can be used to teleport a new member to a messaging group. Computer system 900, which includes various subsystems as described below, includes at least one microprocessor subsystem (also referred to as a processor or a central processing unit (CPU)) 902. For example, processor 902 can be implemented by a single-chip processor or by multiple processors. In some embodiments, processor 902 is a general purpose digital processor that controls the operation of the computer system 900. Using instructions retrieved from memory 910, the processor 902 controls the reception and manipulation of input data, and the output and display of data on output devices (e.g., display 918).

Processor 902 is coupled bi-directionally with memory 910, which can include a first primary storage area, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 902. Also, as is well known in the art, primary storage typically includes basic operating instructions, program code, data, and objects used by the processor 902 to perform its functions (e.g., programmed instructions). For example, memory 910 can include any suitable computer readable storage media, described below, depending on whether, for example, data access needs to be bi-directional or uni-directional. For example, processor 902 can also directly and very rapidly retrieve and store frequently needed data in a cache memory (not shown).

A removable mass storage device 912 provides additional data storage capacity for the computer system 900 and is coupled either bi-directionally (read/write) or uni-directionally read only) to processor 902. For example, storage 912 can also include computer readable media such as magnetic tape, flash memory, PC-CARDS, portable mass storage devices, holographic storage devices, and other storage devices. A fixed mass storage 920 can also, for example, provide additional data storage capacity. The most common example of fixed mass storage 920 is a hard disk drive. Mass storages 912, 920 generally store additional programming instructions, data, and the like that typically are not in active use by the processor 902. It will be appreciated that the information retained within mass storages 912 and 920 can be incorporated, if needed, in standard fashion as part of memory 910 (e.g., RAM) as virtual memory.

In addition to providing processor 902 access to storage subsystems, bus 914 can also be used to provide access to other subsystems and devices. As shown, these can include a display 918, a network interface 916, a keyboard 904, and a pointing device 908, as well as an auxiliary input/output device interface, a sound card, speakers, and other subsystems as needed. For example, the pointing device 908 can be a mouse, stylus, track ball, or tablet, and is useful for interacting with a graphical user interface.

The network interface 916 allows processor 902 to be coupled to another computer, computer network, or telecommunications network using a network connection as shown. For example, through the network interface 916, the processor 902 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 902 can be used to connect the computer system 900 to an external network and transfer data according to standard protocols. For example, various process embodiments disclosed herein can be executed on processor 902, or can be performed across a network such as the Internet, intranet networks, or local area networks, in conjunction with a remote processor that shares a portion of the processing. Additional mass storage devices (not shown) can also be connected to processor 902 through network interface 916.

An auxiliary I/O device interface (not shown) can be used in conjunction with computer system 900. The auxiliary I/O device interface can include general and customized interfaces that allow the processor 902 to send and, more typically, receive data from other devices such as microphones, touch-sensitive displays, transducer card readers, tape readers, voice or handwriting recognizers, biometrics readers, cameras, portable mass storage devices, and other computers.

The embodiments included in this description are described in a progressive manner. The explanation of each embodiment focuses on areas of difference from the other embodiments, and the descriptions thereof may be mutually referenced for portions of each embodiment that are identical or similar.

A person skilled in the art should understand that an embodiment of the present application may provide methods, devices, or computer program products. Therefore, the embodiments of the present application may take the form of embodiments that are entirely hardware, embodiments that are entirely software, and embodiments that combine hardware and software aspects. Moreover, embodiments of the present application may employ one or more forms of computer products that implement computer-operable storage media (including but not limited to magnetic disk storage devices, CD-ROMs, and optical storage devices) containing computer-operable computer code.

In one typical configuration, the computer equipment comprises one or more processors (CPUs), input/output interfaces, network interfaces, and memory. Memory may include such forms as volatile storage devices in computer-readable media, random access memory (RAM) and/or non-volatile memory, such as read-only memory (ROM) or flash memory (flash RAM). Memory is an example of a computer-readable medium. Computer-readable media, including permanent and non-permanent and removable and non-removable media, may achieve information storage by any method or technology. Information can be computer-readable commands, data structures, program modules, or other data. Examples of computer storage media include but are not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digit multifunction disc (DVD) or other optical storage, magnetic cassettes, magnetic tape or magnetic disc storage, or other magnetic storage equipment or any other non-transmission media that can be used to store information that is accessible to computers. As defined in this document, computer-readable media does not include transitory computer-readable media, (transitory media), such as modulated data signals and carrier waves.

The embodiments of the present application are described with reference to flowcharts and/or block diagrams based on methods, terminal equipment (systems), and computer program products of the embodiments of the present application. Please note that each flowchart and/or block diagram within the flowcharts and/or block diagrams and combinations of flowcharts and/or block diagrams within the flowcharts and/or block diagrams can be realized by computer commands. These computer program commands can be provided to the processors of general-purpose computers, specialized computers, embedded processor devices, or other programmable data processing terminals to produce a machine. The commands executed by the processors of the computers or other programmable data processing terminal equipment consequently give rise to devices for implementing the functions specified in one or more processes in the flowcharts and/or one or more blocks in the block diagrams.

These computer program commands can also be stored in nontransitory computer-readable memory that can guide the computers or other programmable data processing terminal equipment to operate in a specific manner. As a result, the commands stored in the computer-readable memory give rise to products including command devices. These command devices implement the functions specified in one or more processes in the flowcharts and/or one or more blocks in the block diagrams.

These computer program commands can also be loaded onto computers or other programmable data processing terminal equipment and made to execute a series of steps on the computers or other programmable data processing terminal equipment so as to give rise to computer-implemented processing. The commands executed on the computers or other programmable data processing terminal equipment thereby provide the steps of the functions specified in one or more processes in the flowcharts and/or one or more blocks in the block diagrams.

Although preferred embodiments of the present application have already been described, a person skilled in the art can make other modifications or revisions to these embodiments once they grasp the basic creative concept. Therefore, the attached claims are to be interpreted as including the preferred embodiments as well as all modifications and revisions falling within the scope of the embodiments of the present application.

Although the foregoing embodiments have been described in some detail for purposes of clarity of understanding, the embodiments are not limited to the details provided. There are many alternative ways of implementing embodiments. The disclosed embodiments are illustrative and not restrictive.

The invention claimed is:

1. A method comprising:
receiving two or more user identifiers and a request to establish a messaging group, each user identifier being associated with a different user;
establishing the messaging group to enable communication between the different users each using different user devices, the different users being members of the messaging group;
receiving a plurality of messages, each being from a different user of the messaging group;
routing the plurality of messages to at least a subset of the user devices of at least a subset of the different users;
receiving a request to add a new member to the messaging group, the request including identity information of the new member, the messaging group being associated with a thread of message history, the message history including at least the plurality of messages, the message history including the messages organized by time;
determining an insertion point in the thread of message history based at least in part on insertion information, the insertion point being associated with a position within the thread of message history, the insertion information indicating a time for the insertion point;
adding the new member to the messaging group to enable the new member to communicate with other members of the messaging group; and enabling the new member to see messages in the thread of message history from the insertion point to a current time but not at any messages received or generated before the time of the insertion point.

2. The method of claim 1, wherein the request to add the new member is generated based at least in part on a first user selection pertaining to the identity information of the new member and the insertion information, the first user being one of the members of the messaging group.

3. The method of claim 2, wherein the identity information of the new member is selected from a contact list on the user device of the first user prior to adding the new member.

4. The method of claim 2, wherein the insertion information is associated with a first time selected by the first user, the insertion point being the first time, wherein enabling the new member to see messages in the thread of message history from the insertion point to the current time but not at any messages received or generated before the time of the insertion point comprises enabling the new member to see messages in the thread of message history from the first time to the current time but not at any messages received or generated before the first time.

5. The method of claim 1, wherein the insertion information is associated with a first time that the request to add the new member is received, wherein enabling the new member to see messages in the thread of message history from the insertion point to the current time but not at any messages received or generated before the time of the insertion point comprises enabling the new member to see messages in the thread of message history from the first time to the current time but not at any messages received or generated before the first time.

6. The method of claim 1, wherein receiving the plurality of messages, each being from a different user of the messaging group and routing the plurality of messages to at least a subset of the user devices of at least a subset of the different users comprises receiving each of the plurality of messages and routing each of the plurality of messages as they are received.

7. The method of claim 1, wherein enabling the new member to see messages in the thread of message history from the insertion point to a current time but not at any messages received or generated before the time of the insertion point comprises providing a list of the messages in the thread of message history that were received at or after the time indicated by the insertion information, the list of the messages to be displayed on at least one user device.

8. The method of claim 1, wherein the insertion point is provided to be graphically depicted within a list of messages of the thread of the message history to at least one member of the messaging group.

9. A system comprising:
a processor; and
a memory coupled with the processor, wherein the memory is configured to provide the processor with instructions which when executed cause the processor to:
receive two or more user identifiers and a request to establish a messaging group, each user identifier being associated with a different user;
establish the messaging group to enable communication between the different users each using different user devices, the different users being members of the messaging group;
receive a plurality of messages, each being from a different user of the messaging group;
route the plurality of messages to at least a subset of the user devices of at least a subset of the different users;
receive a request to add a new member to the messaging group, the request including identity information of the new member, the messaging group being associated with a thread of message history, the message history including at least the plurality of messages, the message history including the messages organized by time;
determine an insertion point in the thread of message history based at least in part on insertion information, the insertion point being associated with a position within the thread of message history, the insertion information indicating a time for the insertion point;
add the new member to the messaging group to enable the new member to communicate with other members of the messaging group; and
enable the new member to see messages in the thread of message history from the insertion point to a current time but not at any messages received or generated before the time of the insertion point.

10. The system of claim 9, wherein the request to add the new member is generated based at least in part on a first user selection pertaining to the identity information of the new member and the insertion information, the first user being one of the members of the messaging group.

11. The system of claim 10, wherein the identity information of the new member is selected from a contact list on the user device of the first user prior to adding the new member.

12. The system of claim 10, wherein the insertion information is associated with a first time selected by the first user, the insertion point being the first time, wherein enabling the new member to see messages in the thread of message history from the insertion point to the current time but not at any messages received or generated before the time of the insertion point comprises enabling the new member to see messages in the thread of message history from the first time to the current time but not at any messages received or generated before the first time.

13. The system of claim 9, wherein the insertion information is associated with a first time that the request to add the new member is received, wherein enabling the new member to see messages in the thread of message history from the insertion point to the current time but not at any messages received or generated before the time of the insertion point comprises enabling the new member to see messages in the thread of message history from the first time to the current time but not at any messages received or generated before the first time.

14. The system of claim 9, wherein the instructions which when executed cause the processor to receive the plurality of messages, each being from a different user of the messaging group and route the plurality of messages to at least a subset of the user devices of at least a subset of the different users comprises the instructions which when executed cause the processor to receive each of the plurality of messages and route each of the plurality of messages as they are received.

15. The system of claim 9, wherein the instructions which when executed cause the processor to enable the new member to see messages in the thread of message history from the insertion point to a current time but not at any messages received or generated before the time of the insertion point comprises the instructions which when executed cause the processor to provide a list of the messages in the thread of message history that were received at or after the time indicated by the insertion information, the list of the messages to be displayed on at least one user device.

16. The system of claim 9, wherein the insertion point is provided to be graphically depicted within a list of messages of the thread of the message history to at least one member of the messaging group.

17. The system of claim 16, wherein the request to add the new member is generated based at least in part on a user selection pertaining to the identity information of the new member and the insertion information, the user being a member of the messaging group.

18. A computer program product embodied in a non-transitory tangible computer readable storage medium and comprising computer instructions for:
   receiving two or more user identifiers and a request to establish a messaging group, each user identifier being associated with a different user;
   establishing the messaging group to enable communication between the different users each using different user devices, the different users being members of the messaging group;
   receiving a plurality of messages, each being from a different user of the messaging group;
   routing the plurality of messages to at least a subset of the user devices of at least a subset of the different users;
   receiving a request to add a new member to the messaging group, the request including identity information of the new member, the messaging group being associated with a thread of message history, the message history including at least the plurality of messages, the message history including the messages organized by time;
   determining an insertion point in the thread of message history based at least in part on insertion information, the insertion point being associated with a position within the thread of message history, the insertion information indicating a time for the insertion point;
   adding the new member to the messaging group to enable the new member to communicate with other members of the messaging group; and
   enabling the new member to see messages in the thread of message history from the insertion point to a current time but not at any messages received or generated before the time of the insertion point.

19. The non-transitory tangible computer readable storage medium of claim 18, wherein the request to add the new member is generated based at least in part on a first user selection pertaining to the identity information of the new member and the insertion information, the first user being one of the members of the messaging group.

20. The non-transitory tangible computer readable storage medium of claim 19, wherein the identity information of the new member is selected from a contact list on the user device of the first user prior to adding the new member.

* * * * *